US010423929B2

(12) United States Patent
Masood et al.

(10) Patent No.: US 10,423,929 B2
(45) Date of Patent: Sep. 24, 2019

(54) LEARNING MANAGEMENT SYSTEM

(71) Applicant: TRANSFORM SR BRANDS LLC, Hoffman Estates, IL (US)

(72) Inventors: Rafeh Masood, Sewickley, PA (US); Naveen Seshadri, Chicago, IL (US); Anirudh Bhargava, Schaumburg, IL (US)

(73) Assignee: TRANSFORM SR BRANDS LLC, Hoffman Estates, IL (US)

( * ) Notice: Subject to any disclaimer, the term of this patent is extended or adjusted under 35 U.S.C. 154(b) by 47 days.

(21) Appl. No.: 14/268,425

(22) Filed: May 2, 2014

(65) Prior Publication Data

US 2014/0329210 A1 Nov. 6, 2014

Related U.S. Application Data

(60) Provisional application No. 61/819,380, filed on May 3, 2013.

(51) Int. Cl.
*G06Q 10/10* (2012.01)
*G06Q 50/00* (2012.01)
*G09B 7/02* (2006.01)

(52) U.S. Cl.
CPC ......... *G06Q 10/103* (2013.01); *G06Q 10/105* (2013.01); *G06Q 50/01* (2013.01); *G09B 7/02* (2013.01)

(58) Field of Classification Search
USPC .......................................................... 434/219
See application file for complete search history.

(56) References Cited

U.S. PATENT DOCUMENTS

| | | | | |
|---|---|---|---|---|
| 6,177,873 B1 | 1/2001 | Cragun | | |
| 7,181,413 B2 * | 2/2007 | Hadden | .................... | G09B 7/00 434/107 |
| 7,483,842 B1 | 1/2009 | Fung | | |
| 2005/0175971 A1 | 8/2005 | Mcilwaine | | |
| 2007/0043608 A1 | 2/2007 | May et al. | | |

OTHER PUBLICATIONS

Hunt, Steven T. Ph.D., SPHR, "Common Sense Talent Management, Twelve Fundamental Principles for Increasing Workforce Productivity" Document retrieved from <http://www.successfactors.com/> on Apr. 9, 2013. (23 pages).

Jones, Katherine, "New Directions in Workforce Management," Research Bulletin 2011, vol. 6, Issue 19, May 6, 2011 Document retrieved from <http://www.successfactors.com/> on Apr. 9, 2013. (16 pages).

(Continued)

*Primary Examiner* — Kesha Frisby
(74) *Attorney, Agent, or Firm* — McAndrews, Held & Malloy, Ltd.

(57) ABSTRACT

Systems and methods that support the creation and timely electronic scheduling and delivery of course materials for training of individuals in an organization, in which course recommendations, scheduling, and rollout are based upon a number of factors including, for example, specific individual and/or business day-to-day operational performance measures, sales performance, and seasonal weather conditions by geographical region.

21 Claims, 74 Drawing Sheets

(56) References Cited

OTHER PUBLICATIONS

Goldberg, Steven, et al. "Rethinking Recruiting: Modernizing the Way We Hire" Research Bulletin 2011, vol. 6, Issue 8, Mar. 9, 2011. Document retrieved from <http://www.successfactors.com/> on Apr. 9, 2013. (17 pages).
BizX Mobile, Document retrieved from <http://www.successfactors.com/> on Apr. 9, 2013. (2 pages).
"TheMissing Link: Driving Results Through Pay-for-Performance." Document retrieved from <http://www.successfactors.com/> on Apr. 9, 2013. (7 pages).
"How to Build an HR Analytics Center of Excellence, Harnessing Workforce Data to drive Strategic Decision-Making." Document retrieved from <http://www.successfactors.com/> on Apr. 9, 2013. (11 pages).
"The ROI of a New Learning Management System (LMS), How to Construct a Successful Business Case." Document retrieved from <http://www.successfactors.com/> on Apr. 9, 2013. (6 pages).
"Taking Care of Your Company's Future: 3 Best Practices for Succession Planning." Document retrieved from <http://www.successfactors.com/> on Apr. 9, 2013. (10 pages).
Examiner's Requisition for Application No. 2,850,938, dated Aug. 31, 2015 (6 pages).
Examiner's Requisition for Application No. 2,850,938, dated Jun. 15, 2016 (4 pages).
Canadian Intellectual Property Office, Examiner Requisition in Application No. 2,850,938 dated May 4, 2017 (4 pages).
Canadian Intellectual Property Office, Examiner Requisition in Application No. 2,850,938 dated Mar. 27, 2018 (5 pages).
Canadian Patent Office, Examiner Requisition in application No. 2,850,938, dated Feb. 12, 2019 (3 pages).

* cited by examiner

600

650

752

700

800

1000

1300

1400

1600

1700

1800

1900

2000

2100

2200

2300

2400

2500

2600

2700

2800

2900

Fig. 30
Course Catalog
Campaigns
Reports
Personal history & direct report history
All Campaigns
My Campaigns
Inactive Campaigns
search...
Campaign Name
Status
Created Date
Retire Date
Created By
Sales Associate Onboarding
Active
Inactive
John Smith
Jane Doe

3000

Fig. 31
Course Catalog
Campaigns
Reports
Campaigns
All Campaigns
My Campaigns
Inactive Campaigns
Campaign Name
Status
Created Date
Retire Date
Created By
Sales Associate Onboarding
Active
Inactive
John Smith
John Doe

3100

3200

3300

3400

3500

3600

3700

3800

3900

4000

4100

4200

4300

4400

Fig. 45
You are about to launch the Chicago Onboarding campaign

4500

4600

4700

4800

4900

When a user first logs on, or they haven't taken the onboarding assessment, they get prompted with this screen.

5100

5200

After the assessment the user gets assigned the correct training material. In this case it's a certification and 2 other courses.

5300

5400

Fig. 55
The user is in the certification screen. They have the following information:
1. Certification information
2. Progress
3. Content Rating
4. Ability to navigate to any topic / video they like
Note: Depending on the assessment, some of these videos / topics might be marked as completed.
TOP 10 ADVANTAGE
XYZ
Brands Overview

5500

As the user gets to the end of the certificate topic, they take a quiz about all of the videos they have watched.

Note: The progress bar has changed and completed videos are checked to show completion.

5600

5700

5800

5900

6000

6100

6200

6300

6400

6500

6600

6700

Approved

6800

Approved

ReDo Request

6900

ReDo Request

7000

7100

7200

7300

7400

LEARNING MANAGEMENT SYSTEM

CROSS-REFERENCE TO RELATED APPLICATIONS

The present application makes reference to, claims benefit of, and claims priority to U.S. Provisional Patent Application No. 61/819,380, filed May 3, 2013, which is hereby incorporated herein by reference, in its entirety. In addition, the present application makes reference to U.S. patent application Ser. No. 13/844,814 filed Mar. 16, 2013, the complete subject matter of which is hereby incorporated herein by reference, in its entirety

FIELD

Certain embodiments of the present disclosure relate to systems and methods that support the training of workers. More specifically, certain aspects of the present disclosure relate to systems and methods that support the creation and timely electronic scheduling and delivery of course materials for training of individuals in an organization, in which course recommendations, scheduling, and rollout are based upon a number of factors including, for example, specific individual and/or business day-to-day operational performance measures, sales performance, and seasonal climatic and weather conditions by geographical region.

BACKGROUND

The need for and nature of employee training is normally determined at defined points in their relationship with their employer such as, for example, at entry into the workforce, or at a periodic performance review. The training to be provided may be chosen by the employee from a fixed curriculum for the job they perform. In some cases, workers may be permitted to select training courses based on their personal interest or aspirations. Any recommendations or requirements for training related to skills needed to perform a particular job may be selected by their supervision based on their time in a particular position, a business need related to cross-training, or to enable movement or advancement of the worker into other positions.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method for support of the creation and timely electronic scheduling and delivery of course materials for training of individuals in an organization, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1:
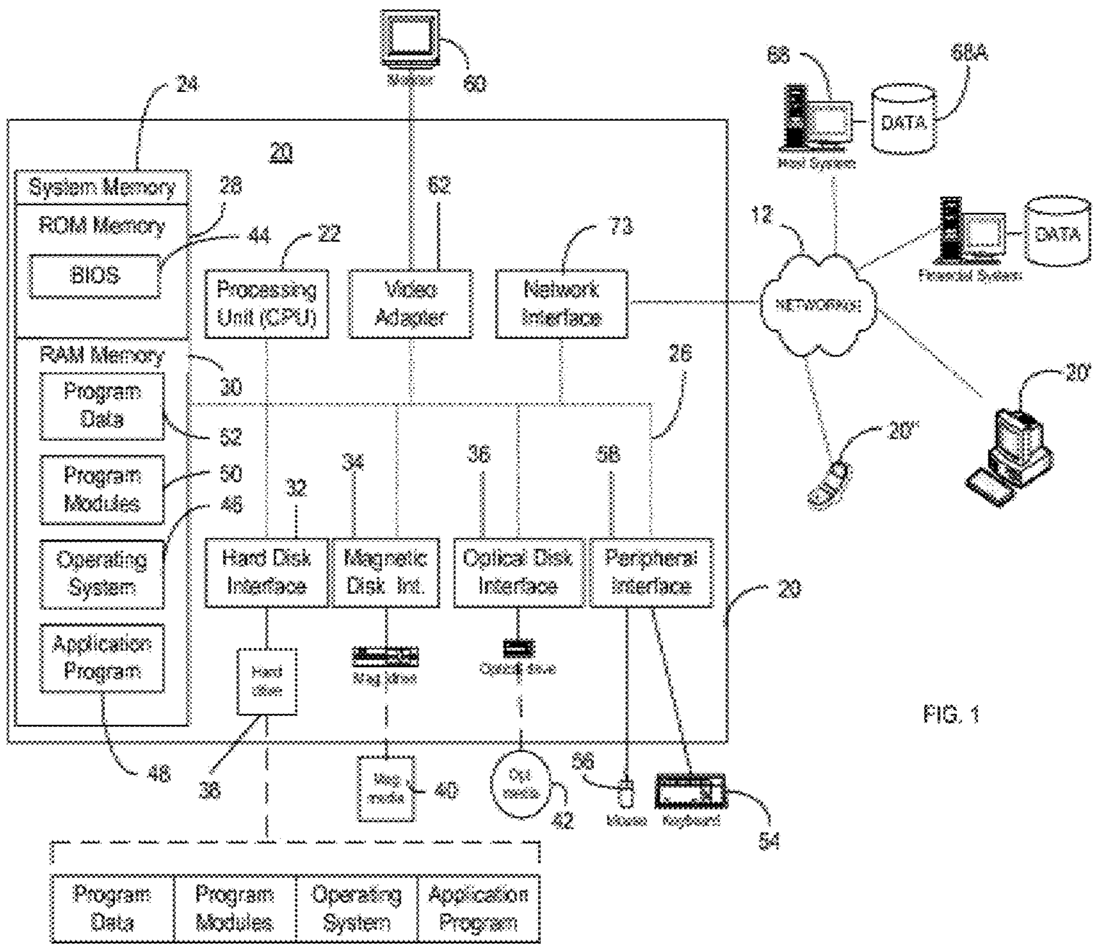
FIG. 1 is an illustration of computer network, in which a representative embodiment of the present disclosure may be practiced.

Aspects of the present disclosure relate to systems and methods that support the training of workers. More specifically, certain aspects of the present disclosure relate to systems and methods that support the creation and timely electronic scheduling and delivery of course materials for training of individuals in an organization, in which course recommendations, scheduling, and rollout are based upon a number of factors including, for example, specific individual and/or business day-to-day operational performance measures, sales performance, and seasonal climatic and weather conditions by geographical region.

The following description of example methods and apparatus is not intended to limit the scope of the description to the precise form or forms detailed herein. Instead the following description is intended to be illustrative so that others may follow its teachings.

Various aspects of a representative embodiment of the present disclosure are described below in terms of an example "Learning Management System" that may also be referred to herein as an "eLearning Ecosystem." The Learning Management System (LMS) described herein enables small to large scale enterprises to customize and personalize their training programs for individual workers/associates. An LMS in accordance with the present disclosure may LMS push specific content and training modules to individual workers/associates based on various parameters. An LMS in accordance with the present disclosure may also provide a "coaching" option that allows workers/associates to sign-up to be coaches for other workers/associates. In addition, an LMS in accordance with the present disclosure may be integrated with social media tools and "gamification functionality" to make training activities a social and gamified experience. Lastly, an LMS in accordance with the present disclosure may be integrated with a content management system that gives workers/associates the ability to create content accessible by other workers/associates.

A system in accordance with a representative embodiment of the present disclosure provides for the use of commodity hardware, off the shelf software, OS independent applications, form factor independent devices (PC, tablets, smart phones etc), media independent (voice, text, video) and cloud based infrastructure to run all functionalities of the present system. In the context of a service establishment, such as, for example, a retail store this is specifically very useful as a worker/associate can utilize familiar technologies to arrange for related and personalized training, and to receive coaching that can be handled by another worker/sales associate who has the applicable expertise and relevant information.

In the following discussion, the terms "worker," "associate," and "employee" may be used herein interchangeably to refer to one who performs activities as part of an enterprise, whether non-profit or for profit, and whether. In an enterprise involving sales of products or services, for example, a "worker," "associate," or "employee" may be, but is not limited to, an individual that provides product and/or sales related assistance to customers of the enterprise. Such individuals may also be referred to herein as a "sales associate" or "customer service agent" and may also be, by way of example and not limitation, an expert, a question and answer provider, a merchandise associate, etc. In other applications of the present disclosure, workers, associates, and employees may refer to those involved the other activities such as, by way of example and not limitation, product assembly and manufacturing, service delivery, and other forms of activities of an organization or enterprise, whether or not the organization or enterprise is for profit. For the purposes of the following discussion of the present disclosure, an employee may refer equally to a contractor and one who works directly for the organization or enterprise.

The term "customer" may be used herein to refer to a potential or existing purchaser of products and/or services of a business.

The term "channel" in the present context may refer to various means of communicating such as, for example, online communication (e.g., Internet-based), mobile communication (e.g., wireless communication such as cellular or Wi-Fi), and in-store communication.

The term "gamification" may be used herein to refer to the use of game thinking and game mechanics in a non-game context in order to engage users and solve problems. Gamification may be used in applications and processes to, for example, improve user engagement, return-on-investment (ROI), data quality, timeliness, and learning.

The term "crowd-sourcing" may be may be used herein to refer to the practice of obtaining needed services, ideas, or content by soliciting contributions from a large group of people. The terms "crowd-source" and "crowd-source population" may be used herein to refer to a large group of people from which contributions of services, ideas, or content may be solicited.

As utilized herein, the terms "exemplary" or "example" means serving as a non-limiting example, instance, or illustration. As utilized herein, the term "e.g." introduces a list of one or more non-limiting examples, instances, or illustrations.

A representative embodiment of the present disclosure enables training programs for individual workers/associates to be customized in a number of unique ways. An LMS in accordance with the present disclosure may access and leverage various operational metrics generated from business operational data for an enterprise, to automatically make training module/coursework recommendations to a worker/associate based on, for example, performance gaps of the worker/associate in relation to their immediate peers, to a geographic region of the enterprise, or to overall enterprise goals.

For example, for an individual involved in retail sales, a representative embodiment of the present disclosure may automatically recommend or assign to an individual, training on a particular skill or aspect of sales of the products or services sold through their organization or department, based on data for actual sales transactions of the individual. In the case of individuals involved in the sale of small appliances, for example, certain individuals may be automatically guided by the system to study/review training materials (e.g., course(s) or module(s)) designed to improve their sale of optional accessories for the small appliances available in the department or organization in which those individuals work, or product protection agreements and/or service contracts.

Training recommendations or assignments may be automatically generated for particular individuals when, for example, information identifying items purchased as part of customer transactions handled by that particular individual indicates that the particular individual is selling fewer optional accessories than others in their department, in the same department of a number of enterprise locations, or below enterprise goals. In the context of this example, such training recommendations and assignments for individuals involved in selling a particular product or service may be made based on actual, day-to-day, business operations information for the enterprise as derived from customer transactions. Such customer transactions may take place at, for example, any conventional or future stationary or mobile point-of-sale terminal, handheld devices known now or in the future such as smart phones or tablet computers, or may be based on data representing transactions taking place using a personal computer (PC).

In a representative embodiment of the present disclosure, such training recommendations and assignments made for an individual may, for example, be made based on data such as the current and/or historical performance of the individual, corresponding data for co-workers in the same department at their place of work, or corresponding data for workers/associates at one or more other geographic locations of the enterprise.

In addition, an LMS in accordance with the present disclosure may leverage geographical and meteorological information to make recommendations of worker/associate training. For example, a representative embodiment of the present disclosure may automatically assign a particular training module/course to workers/associates in one geographical region of the enterprise at a certain time of the year, and automatically assign the same training module/course to workers/associates in a different geographic area of the enterprise at a different time of year. The assignments of training may, for example, be based on the calendar, the known average meteorological conditions in the various regions in which the workers/associates are located, and even the actual observed weather conditions or current deviations from typical weather conditions for the region. In this way, a representative embodiment of the present disclosure may, for example, assign a "Lawn & Garden" training module in February for associates in regions in the southwestern portion of the U.S., and assign a similar "Lawn & Garden" training module in April for associates in northeastern portion of the U.S., reflecting the differences in time of the expected or predicted start of the growing seasons of those regions.

Further, some representative embodiments of the present disclosure may provide tools that enable high-performing workers/associates to become what are referred to herein as "coaches." In an LMS in accordance with some aspects of the present disclosure, the LMS may automatically identify those workers/associates whose performance, as indicated by, for example, their actual day-to-day, on the job results, and their training scores, make them excellent examples and in turn, able to develop appropriate training plans/recommendations for fellow associates. The workers and associates may be permitted to self-nominate based on their on-the-job performance as shown by the business operational data.

Some representative embodiments of the present disclosure may have an integrated social media functionality that allows individual associates to exchange product, service, manufacturing, sales, and other knowledge with others in the enterprise, and to recommend useful training courses and on-the-job techniques to fellow associates.

A representative embodiment of the present disclosure may provide access to an integrated content management system that provides workers and associates with the opportunity to create training materials that can be shared with other associates. For example, if a worker or associate performs exceptionally well in driving credit card signups, at selling accessories for home appliances, or assembling a product in a manufacturing position and performs with a low defect rate, those individual workers or associates may be enabled to create training materials and guides to permit them to share their expertise with other associates, on their own.

A representative embodiment of the present disclosure provides tools that support coaching of workers/associates and the identification of workers/associates that would likely be successful coaches of their peers, based on their own performance. For example, an individual that has successfully completed training for a given work assignment, and that shows an ability to successfully put the training into everyday practice at a high level of proficiency may be automatically identified by an LMS in accordance with the present disclosure, and may be solicited to act as a coach for their peers, both at their own work location and, using integrated social networking functionality, at other locations of the enterprise.

By changing the normally routine process of employee training into an enjoyable and rewarding activity, the gamification aspects that may be present in some representative embodiments of the present disclosure may exhibit improved worker/associate engagement, enthusiasm, and performance. An LMS in accordance with the present disclosure may support the specification of one or more parameters or business operational metrics, one or more respective thresholds for each metric, and a set of business rules to define the conditions in which worker/associate performance is below, meets, or exceeds various levels of proficiency and performance of the individual workers themselves, and of various associates at various locations of the enterprise. Using the information resulting from a comparison of the business operational data describing the work behavior and results of each member of the enterprise, and the business rules, a system in accordance with the present disclosure may automatically recommend and/or assign training.

With reference to the figures, and in particular with respect to the exemplary computer network 100 of FIG. 1, the following discloses various example systems and methods that support the creation and timely electronic scheduling and delivery of course materials for training of individuals in an organization via a computer network, to various forms of handheld or mobile devices and desktop computers such as those described above. To this end, a processing device 20'', illustrated in the exemplary form of a mobile communication device, a processing device 20', illustrated in the exemplary form of a computer system, and a processing device 20 illustrated in schematic form, are provided with executable instructions to, for example, provide a means for a customer, e.g., a user, consumer, etc., or a sales associate, a customer service agent, and/or others to access a host system server 68 and, among other things, be connected to a learning management system, a content management system, an electronic publication system, a hosted social networking site, a user profile, and/or a sales associate. Generally, the computer executable instructions reside in program modules which may include routines, programs, objects, components, data structures, etc. that perform particular tasks or implement particular abstract data types. Accordingly, the processing devices 20, 20', 20'' illustrated in FIG. 1 may be embodied in any device having the ability to execute instructions such as, by way of example, a personal computer, mainframe computer, personal-digital assistant ("FDA"), cellular telephone, tablet, e-reader, smart phone, or the like. Furthermore, while described and illustrated in the context of a single processing device 20, 20', 20'', the various tasks described hereinafter may be practiced in a distributed environment having multiple processing devices linked via a local or wide-area network whereby the executable instructions may be associated with and/or executed by one or more of multiple processing devices.

For performing the various tasks in accordance with the executable instructions, the example processing device 20 includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer-readable instructions, data structures, program modules and other data for the processing device 20. Other types of non-transitory computer-readable media that can store data and/or instructions may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser), other program modules 50, and/or program data 52. Still further, computer-executable instructions may be downloaded to one or more of the computing devices as needed, for example via a network connection.

To allow a user to enter commands and information into the processing device 20, input devices such as a keyboard 54 and/or a pointing device 56 are provided. While not illustrated, other input devices may include a microphone, a joystick, a game pad, a scanner, a camera, touchpad, touch screen, etc. These and other input devices are typically connected to the processing unit 22 by means of an interface 58 which, in turn, is coupled to the bus 26. Input devices may be connected to the processor 22 using interfaces such as, for example, a parallel port, game port, FireWire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as, for example, speakers, cameras, printers, or other suitable device.

As noted, the processing device 20 may also utilize logical connections to one or more remote processing devices, such as the host system server 68 having associated data repository 68A. In this regard, while the host system server 68 has been illustrated in the exemplary form of a computer, the host system server 68 may, like processing device 20, be any type of device having processing capabilities. Again, the host system server 68 need not be implemented as a single device but may be implemented in a manner such that the tasks performed by the host system server 68 are distributed amongst a plurality of processing devices/databases located at different geographical locations and linked through a communication network. Additionally, the host system server 68 may have logical connections to other third party systems via a network 12, such as, for example, the Internet, LAN, MAN, WAN, cellular network, cloud network, enterprise network, virtual private network, wired and/or wireless network, or other suitable network, and via such connections, will be associated with data repositories that are associated with such other third party systems. Such third party systems may include, without limitation, systems of banking, credit, or other financial institutions, systems of third party providers of goods and/or services, systems of shipping/delivery companies, media content providers, document storage systems, etc.

For performing tasks as needed, the host system server 68 may include many or all of the elements described above relative to the processing device 20. In addition, the host system server 68 would generally include executable instructions for, among other things, coordinating creation, storage, retrieval, and delivery of documents and media content, social networking, storage of a shopping list, receiving a location of a customer via a mobile device, receiving a request for a service call center connection from either a customer or a sales associate, routing the request via a distributed mobile video call center, providing a service call infrastructure for providing the requestor with a distributed customer service experience.

Communications between the processing device 20 and the host system server 68 may be exchanged via a further processing device, such as a network router (not shown), that is responsible for network routing. Communications with the network router may be performed via a network interface component 73. Thus, within such a networked environment, e.g., the Internet, World Wide Web, LAN, cloud, or other like type of wired or wireless network, program modules depicted relative to the processing device 20, or portions thereof, may be stored in the non-transitory memory storage device(s) of the host system server 68.

A representative embodiment of the present disclosure may be used to create course content, and automatically assign or recommend training based on actual, day-to-day worker performance information. Such a representative embodiment may also track the enrollment in, delivery of, and progress of training of the worker for those members of an enterprise that have been assigned or recommended for training relevant to their work.

Figure 2:
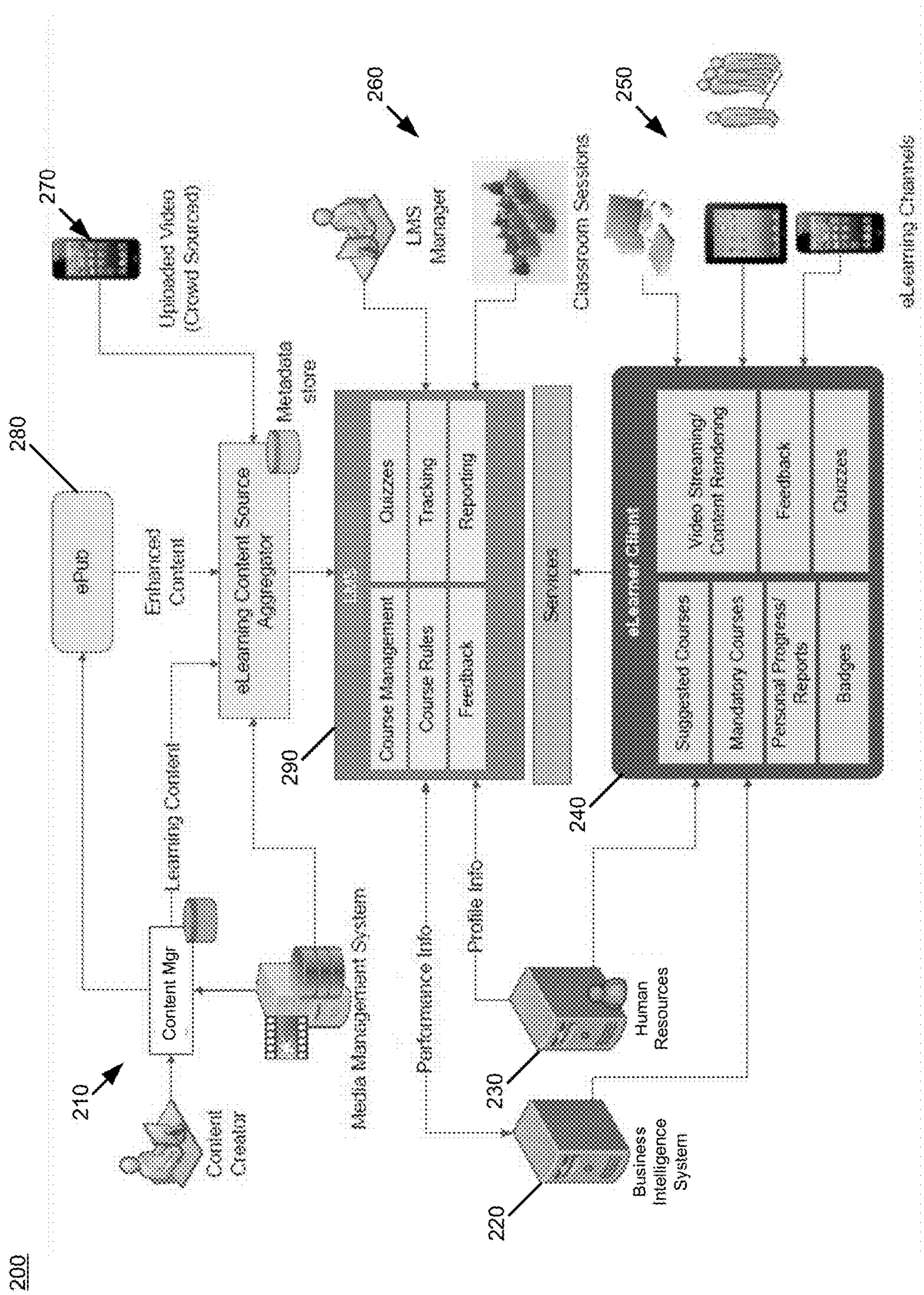
FIG. 2 is a block diagram illustrating an example enterprise system comprising a learning management system, in accordance with a representative embodiment of the present disclosure.

FIG. 2 is a block diagram illustrating an example enterprise system 200 comprising a learning management system 290, in accordance with a representative embodiment of the present disclosure. The enterprise system 200 comprises a content management system 210, a media management system 214, a business intelligence system 220, a human resources system 230, an eLearner client 240, and an ePub creator system 280. In a representative embodiment of the present disclosure, various forms of content created by a content creator 212 may, for example, be stored by content manager 210 and may be aggregated with content from the media management system 214, the ePub creator system 280, and "crowd-sourced" content (e.g., video) from one or more of user devices 270 for delivery to the workers/associates as part of course content, by the LMS 290. The workers/associates to whom training is provided may, for example, receive course content from the LMS 290 during sessions in a classroom setting 260, or at various other geographic locations (e.g., home, office, while traveling) employing any of a number of user devices 250 such as, for example, a desktop computer; a laptop, notebook, tablet, or other handheld computer; or any of the smart phone, e-readers, media players or similar electronic devices available now or in the future. An LMS manager 292 may oversee the operation of the LMS 290 locally or remotely via a local or public (e.g., the Internet) network using a wired or wireless path to the user device, and may monitor progress of those receiving training, manage training materials and course schedules, and control and track overall LMS operation.

The LMS 290 may be implemented on a single computer or a cluster of computers, each having one or more processors. The LMS 290 includes functionality to support course management, course rules, course feedback, the administration of quizzes and/or tests, the tracking of course enrollment and worker/associate progress, and the generation of various reports outlining course enrollment, course completion, training campaigns, materials delivered, and training achievements of workers/associates of the enterprise.

The functionality of the eLearner client 240 may be co-located with the LMS 290, may be implemented as an application on the user devices 250, or may be split and spread across the LMS 290 and the user devices 250. The eLearning client 240 provides functionality providing support for video streaming and content rendering, suggestions of courses to workers/associates including the identification of mandatory courses, the display of information about personal progress of workers/associates, identifying badges or other awards related to training and job-performance accomplishments, feedback from their coach(es), and the administration of course quizzes and/or tests to the workers/associates.

The ePub creator system 280 may be used to create content in the form of electronic publications (ePubs) that may include text, still images, and links to video content, web sites, and other media materials in a page-by-page viewing format. One example of such a system for ePub creation is documented in U.S. patent application Ser. No. 13/844,814 filed Mar. 16, 2013, the complete subject matter of which is hereby incorporated herein by reference, in its entirety.

The business intelligence system 220 may comprise one or more computer systems geographically co-located or remote from one another, in which the software applications executing on the computer system(s) gather various data from the operation of an enterprise, and may provide statistical information derived from the gathered data. The statistical information is representative of various aspects of the operation of the enterprise. In one example business that is engaged in retail sales of goods and/or services, the data gathered by the business intelligence system 220 may include, by way of example and not limitation, transaction information identifying time and date for the start and/or completion of the transaction, information identifying the items/services that were part of the transaction, information identifying the nature of the transaction (i.e., whether an item/service was purchased/returned/cancelled), the price of each of the items/services in the transaction, the total amount of the transaction, information identifying the customer, information identifying the worker/associate handling the transaction for the enterprise, and information identifying the location in the enterprise at which the transaction took place. The business intelligence system 220 may collect and use such information to track transactions occurring throughout an enterprise, and may derive from that data various statistics on various levels of granularity, including per worker/associate, per department or group, per store/enterprise location, by country, and over the entire enterprise (e.g., globally). Such tracking of transactions may occur over a period of time, providing a historical perspective, enabling the business intelligence system 220 to calculate various statistical information related to the operational performance of the enterprise at various levels of granularity, as it changes over time.

The human resources system 230 maintains employment related information about the worker/associates of the enterprise. The human resources system 230 may comprise one or more computer system geographically co-located or dispersed about the enterprise. The human resources system 230 may provide worker/associate profile information to the LMS 290 for use in scheduling training delivery and training campaign rollout, and for making training recommendations for both individual worker/associate situations and for region-wide national training campaign planning and delivery.

The media management system 214 supports production, storage, management, and delivery of streaming media including live video content, as well as content retrieved from sources external to the enterprise.

The enterprise system 200 may also make use of "crowd-sourced" content for training purposes such as, for example, that available from user device(s) 270, which may be any desktop, laptop, notebook, or handheld personal computer, smart phone, or other electronic user device available now or in the future. In a representative embodiment of the present disclosure, such user devices may be used to provide live or stored streaming video or still image content that may be used as part of training for other workers/associates of the enterprise. For example, one or more user device(s) 270 may be employed to "crowd source" content from the sales floor, from their own home(s), from a competitor location, or various other sites, to provide portions of the training delivered to the workers/associates receiving training through the LMS 290 of FIG. 2.

Figure 3:
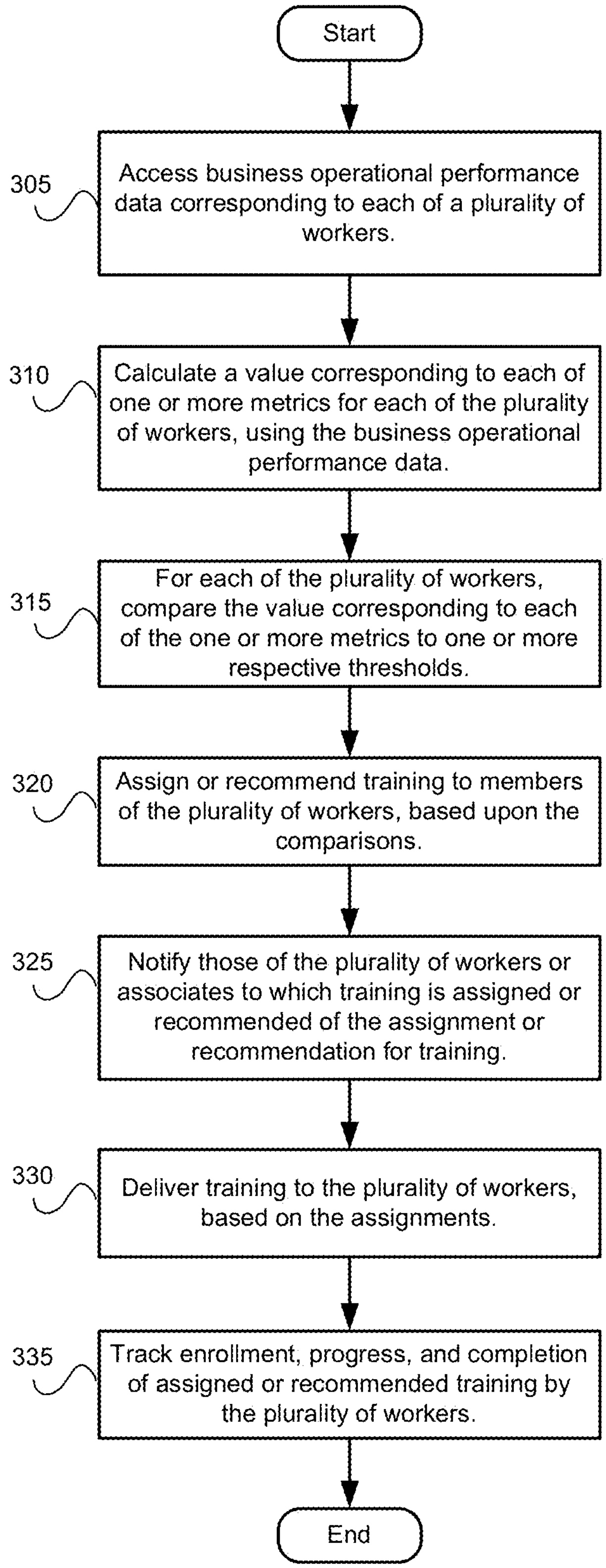
FIG. 3 is a flowchart illustrating the actions performed by an example method of recommending or assigning training for workers or associates of an enterprise based on operational performance metrics of the enterprise, in accordance with a representative embodiment of the present disclosure.

FIG. 3 is a flowchart 300 illustrating the actions performed by an example method of recommending or assigning training for workers or associates of an enterprise based on operational performance metrics of the enterprise, in accordance with a representative embodiment of the present disclosure. The following description may make reference to elements of FIG. 1 and FIG. 2. In the example of FIG. 3, an enterprise such as, by way of example and not limitation, an enterprise engaged in sales of products and/or services having a computer network such as the computer network 100 of FIG. 1 may establish an enterprise system in accordance with a representative embodiment of the present disclosure, such as the enterprise system 200 of FIG. 2. It should be noted that the elements and interconnections shown in FIG. 1 and FIG. 2 are for purposes of illustration, and are not intended to be limiting, but that other elements and arrangements having different interconnections may be employed in performing the actions of the example method of FIG. 3, without departing from the spirit and scope of the present disclosure.

The method of FIG. 3 begins at block 305, where the method directs a computer system such as the LMS 290 of FIG. 2 to access business operational performance data corresponding to each of the plurality of workers/associates of the enterprise. Such data may reside, for example, in a computer system such as the business intelligence system 220 of FIG. 2. As described above, a system such as the business intelligence system 220 may gather various data from the operations of an enterprise such as, by way of example and not limitation, businesses involved in sales of products or services, or companies that manufacture products, and may provide statistical information derived from the gathered data, where that gathered data is reflective of the level of performance of workers or associates of the enterprise. In an enterprise engaged in sales of products or services, the data may include, as described above, various information about customer transactions handled by the worker or associate.

Next, at block 310, the method may cause the calculation of values corresponding to one or more metrics for each of the plurality of workers in the enterprise, using the business operational performance data gathered by, for example, a system such as the business intelligence system 220 of FIG. 2. The method may then, at block 315, for each of the plurality of workers or associates, compare the values of each of the one or more metrics to one or more respective thresholds, to determine whether the values are below, equal to, or above each of the one or more respective thresholds. Then, at block 320, the method of FIG. 3 may assign or recommend training to members of the plurality of workers or associates, based upon results of the comparisons. A system such as the LMS 290 of FIG. 2 may then be directed by the method of FIG. 3, at block 325, to notify those of the plurality of workers to whom training has been assigned or recommended, of the assignment or recommendation for training, and at block 330, may deliver the assigned or recommended training to those to which training was assigned or recommended. Finally, the method of FIG. 3, at block 335, may track enrollment, progress, and completion of the training assigned or recommended to the plurality of workers or associates. Although the method of FIG. 3 is illustrated to begin at block 305 and end at block 335, it will be appreciated that the actions of the method may be repeated at whatever interval and however many times is desired.

Figure 4:
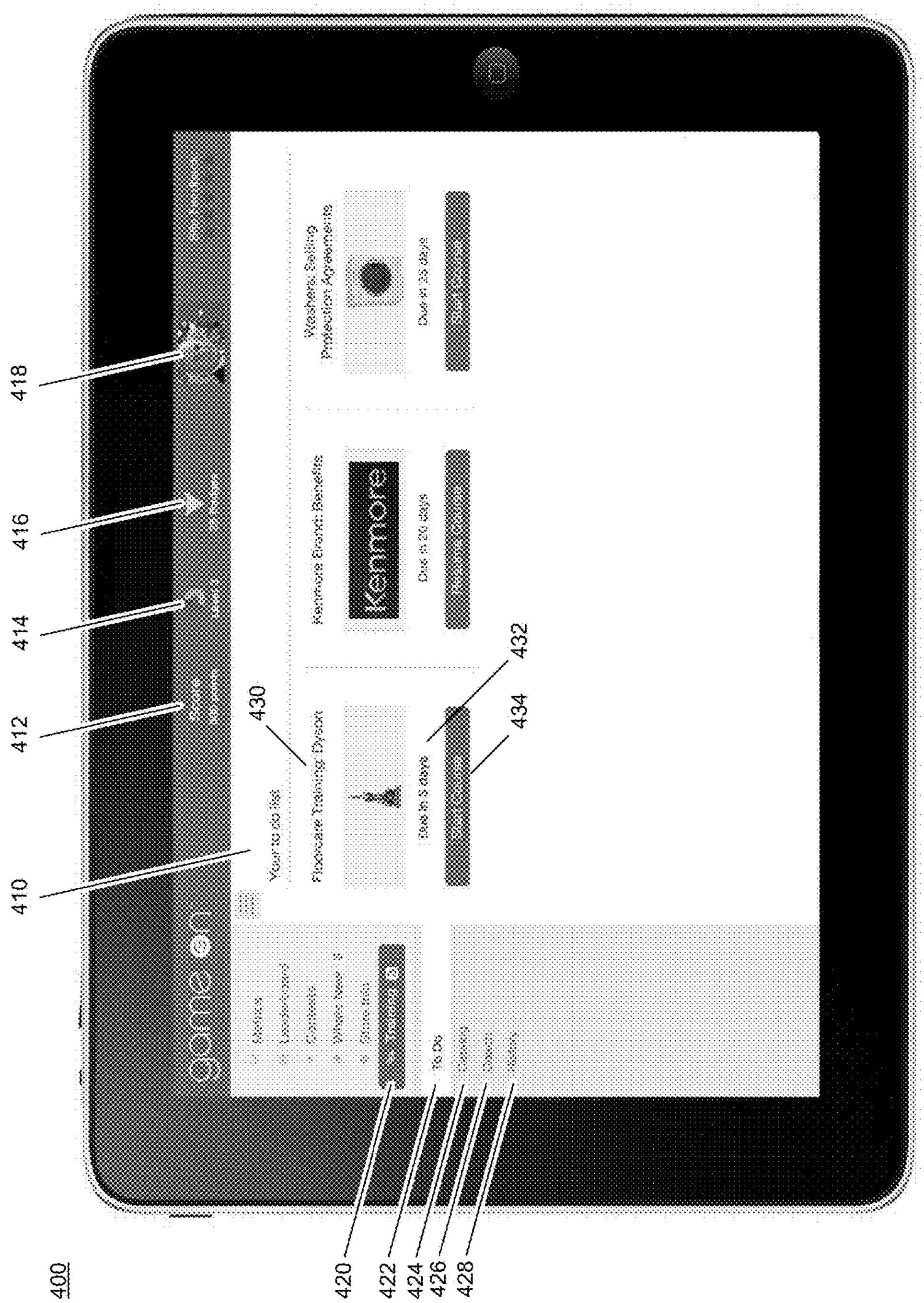
FIG. 4 is an illustration of a screen image of a user device displaying an example "to do" list screen, in accordance with a representative embodiment of the present disclosure.

FIG. 4 is an illustration of a screen image of a user device 400 displaying an example "to do" list screen 405, in accordance with a representative embodiment of the present disclosure. As shown in the illustration of FIG. 4, the "to do" list screen 405 comprises an area at the top that includes features related to the "gamification" aspects of the present disclosure including, by way of example and not limitation, an identifier 418 of the user (e.g., worker or associate), the current score 412 for the user, the level of accomplishment 414, and the number of "badges" 416 that the user has earned for various accomplishments. The "to do" screen 405 also comprises an area at the left edge that includes tabs for "Metrics," a "Leader board," "Contests," "What's New," "Store Info," and a "Training" tab 420, which is shown as selected in FIG. 4. In the example of FIG. 4, selection of the "Training" tab 420 causes the display of additional user selectable tabs related to "Training" that include, by way of example and not limitation, a "To Do" tab 422, a "Catalog" tab 424, a "Coach" tab 426, and a "History" tab 428.

In the example of FIG. 4, the "To Do" tab 422 has been selected by the user, which causes the display of an area showing training courses to be taken (i.e., the "to do" list). The example of FIG. 4 shows three sections identifying example training courses that have been assigned to the user, in which each assigned training course is identified by a course identifier 430, a course completion deadline 432, and a start button 434 to enable the user to begin the course presentation.

Figure 5:
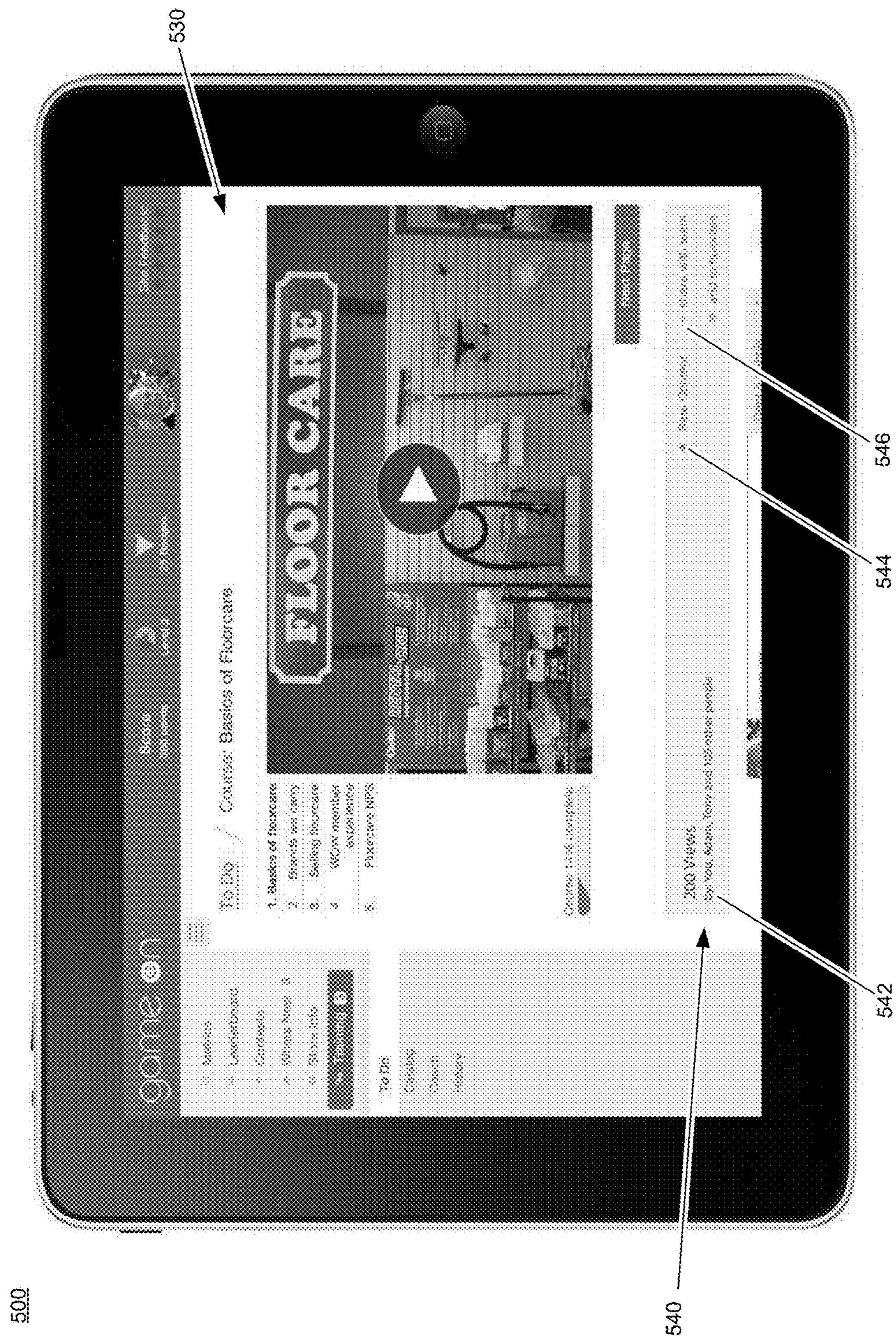
FIG. 5 is an illustration of a screen image of an example user device displaying a portion of a training course that may have appeared on a "to do" list such as the "to do" list of FIG. 4, in accordance with a representative embodiment of the present disclosure.

FIG. 5 is an illustration of a screen image of an example user device 500 displaying a portion of a training course that may have appeared on a "to do" list such as the "to do" list 410 of FIG. 4, in accordance with a representative embodiment of the present disclosure. As in FIG. 4, the screen image of FIG. 5 shows the features related to the "gamification" aspects of the present disclosure near the upper edge of the display, and the area at the left edge that includes various tabs including tabs for "Metrics," a "Leader board," "Contests," "What's New," "Store Info," and a "Training" tab. The remaining area of the display includes a portion used to display course content 530, and an area near the bottom edge of the display 540, which shows aspects of the present disclosure related to social networking and interaction of the workers or associates of the enterprise. For example, the illustration of FIG. 5 includes viewing information 542 that tells the user the number of times the displayed course content has been viewed, and identifies the names of some of the viewers of the course content that may be known to the user. In addition, the user may choose to select a rating link 544 that allows the user to rate the course content, and a share link 546 that permits the user to share the course content with other workers or associates.

Figure 6:
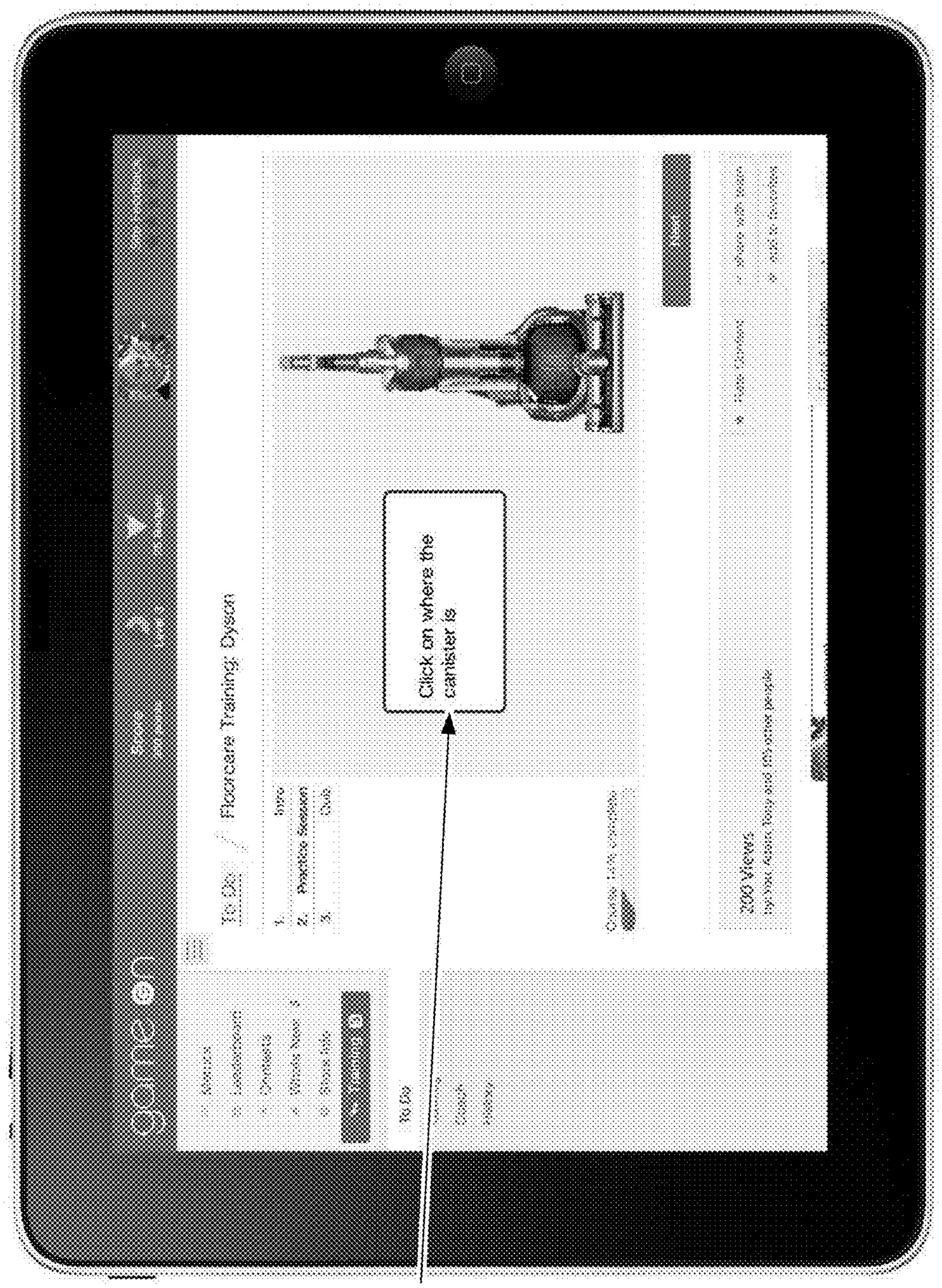
FIG. 6 is an illustration of an example screen image of a user device illustrating the use of interactive learning feature allowing the user to indicate their recognition of elements of a picture of a product, in accordance with a representative embodiment of the present disclosure.

FIG. 6 is an illustration of an example screen image of a user device 600 illustrating the use of interactive learning feature allowing the user to indicate their recognition of elements of a picture of a product, in accordance with a representative embodiment of the present disclosure. As in FIGS. 4-5, the illustration of FIG. 6, shows the features related to the "gamification" aspects of the present disclosure near the upper edge of the display, and the area having aspects of the present disclosure related to social networking and interaction in an area near the bottom edge of the display. The training content portion of FIG. 6 shows an example prompt 650 asking the user to indicate the location of the "canister" feature of the illustrated vacuum cleaner, by clicking/selecting the "canister" feature, demonstrating the interactive nature of content produced by an LMS in accordance with the present disclosure. Whether the worker correctly identifies the named feature of the product may be used in determining success of the training, and recommendation or assignment of further training.

Figure 7:
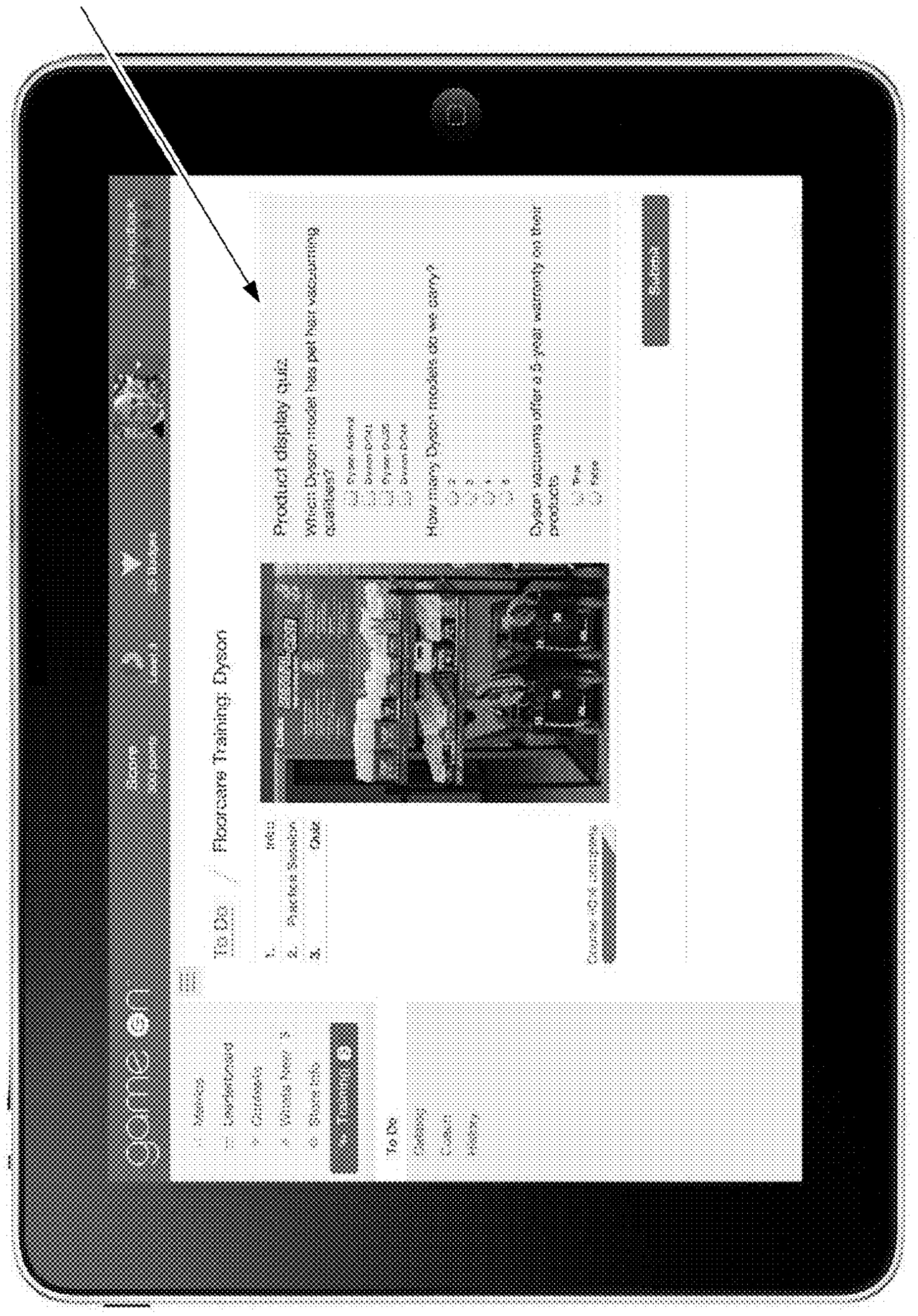
FIG. 7 is an illustration of an example screen image of a user device 700 illustrating a content portion including a course quiz, in accordance with a representative embodiment of the present disclosure.

FIG. 7 is an illustration of an example screen image of a user device 700 illustrating a content portion including a course quiz 752, in accordance with a representative embodiment of the present disclosure. As in FIGS. 4-6, the illustration of FIG. 7 includes the features related to the "gamification" aspects of the present disclosure near the upper edge of the display, and the area having aspects of the present disclosure related to social networking and interaction in an area near the bottom edge of the display. In the example of FIG. 7, the worker or associate is answering questions following review of course content for a course on their "to do" list. In a representative embodiment of the present disclosure, the answers provided by the user to the questions of the training course quiz 752 may be used both to determine the level of understanding of particular aspects or features of a product, service, or process, and may also be used to determine points to be awarded to the user as part of gamification aspects of a training activity, as may be employed in some representative embodiments of the present disclosure.

Figure 8:
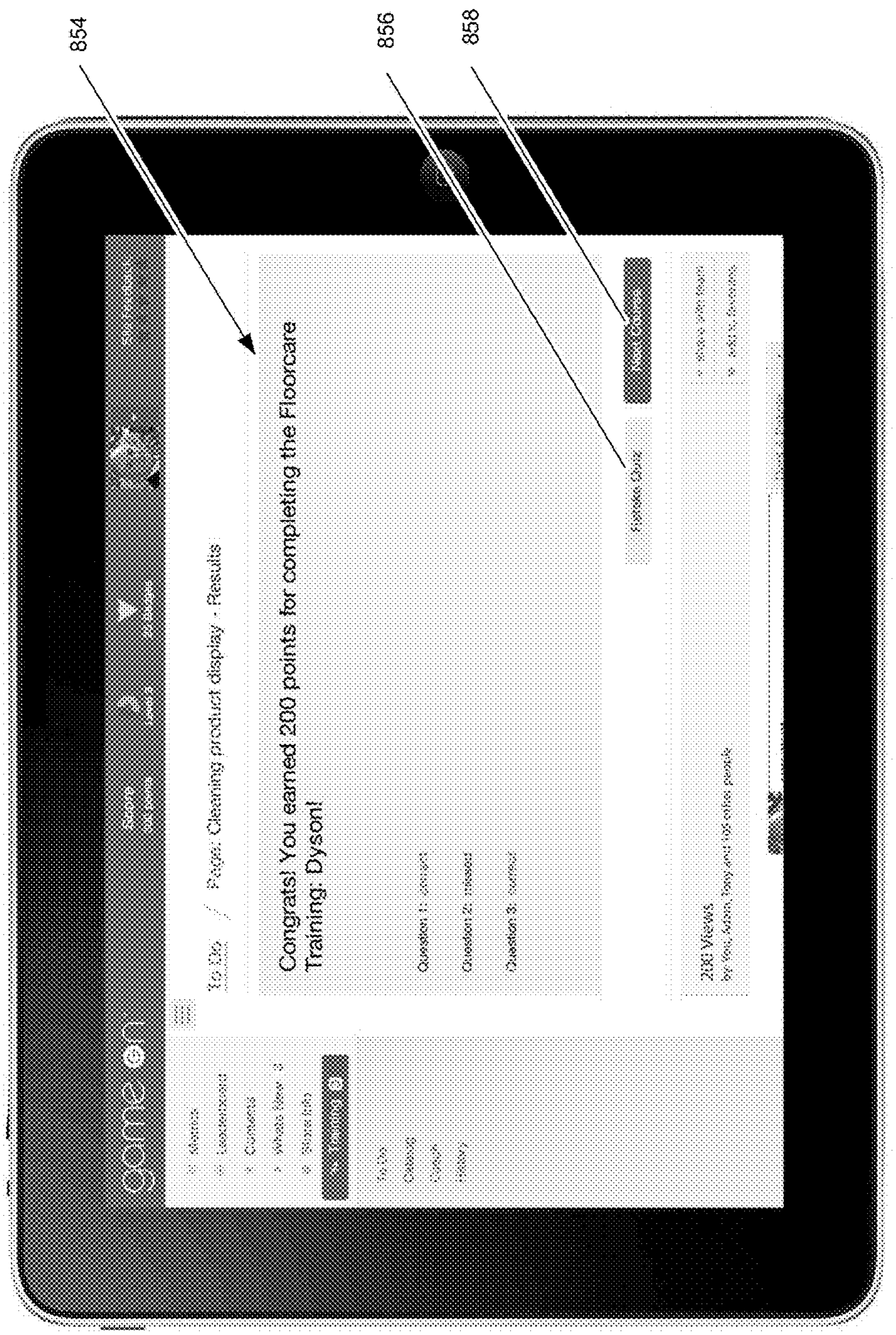
FIG. 8 is an illustration of an example screen image of a user device illustrating feedback to the user following entry of their responses to the questions of a training course quiz such as, for example, the course quiz of FIG. 7, in accordance with a representative embodiment of the present disclosure.

FIG. 8 is an illustration of an example screen image of a user device 800 illustrating feedback to the user following entry of their responses to the questions of a training course quiz such as, for example, the course quiz 752 of FIG. 7, in accordance with a representative embodiment of the present disclosure. As in FIGS. 4-7, the illustration of FIG. 8, again shows the features related to the "gamification" aspects of the present disclosure near the upper edge of the display, and the area near the bottom edge of the display having aspects of the present disclosure related to social networking and interaction. In the example of FIG. 8, the user is being presented with a congratulation message 854 for their successful completion of the training course, and is informed of the award of points that may be used in regard to the gamification aspects of some representative embodiments of the present disclosure. Following receipt of satisfactory course quiz results, as shown in FIG. 8, the worker or associate may take a next course on their "to do" list, by clicking/selecting on the "Next Course" button 858. If, however, the outcome of the course quiz was unsatisfactory, and the worker or associate feels that they can do better without retaking the training course, the user may simply elect to retake the course quiz, by clicking on the "Retake Quiz" button 856. Information about, for example, the training course taken, the subject matter of each question, the answers given by the user, and a user election to re-take quizzes or tests may be recorded for each user, for later inclusion in an automated process of recommending and/or assigning training to a user in the future.

Figure 9:
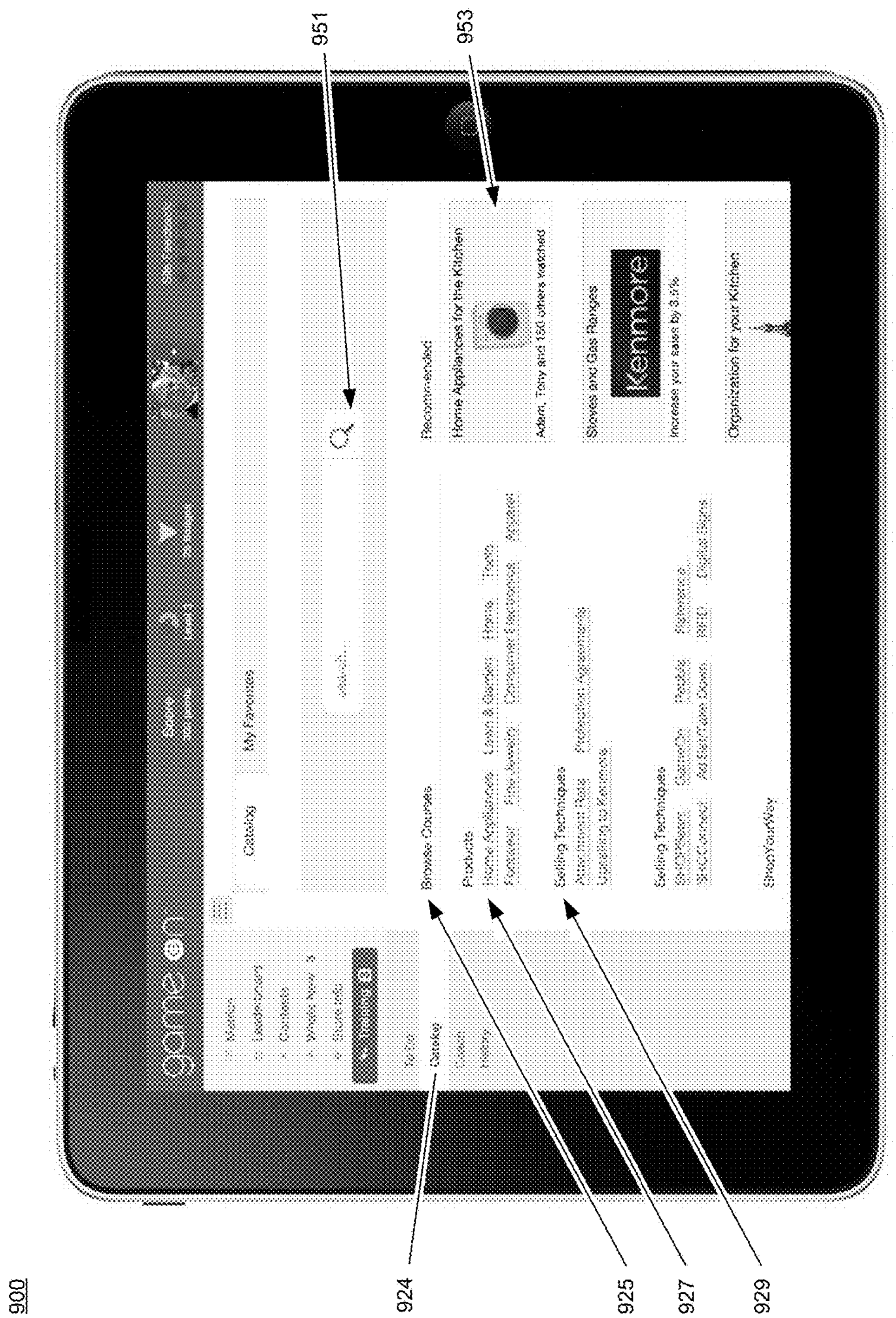
FIG. 9 is an illustration of an example screen image of a user device showing demonstrating availability of and access to a training course catalog, in accordance with a representative embodiment of the present disclosure.

FIG. 9 is an illustration of an example screen image of a user device 900 demonstrating availability of and access to a training course catalog, in accordance with a representative embodiment of the present disclosure. Again, as in FIGS. 4-8, the illustration of FIG. 9, includes features related to the "gamification" aspects of the present disclosure near the upper edge of the display, and the area near the bottom edge of the display having aspects of the present disclosure related to social networking and interaction. In the illustration of FIG. 9, the user has selected the "Catalog" tab 924 discussed above, and is presented with a "Search Box" 951, to enable them to quickly find training courses by, for example, title, category of product, department or organization of the enterprise, or other identifier, characteristic, or parameter. The example of FIG. 9 also permits the user to request information on training courses by identifying a group of "Products" links 927 that may be selected to view available courses relevant to product categories, and a "Selling Techniques" link 929 to request information on training relevant to various aspects of a sales transaction.

In addition, some of the available courses recommended for the user may be shown at the lower right-hand corner of the screen image, as illustrated by the "Home Appliances for the Kitchen" training course entry 953. In accordance with a representative embodiment of the present disclosure, such a course recommendation may includes social networking aspects such as the identification of the number of others in the enterprise that have taken the recommended training course along with the names of other course participants (e.g., shown as part of the "Home Appliances for the Kitchen" training course entry 953) that may be known to the worker or associate viewing the screen image.

Figure 10:
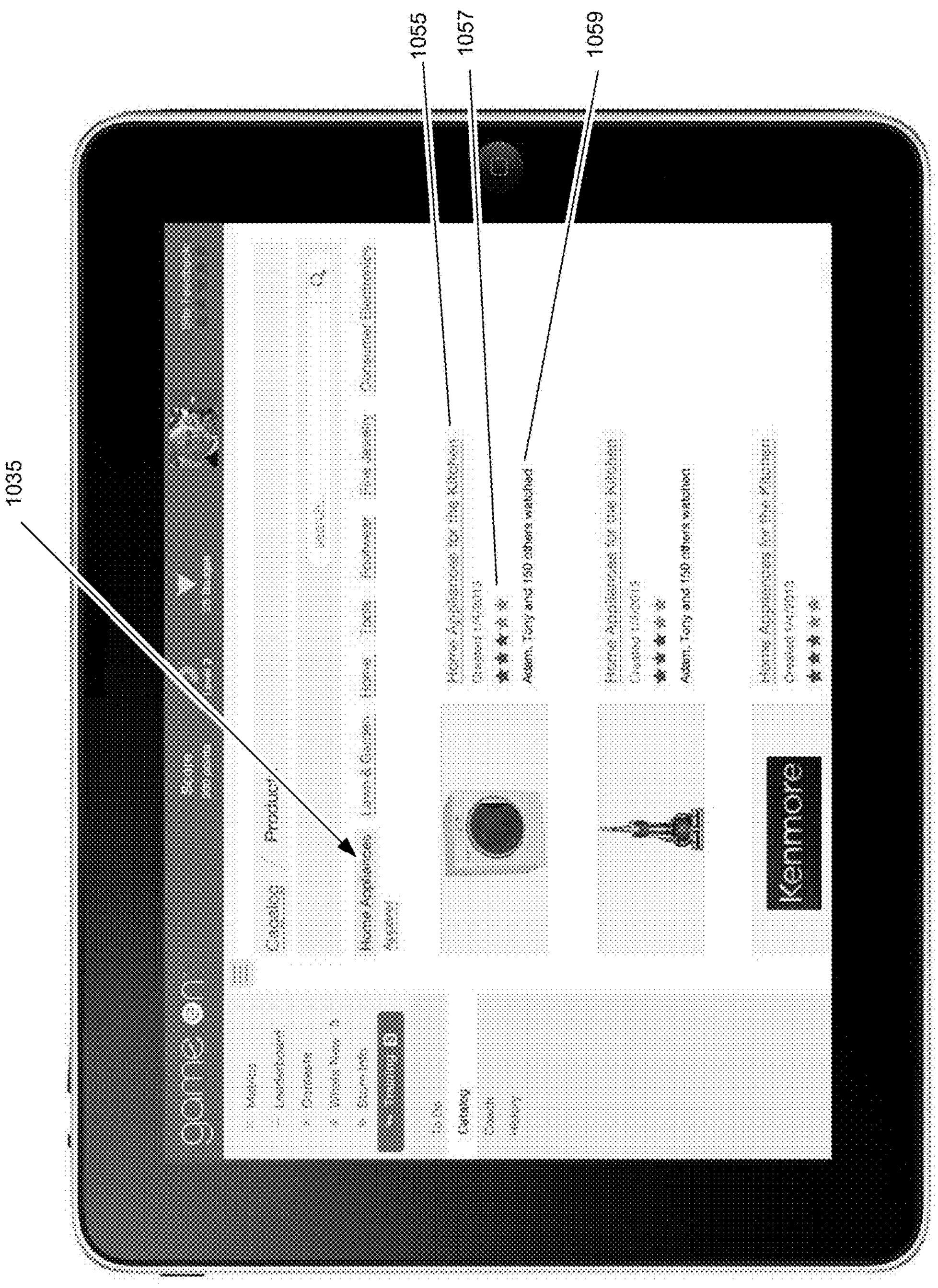
FIG. 10 illustrates an example screen image of a user device showing training course catalog information displayed following user selection of a "Home Appliances" category of the group of "Products" links of FIG. 9, in accordance with a representative embodiment of the present disclosure.

FIG. 10 illustrates an example screen image of a user device 1000 showing training course catalog information that may be displayed following user selection of a "Home Appliances" category of the group of "Products" links 927 of FIG. 9, in accordance with a representative embodiment of the present disclosure. Once more, as in FIGS. 4-9, the illustration of FIG. 10, includes features related to the "gamification" aspects of the present disclosure near the upper edge of the display, and the area near the bottom edge of the display having aspects of the present disclosure related to social networking and interaction. In the example illustration of FIG. 10, the user has selected "Home Appliances" category 1035, and a number of training courses are represented such as the course entry 1055 for "Home Appliances for the Kitchen." The compact entry 1055 provides useful information such as the date on which the course was created, the rating 1057 of the training course by those that have taken it, and participation information 1059 that helps the user/viewer to understand in a social context the number of members of the enterprise that have taken this particular course, and the names of some of the participants/learners that the user may know. In this way, the user viewing the screen image of FIG. 10 can assess the reaction of the participants that have taken the course, and may be provided with names of those they may know, so that the user can contact them for additional personal views on this specific course.

Figure 11:
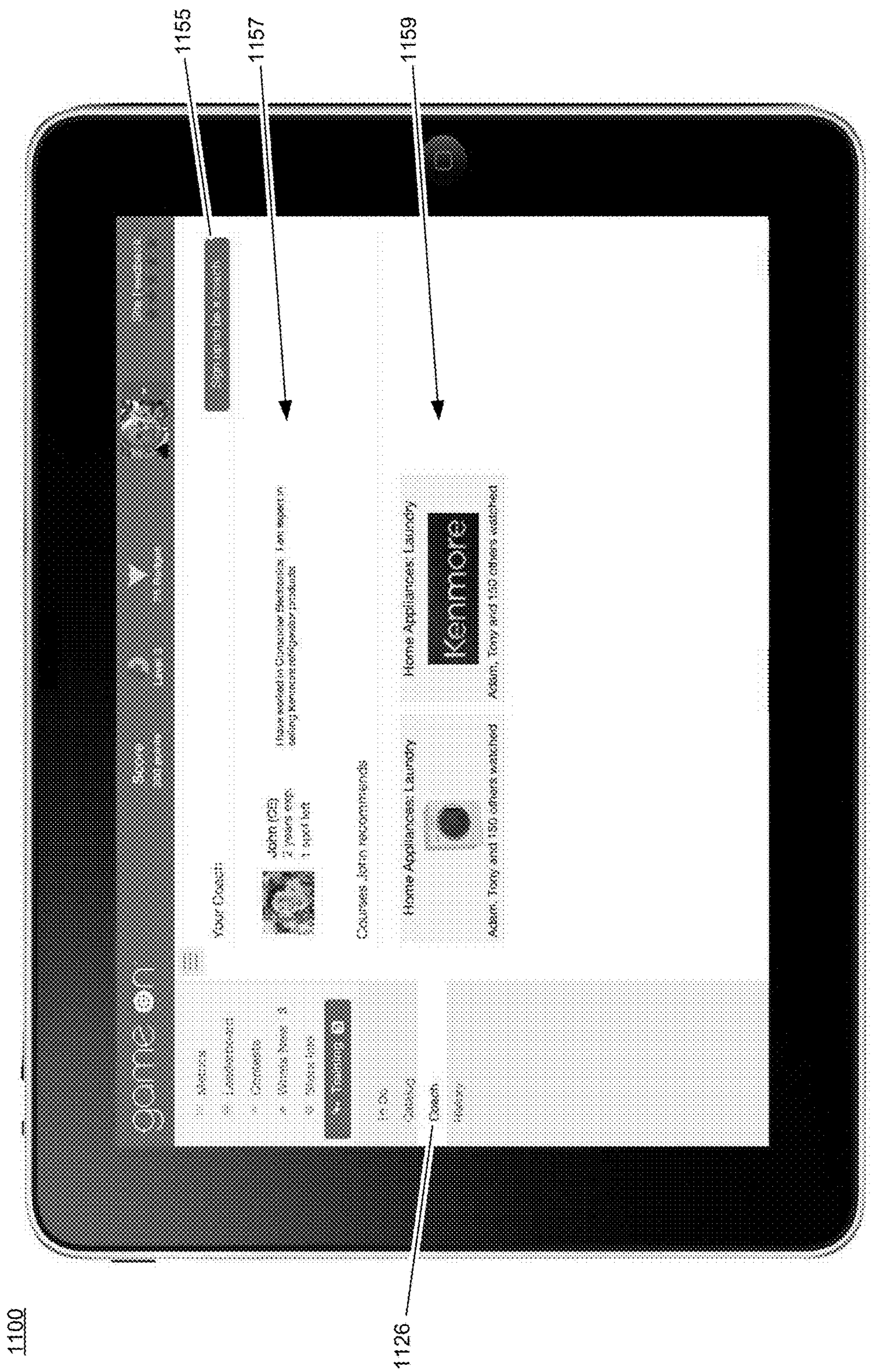
FIG. 11 is an illustration of an example screen image of a user device displaying information about a "Coach" assigned to the viewer, following selection of the "Coach" tab that may correspond to the "Coach" tab of FIG. 4, in accordance with a representative embodiment of the present disclosure.

FIG. 11 is an illustration of an example screen image of a user device 1100 displaying information about a "Coach" assigned to the viewer, following selection of the "Coach" tab 1126 that may correspond to the "Coach" tab 426 of FIG. 4, in accordance with a representative embodiment of the present disclosure. The screen image of FIG. 11 once again includes the features related to the "gamification," and the social networking and interaction aspects of the present disclosure illustrated in FIGS. 4-10. The illustration of FIG. 11 shows coach information 1157 that may, for example, include a photographic image of the member of the enterprise that will be acting as "coach" to the viewer, along with their name, the department or organization in which they work, information describing their work experience, and an indication of how many coaching openings or "spots" that the identified individual has available for coaching new workers or associates. The illustration of FIG. 11 also shows training course information 1159 that identifies one or more training courses that the coaching member identified by coach information 1157 is currently recommending to the viewer under his guidance. In addition, the illustration of FIG. 11 includes a "Sign up to be a coach" button 1155, to enable an individual that has significant experience and/or training to self-identify and to express their interest in acting as a "coach" to other members of the enterprise.

Figure 12:
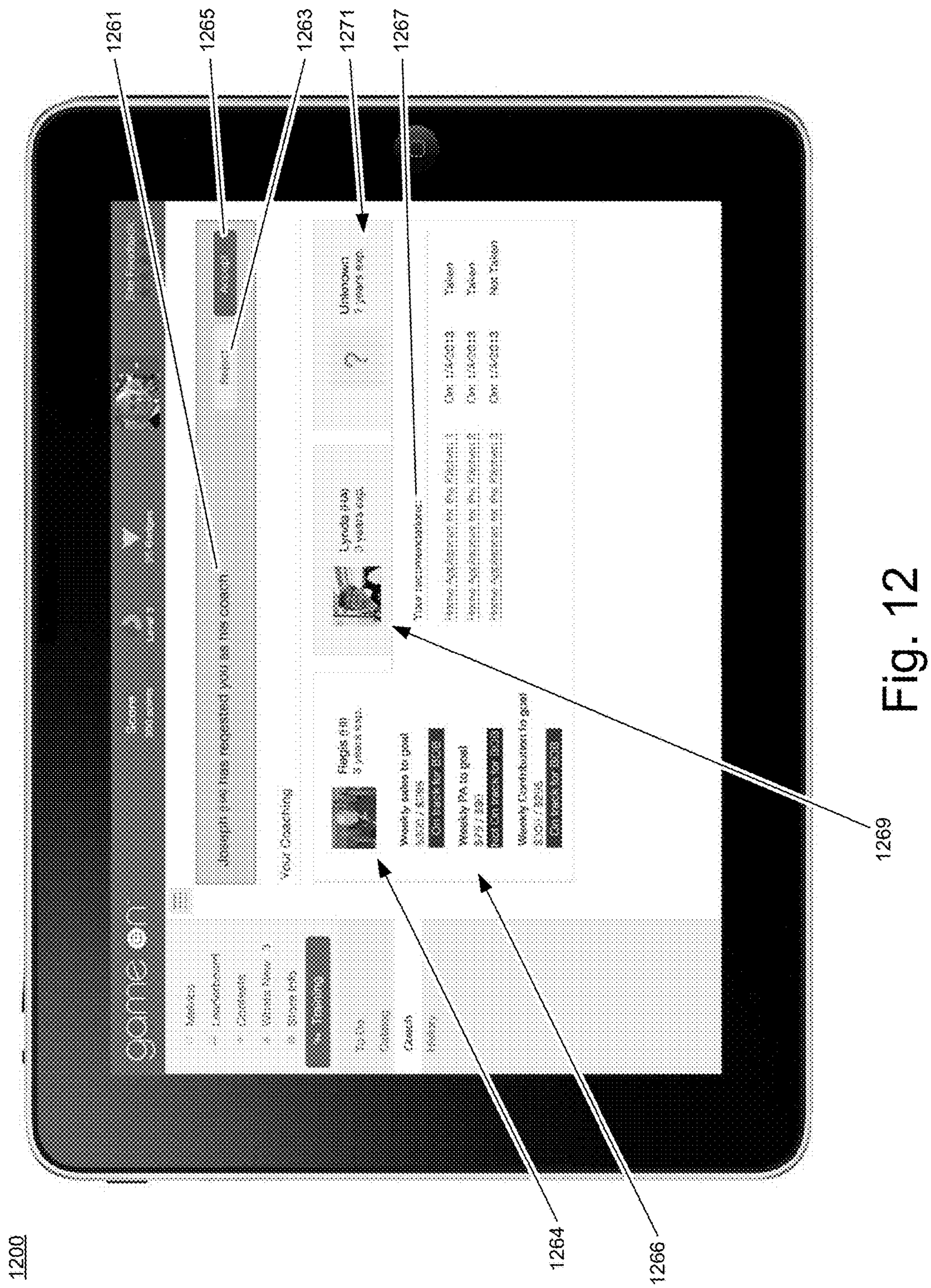
FIG. 12 is an illustration of an exemplary screen image of a user device showing a page of information for an individual identified as a "Coach," in accordance with a representative embodiment of the present disclosure.

FIG. 12 is an illustration of an exemplary screen image of a user device 1200 showing a page of information for an individual identified as a "coach," in accordance with a representative embodiment of the present disclosure. The screen image of FIG. 12 includes the common features related to the "gamification," and the social networking and interaction aspects of the present disclosure illustrated in FIGS. 4-11. In addition, the illustration of FIG. 12 includes an alert 1261 indicating that an identified worker or associate (i.e., "Joseph") has requested that the viewer for whom the screen image of FIG. 12 was displayed be assigned as that individual's (i.e., "Joseph's") coach. The viewer may accept or rejected the request using the "Accept" button 1265 or "Reject" button 1263, respectively.

The illustration of FIG. 12 also includes information about two individuals currently assigned to receive coaching from the viewer (i.e., "Regis" 1264 and "Linda" 1269) and an indication (i.e., "Unknown" tab 1271) of the ability of the viewer to accept coaching of one additional individual. In the illustrative example of FIG. 12, the tab for "Regis" 1264 is shown as active, and additional details for "Regis" 1264 are also displayed, including his progress in achieving various goals 1266, and information about training courses that the viewer as coach made to "Regis" 1264. Such goals may include, by way of example and not limitation, a listing of courses 1267 that have been recommended, the dates on which those recommendations were made, and whether or not those recommendations have been acted upon.

Figure 13:
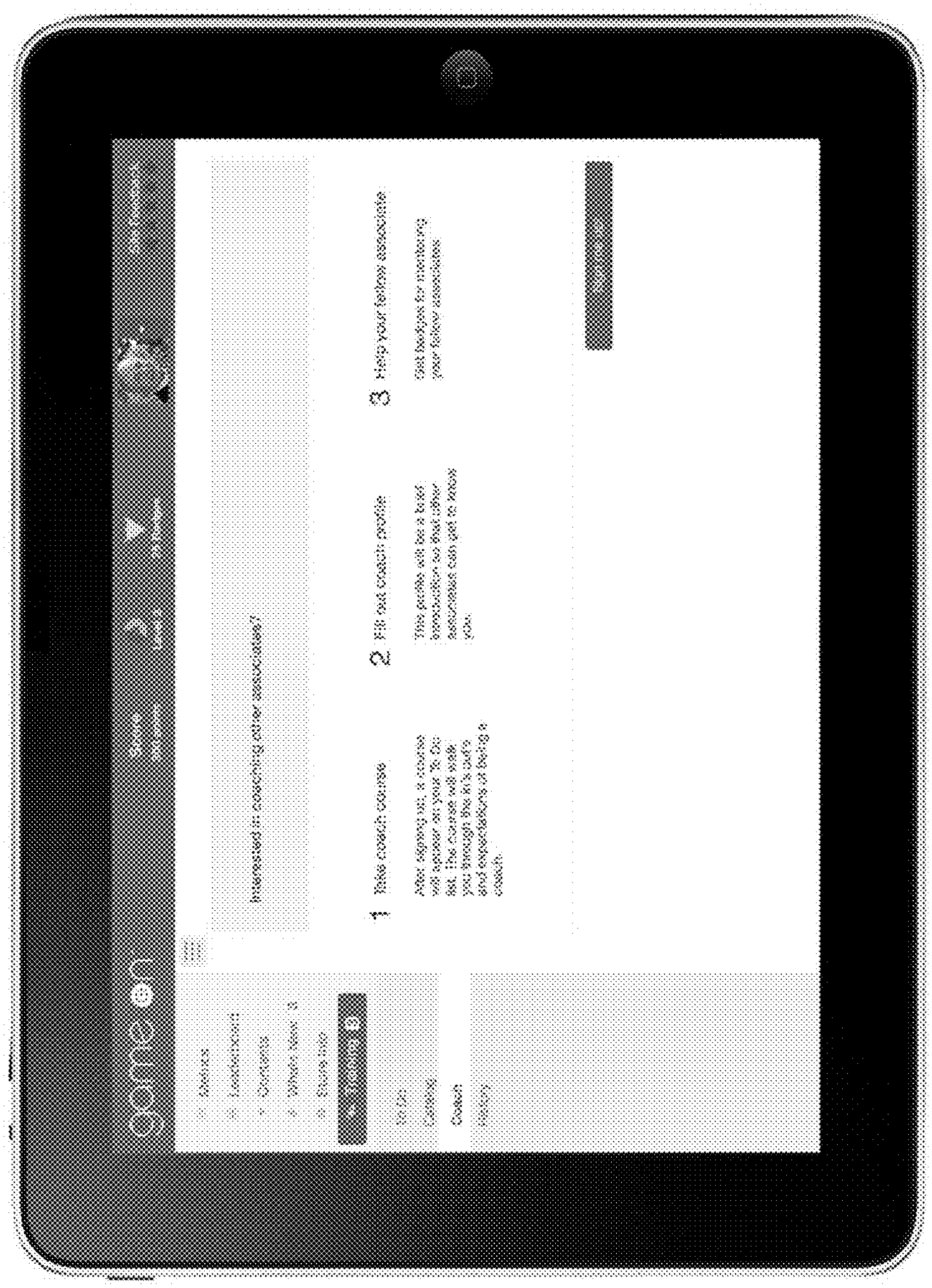
FIG. 13 is an illustration of an exemplary screen image of a user device showing an example of a solicitation of a worker or associate to become a "Coach" for others in the enterprise, in accordance with a representative embodiment of the present disclosure.

FIG. 13 is an illustration of an exemplary screen image of a user device 1300 showing an example of a solicitation of a worker or associate to become a "coach" for others in the enterprise, in accordance with a representative embodiment of the present disclosure. As in FIGS. 4-12, the screen image of FIG. 13 includes features related to "gamification" and social networking and interaction, that may be part of a representative embodiment of the present disclosure. The solicitation of FIG. 13 (i.e., "Interested in coaching other associates?") may, for example, be sent only to those workers or associates of the enterprise that meet certain levels of job performance; have completed certain training courses (e.g., a "Coach Course") both with respect to, by way of example and not limitation, products or services, sales, business operations, manufacturing, or other aspects of the enterprise; and who have expressed an interest or willingness to act in the role of a "coach." The user viewing the screen image of FIG. 13 may also choose to fill out a "Coach Profile" to provide a brief introduction to enable other workers to get to know the "coach," and may be provided with information about earning "badges" for mentoring fellow workers.

Figure 14:
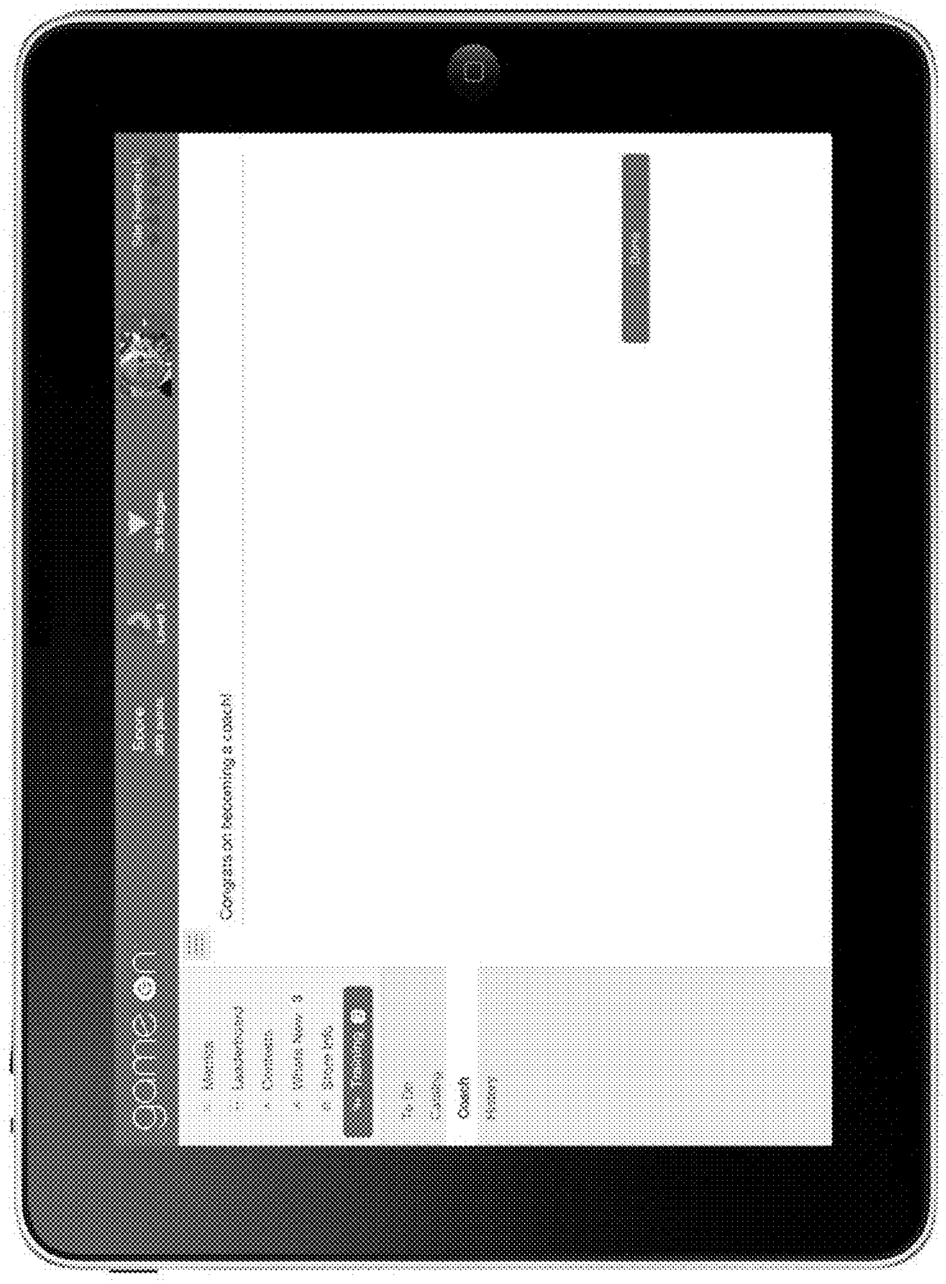
FIG. 14 is an illustration of an exemplary screen image of a user device showing a congratulatory message to the viewer regarding their assignment as a "Coach" in the enterprise, in accordance with a representative embodiment of the present disclosure.

FIG. 14 is an illustration of an exemplary screen image of a user device 1400 showing a congratulatory message to the viewer regarding their assignment as a "coach" in the enterprise, in accordance with a representative embodiment of the present disclosure.

Figure 15:
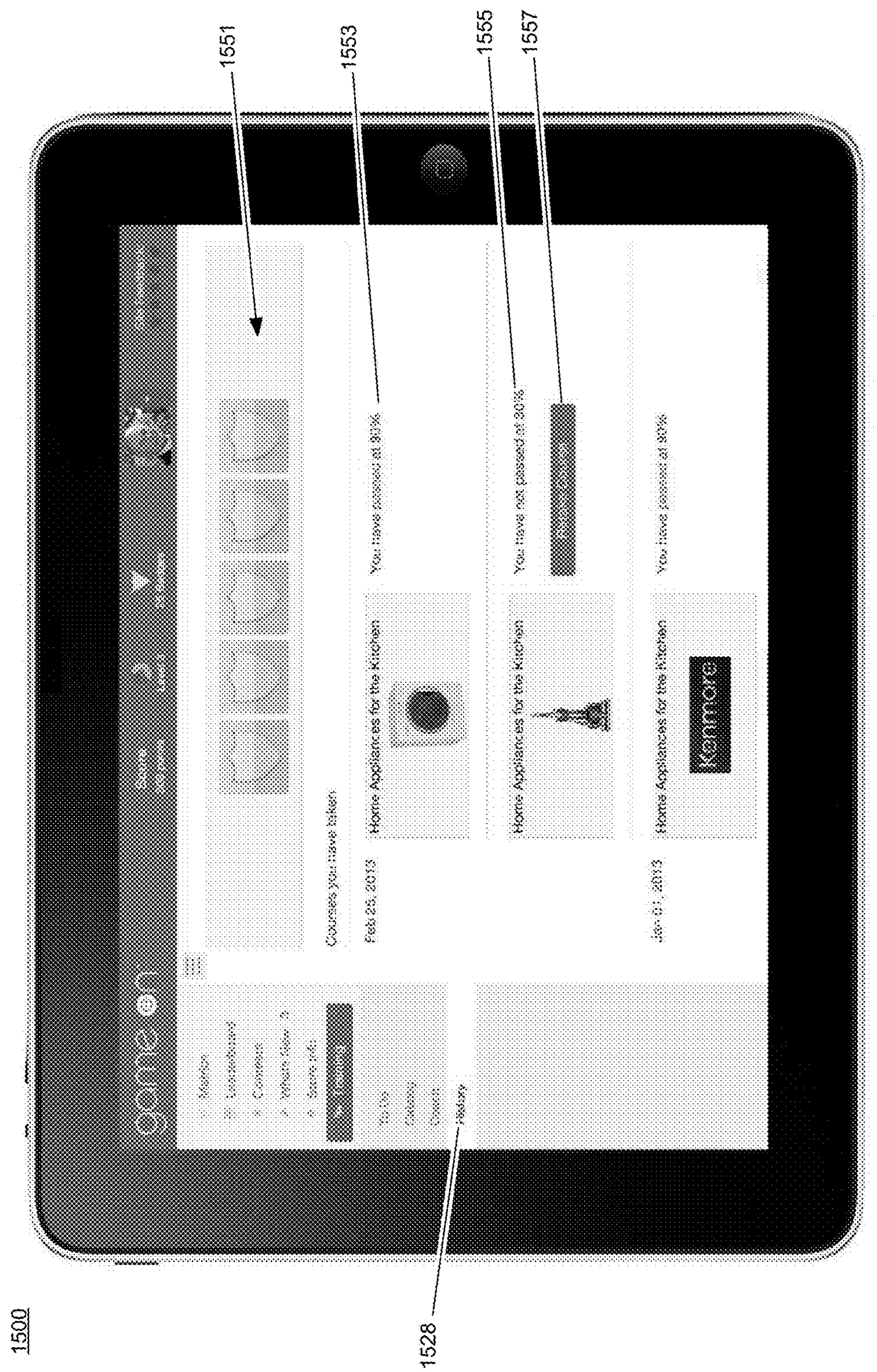
FIG. 15 shows an example screen image of a user device following selection of the "History" tab that may correspond to the tab of FIG. 4, in accordance with a representative embodiment of the present disclosure.

FIG. 15 shows an example screen image of a user device 1500 following selection of the "History" tab 1528 that may correspond to the tab 428 of FIG. 4, in accordance with a representative embodiment of the present disclosure. The screen image of FIG. 15 includes the features related to the "gamification," and the social networking and interaction aspects of the present disclosure illustrated in FIGS. 4-14. In addition, the example of FIG. 15 includes, among other things, a number of entries containing information identifying courses taken by the viewer, where each entry shows date of the course, a training course title, and status of the course. For example, in the entry 1553, the history information shows that the viewer took the "Home Appliances for the Kitchen" training course on Feb. 25, 2013, and passed the course with a grade of 90%, while in the entry 1555, the history information shows that the viewer has a grade of 30% and has not passed the respective course. In such an instance, the viewer may be offered the chance to retake the respective training course by selecting/clicking a "Retake Course" button 1557. Based on the viewer completion of training courses listed in their training history, a representative embodiment of the present disclosure may award points and/or badges based one or more levels of achievement, shown in FIG. 15 as example badges 1551.

Figure 16:
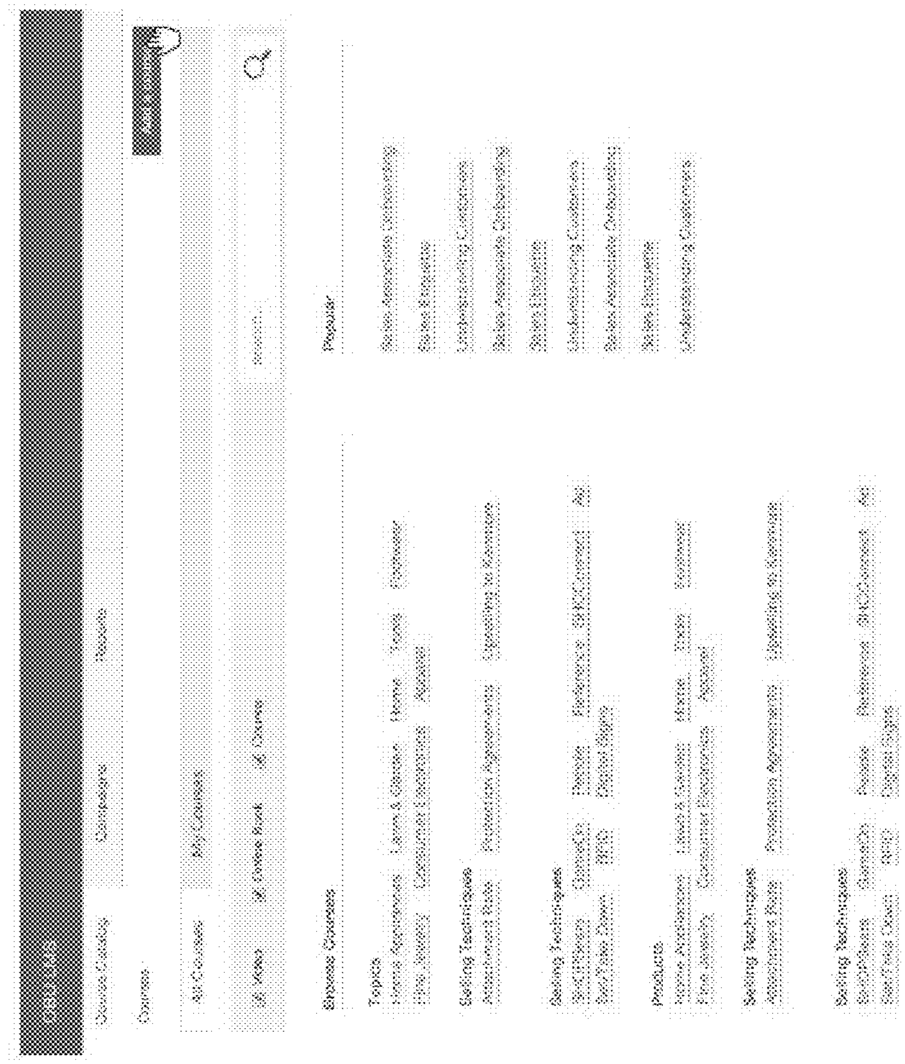
FIG. 16 is an illustration of an exemplary screen image of a user device, in accordance with a representative embodiment of the present disclosure.

FIG. 16 is an illustration of an exemplary screen image of a user device 1600, in accordance with a representative embodiment of the present disclosure. The screen image shown in FIG. 16 enables a user to review the entries in a course catalog according to the media format (e.g., "video," "online book," or "course."), and includes functionality allowing the user to search for particular courses. A tab (i.e., "My Courses") is also included that allows the user to view their own courses. The user may view course options by various classifiers (e.g., "topics," "selling techniques," and "products."), and view listings of the most popular courses on various topics (e.g., "Sales Associate On-boarding," "Understanding Customers," and "Sales Etiquette.").

Figure 17:
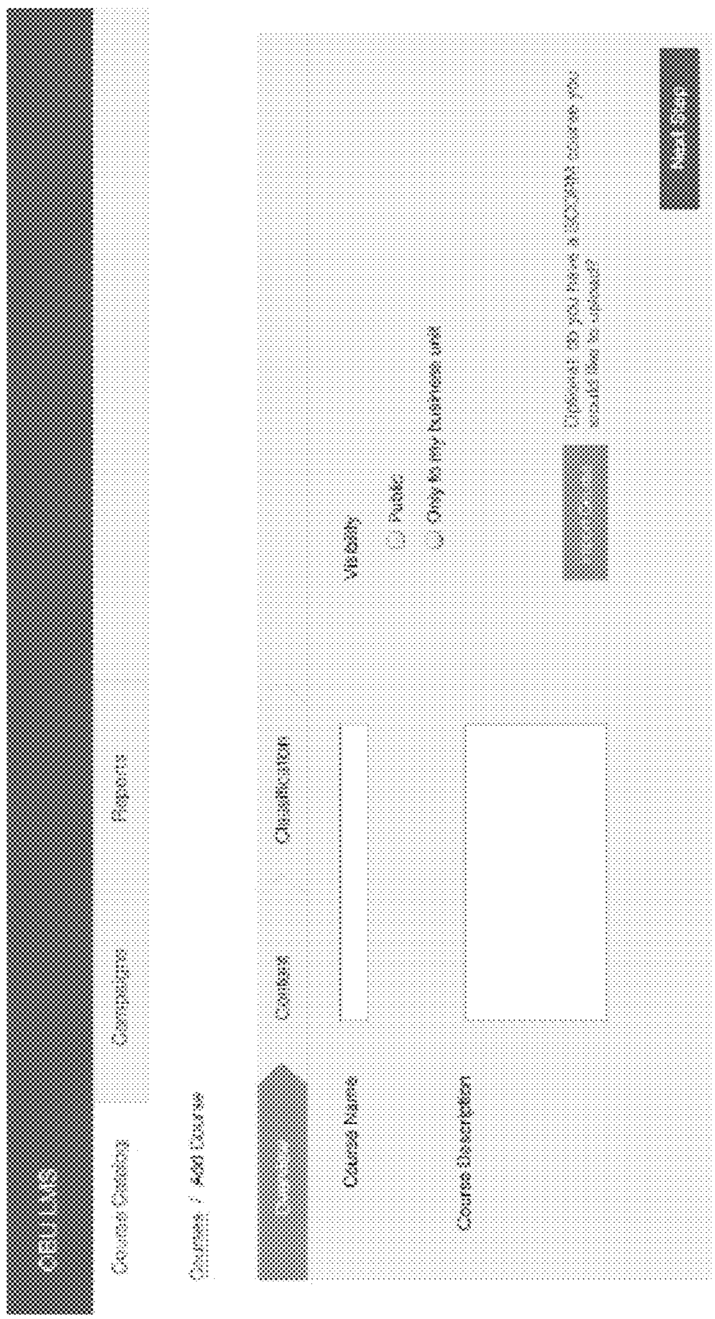
FIG. 17 is an illustration of an exemplary screen image of a user device, in accordance with a representative embodiment of the present disclosure.

FIG. 17 is an illustration of an exemplary screen image of a user device 1700, in accordance with a representative embodiment of the present disclosure. The screen image shown in FIG. 17 may be used to add a course to a course catalog, including adding control over which of the workers may see the course content (e.g., visibility to "Public," or "Only my business unit."). A user wishing to add a course may enter a "Course name," and a brief description of the course being added. The user may also choose to import a course from another system.

Figure 18:
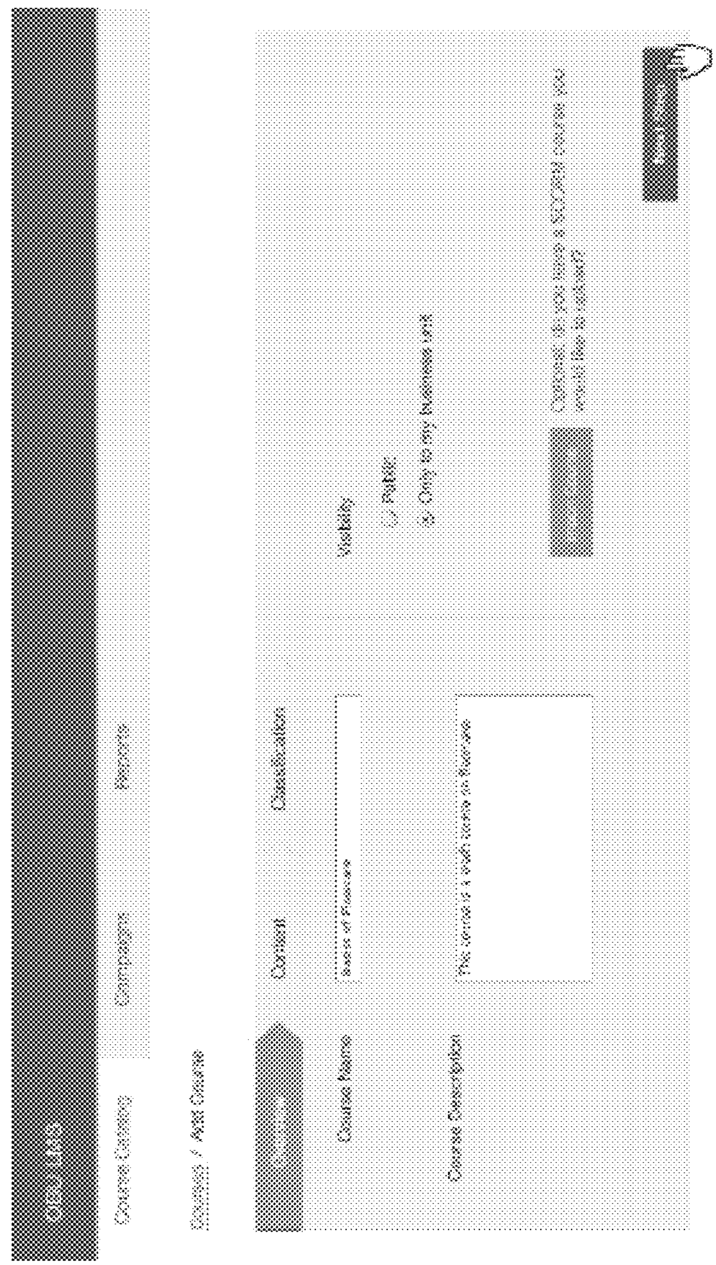
FIG. 18 is an illustration of an exemplary screen image of a user device, in accordance with a representative embodiment of the present disclosure.

FIG. 18 is an illustration of an exemplary screen image of a user device 1800, in accordance with a representative embodiment of the present disclosure. The screen image of FIG. 18 illustrates entry of a course name and a course description in the fields described above, and selection of visibility only to workers of the "Business Unit" of the user adding the course, as described above with respect to FIG. 17.

Figure 19:
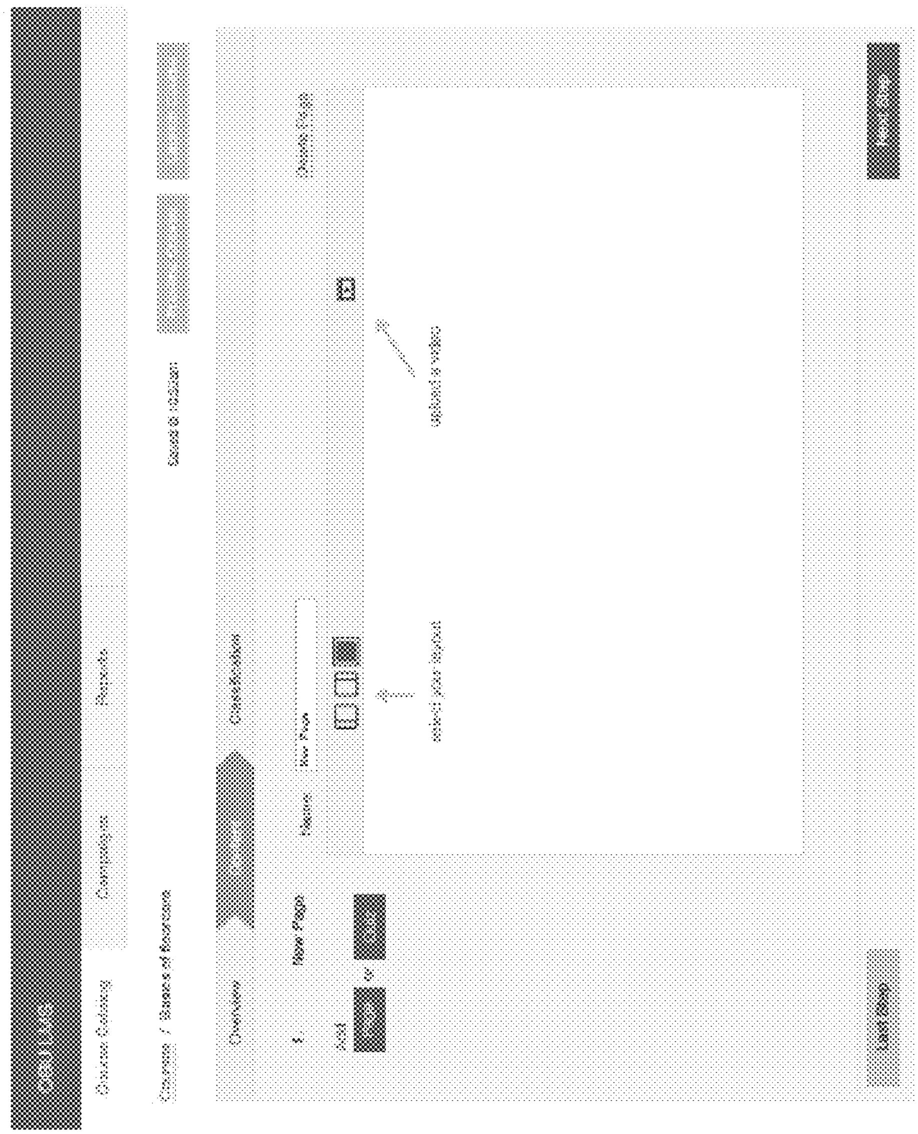
FIG. 19 is an illustration of an exemplary screen image of a user device, in accordance with a representative embodiment of the present disclosure.

FIG. 19 is an illustration of an exemplary screen image of a user device 1900, in accordance with a representative embodiment of the present disclosure. The example screen image of FIG. 18 illustrates the ability of the user wishing to add a course, to choose the format to be used for page(s), and add content for the course, or to choose to add the elements of a "quiz" to the course.

Figure 20:
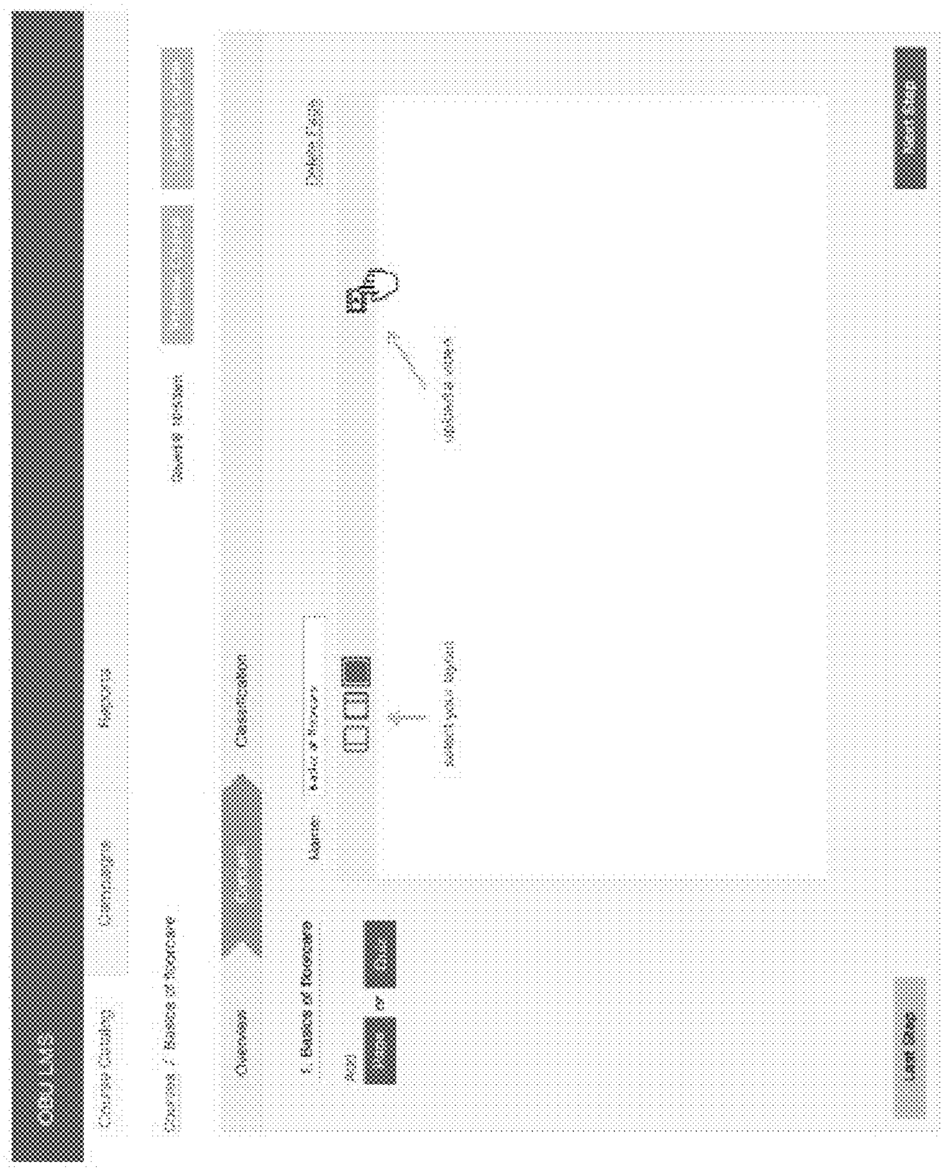
FIG. 20 is an illustration of an exemplary screen image of a user device, in accordance with a representative embodiment of the present disclosure.

FIG. 20 is an illustration of an exemplary screen image of a user device 2000, in accordance with a representative embodiment of the present disclosure. In the example screen image of FIG. 20, the user has inserted the name of the course being added, and is selecting to upload a video (as illustrated by the placement of the "hand" cursor).

Figure 21:
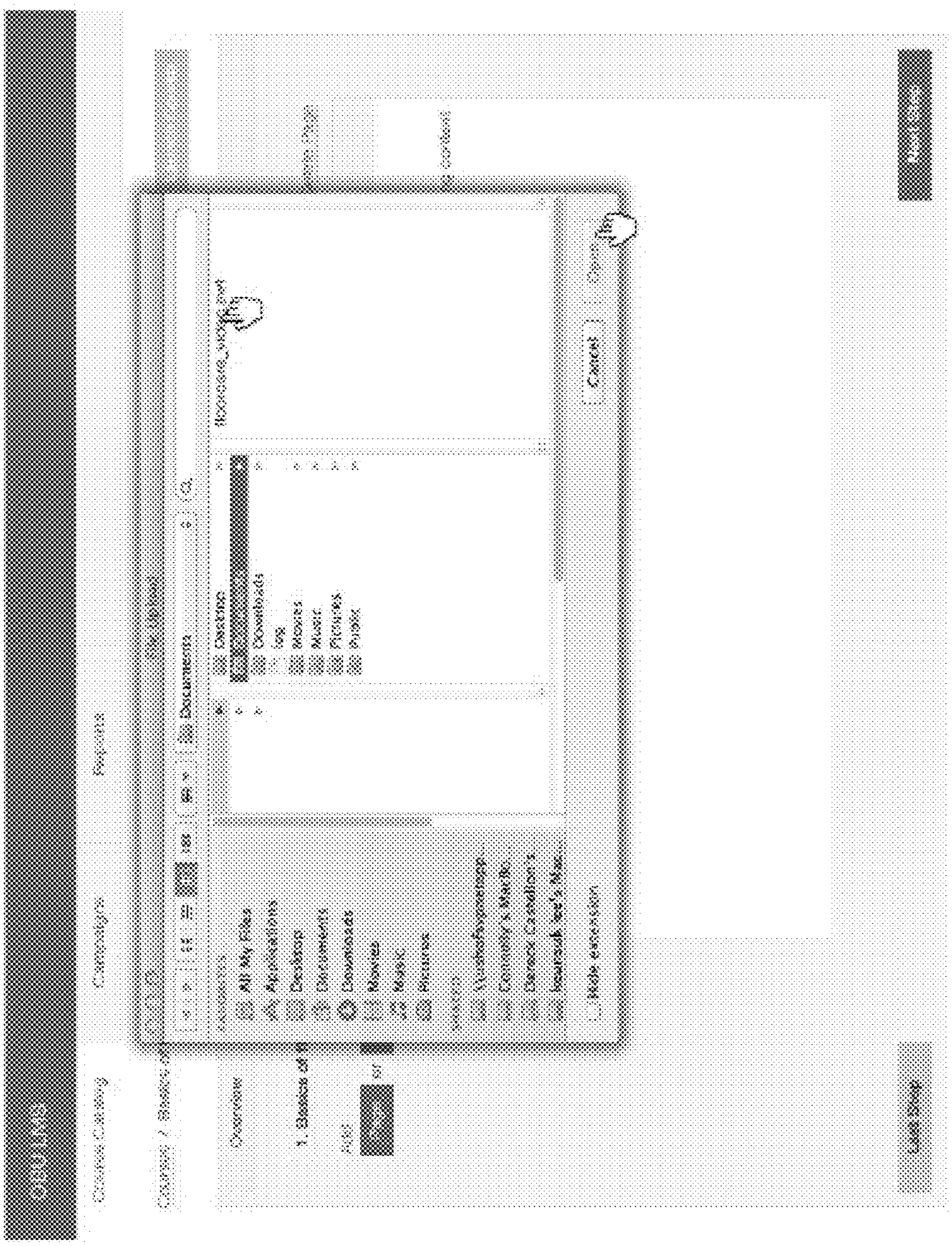
FIG. 21 is an illustration of an exemplary screen image of a user device, in accordance with a representative embodiment of the present disclosure.

FIG. 21 is an illustration of an exemplary screen image of a user device 2100, in accordance with a representative embodiment of the present disclosure. The example of FIG. 21 illustrates an example "file upload" dialog box that may appear when the user chooses to upload a file, as described above with respect to FIG. 20. This permits the user to bring prepared video content into the course from sources on the system on which the LMS of the present disclosure is running, or on systems accessible to the LMS.

Figure 22:
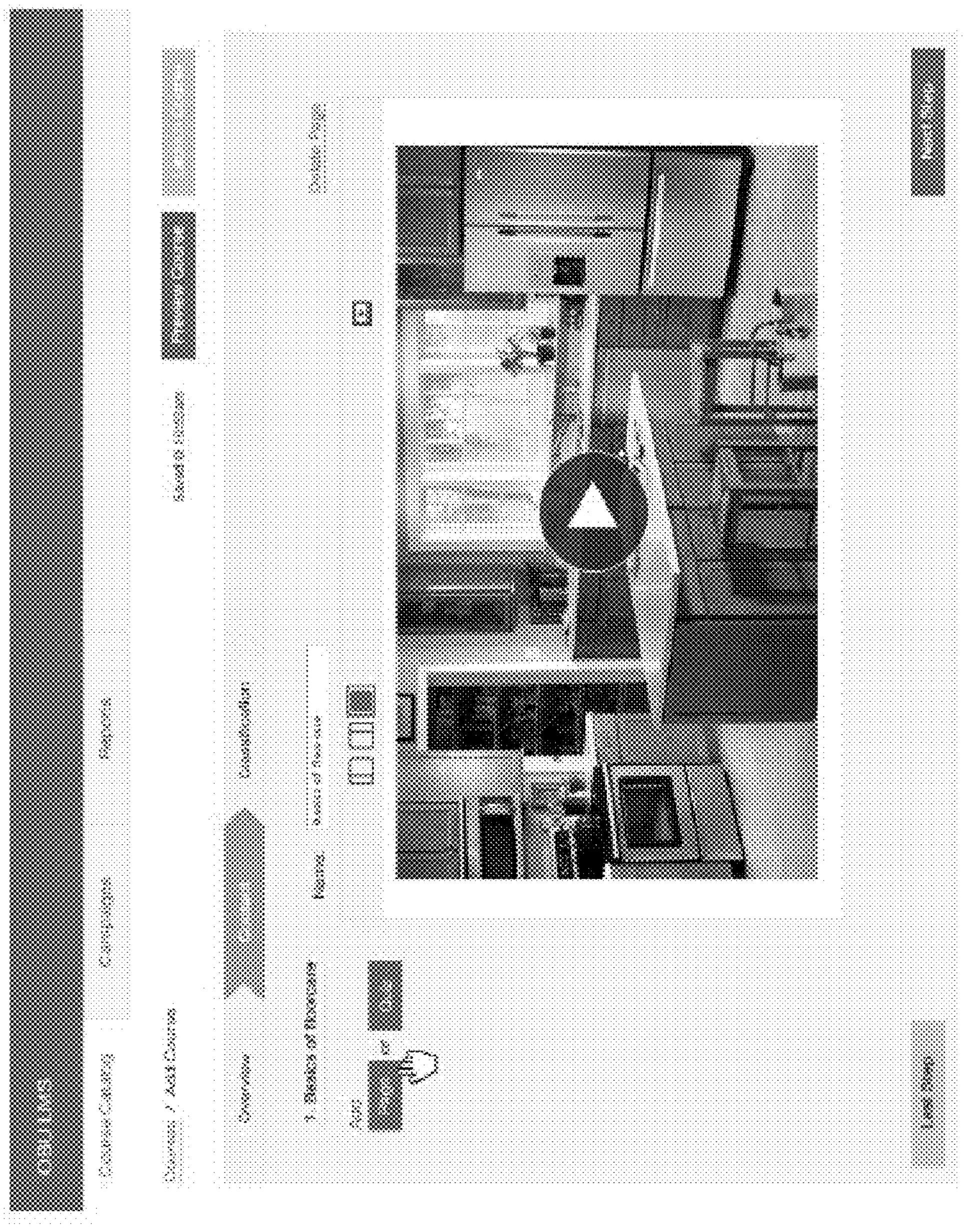
FIG. 22 is an illustration of an exemplary screen image of a user device, in accordance with a representative embodiment of the present disclosure.

FIG. 22 is an illustration of an exemplary screen image of a user device 2200, in accordance with a representative embodiment of the present disclosure. The example screen image of FIG. 22 illustrates the user addition of a page to the course currently being created, as represented by the "hand" cursor on the "Page" button.

Figure 23:
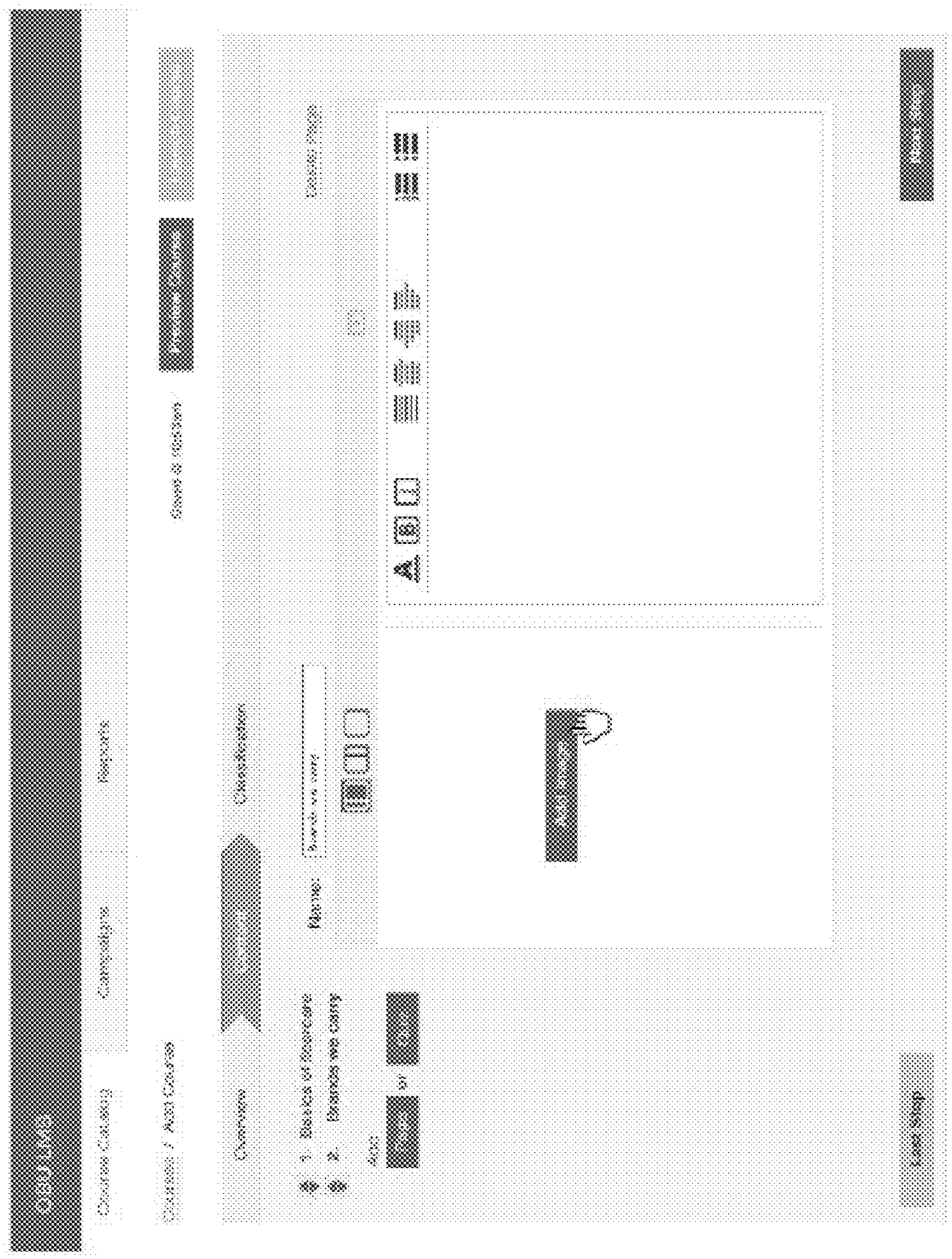
FIG. 23 is an illustration of an exemplary screen image of a user device, in accordance with a representative embodiment of the present disclosure.

FIG. 23 is an illustration of an exemplary screen image of a user device 2300, in accordance with a representative embodiment of the present disclosure. The example screen image of FIG. 23 illustrates a user adding an image to a page of the course currently being created, as represented by a "hand" cursor on the "Add Image" button.

Figure 24:
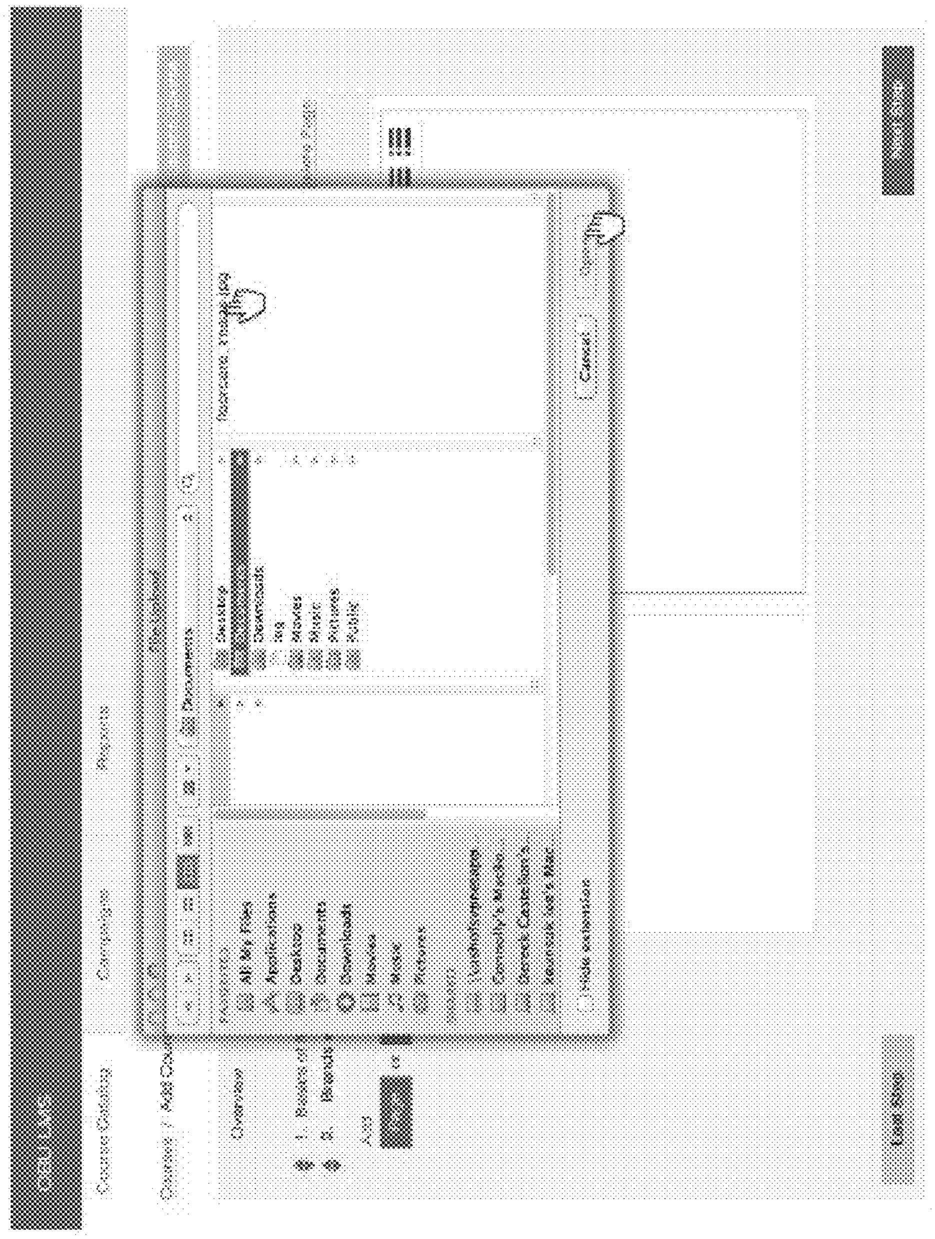
FIG. 24 is an illustration of an exemplary screen image of a user device, in accordance with a representative embodiment of the present disclosure.

FIG. 24 is an illustration of an exemplary screen image of a user device 2400, in accordance with a representative embodiment of the present disclosure. The example of FIG. 24 illustrates an example "file upload" dialog box that may appear when the user chooses to add an image to a course page, as described above with respect to FIG. 23. This permits the user to bring an image into the course content from sources on the system on which the LMS of the present disclosure is running, or on systems accessible to the LMS.

Figure 25:
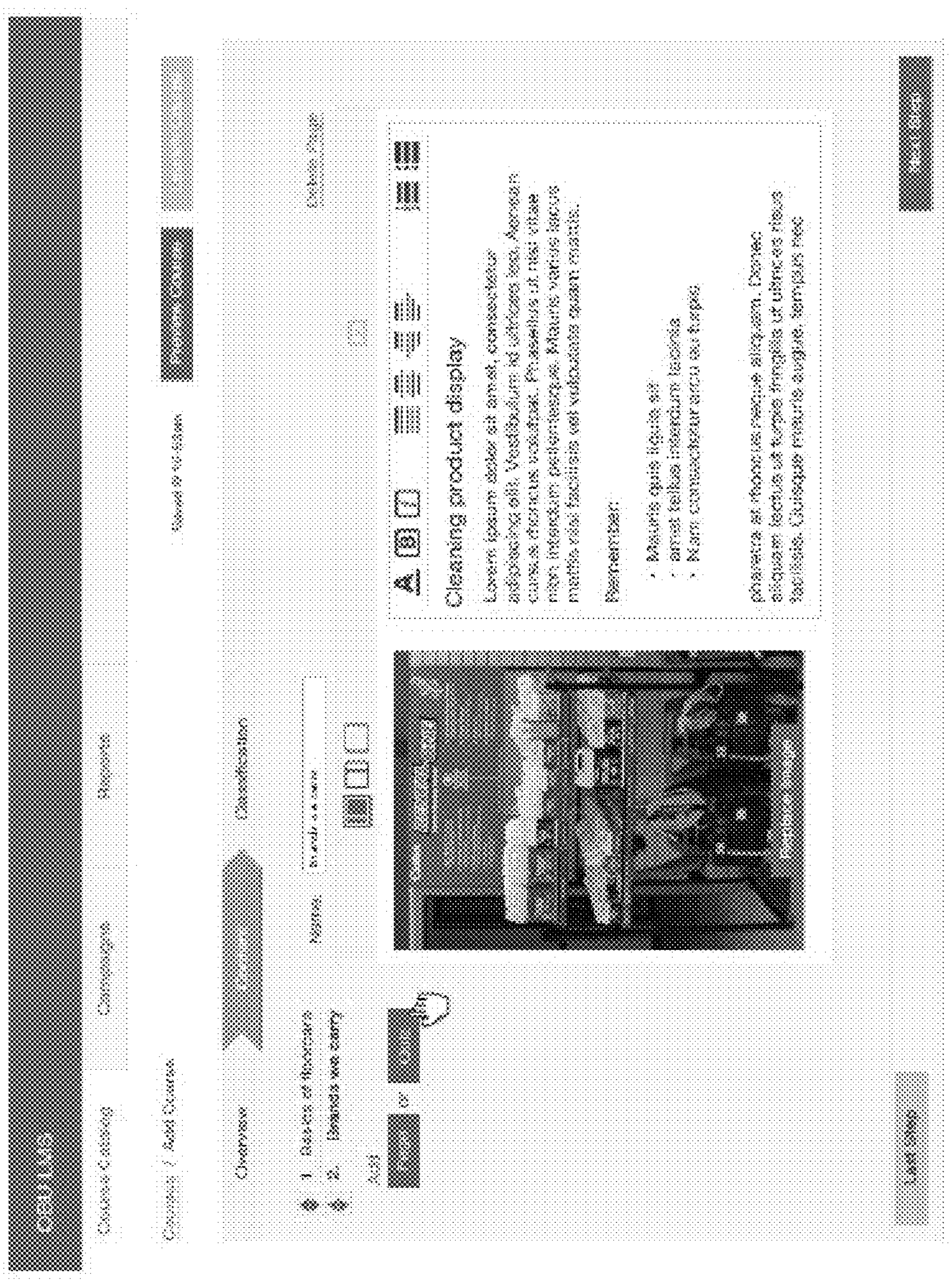
FIG. 25 is an illustration of an exemplary screen image of a user device, in accordance with a representative embodiment of the present disclosure.

FIG. 25 is an illustration of an exemplary screen image of a user device 2500, in accordance with a representative embodiment of the present disclosure. The example of FIG. 25 illustrates the appearance of the page being created, following the addition of the image selected as illustrated at FIG. 24 to a left page portion, and to which the user has added explanatory text in a right page portion. In the illustration of FIG. 25, the user is in the process of choosing the "Quiz" button, to add a quiz to the current page of the course being created.

Figure 26:
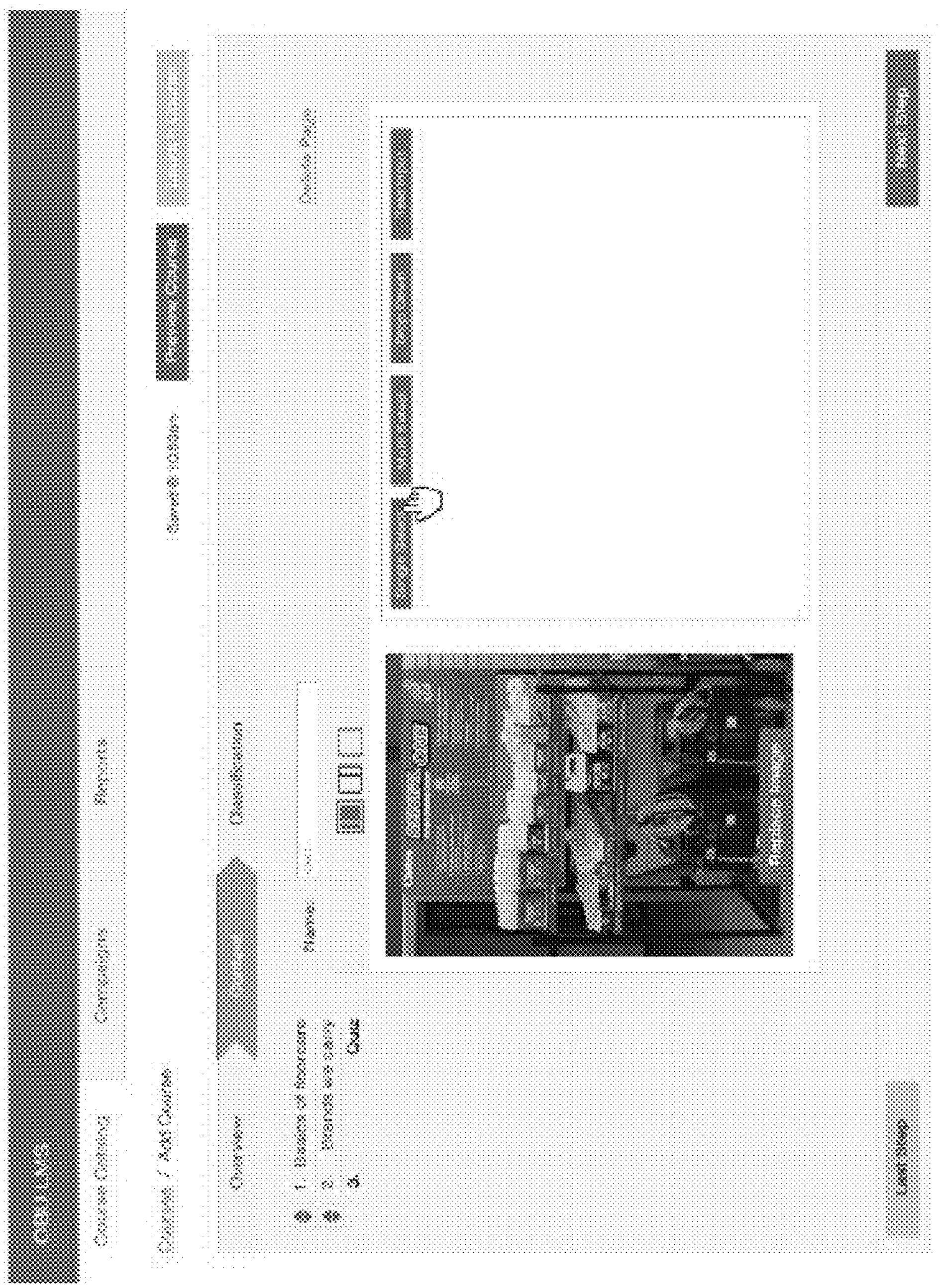
FIG. 26 is an illustration of an exemplary screen image of a user device, in accordance with a representative embodiment of the present disclosure.

FIG. 26 is an illustration of an exemplary screen image of a user device 2600, in accordance with a representative embodiment of the present disclosure. The screen image of FIG. 26 illustrates some of the question and answer formats (e.g., "Single Select," "Multi-Select," "Drop Down," and "Test Input") that the user may choose for a quiz formatted page.

Figure 27:
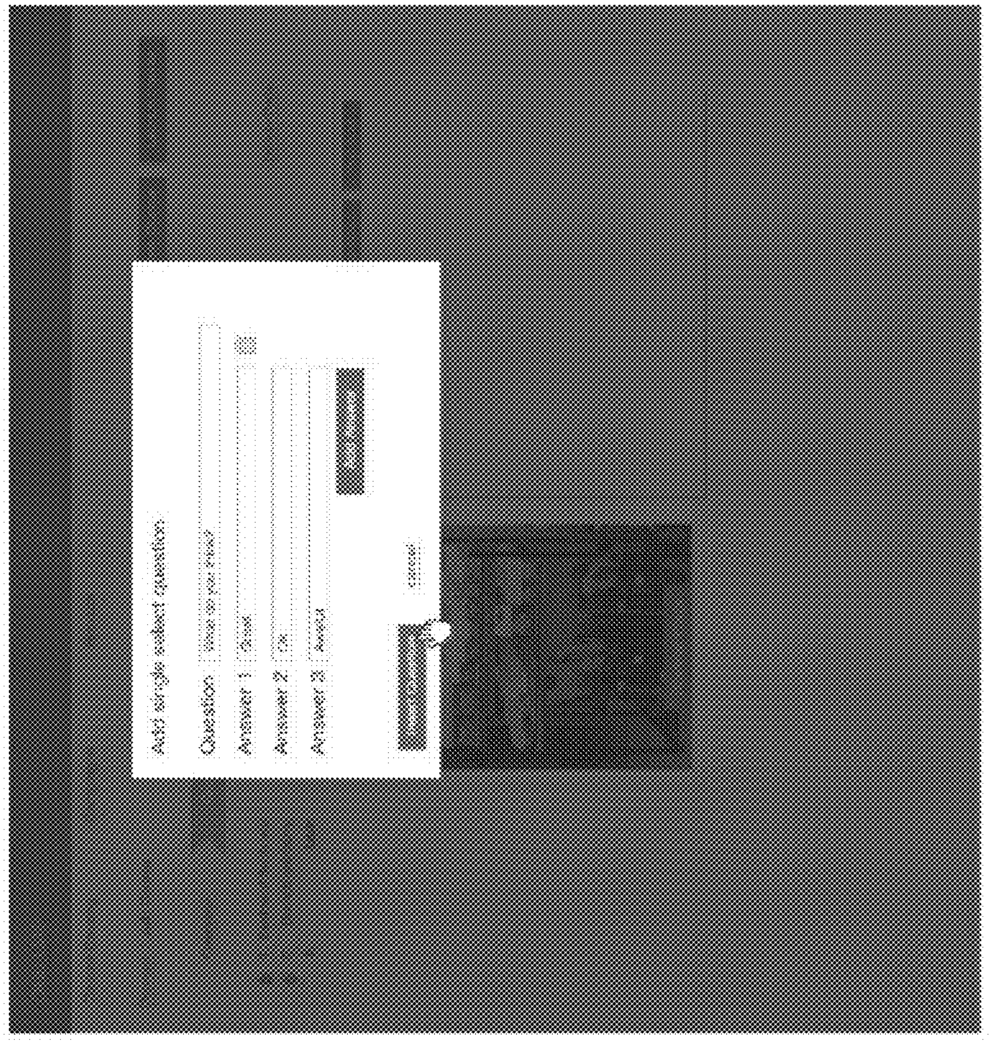
FIG. 27 is an illustration of an exemplary screen image of a user device, in accordance with a representative embodiment of the present disclosure.

FIG. 27 is an illustration of an exemplary screen image of a user device 2700, in accordance with a representative embodiment of the present disclosure. The screen image of FIG. 27 illustrates a pop-up window that may appear upon user selection of the "Single Select" button, as shown by the "hand" cursor shown in FIG. 26. The "pop-up window" permits the user to enter the question, and up to three possible answers that the person taking the quiz may select, although other numbers of possible answers are possible and contemplated.

Figure 28:
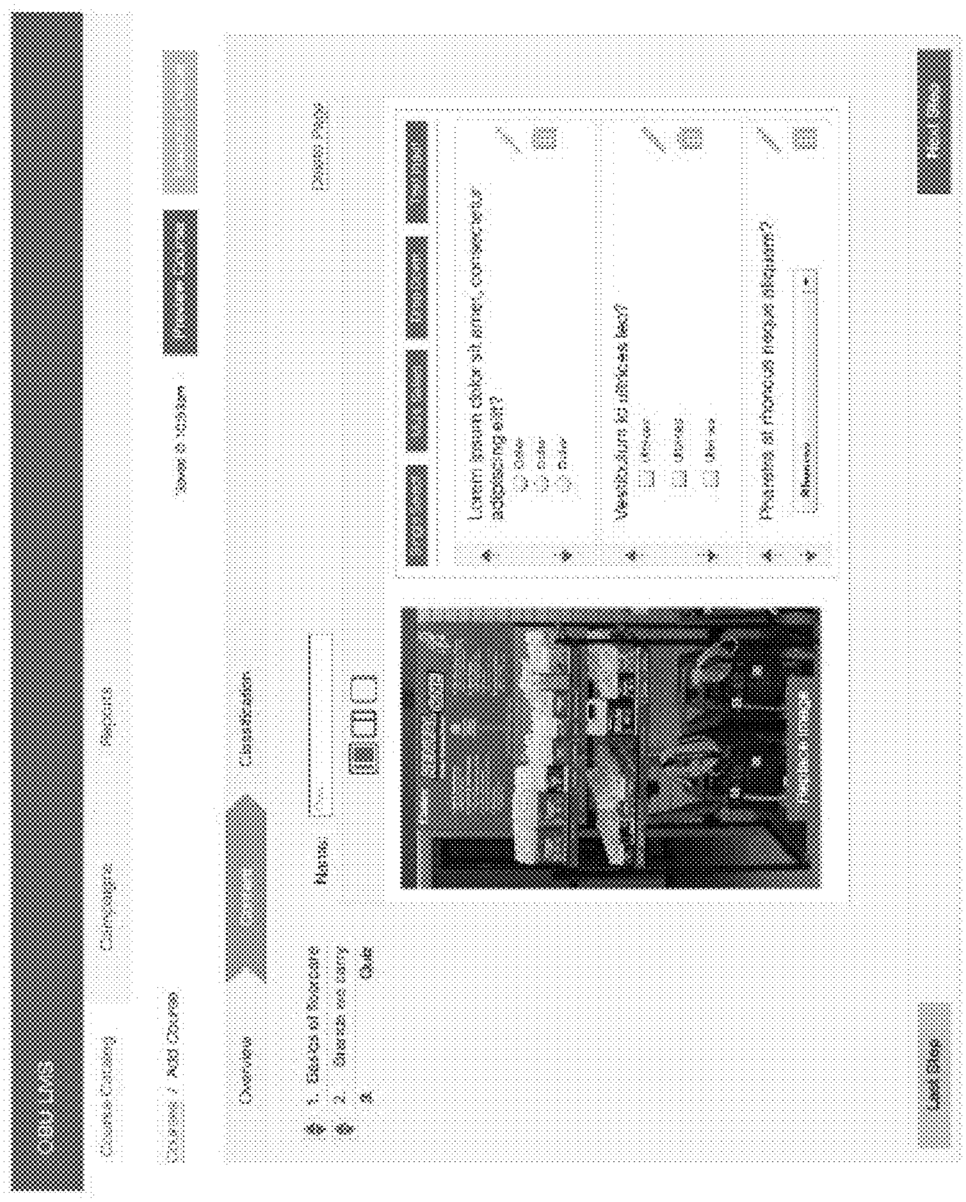
FIG. 28 is an illustration of an exemplary screen image of a user device, in accordance with a representative embodiment of the present disclosure.

FIG. 28 is an illustration of an exemplary screen image of a user device 2800, in accordance with a representative embodiment of the present disclosure. The screen image of FIG. 28 illustrates an example quiz including multiple questions, each having a number of user selectable responses.

Figure 29:
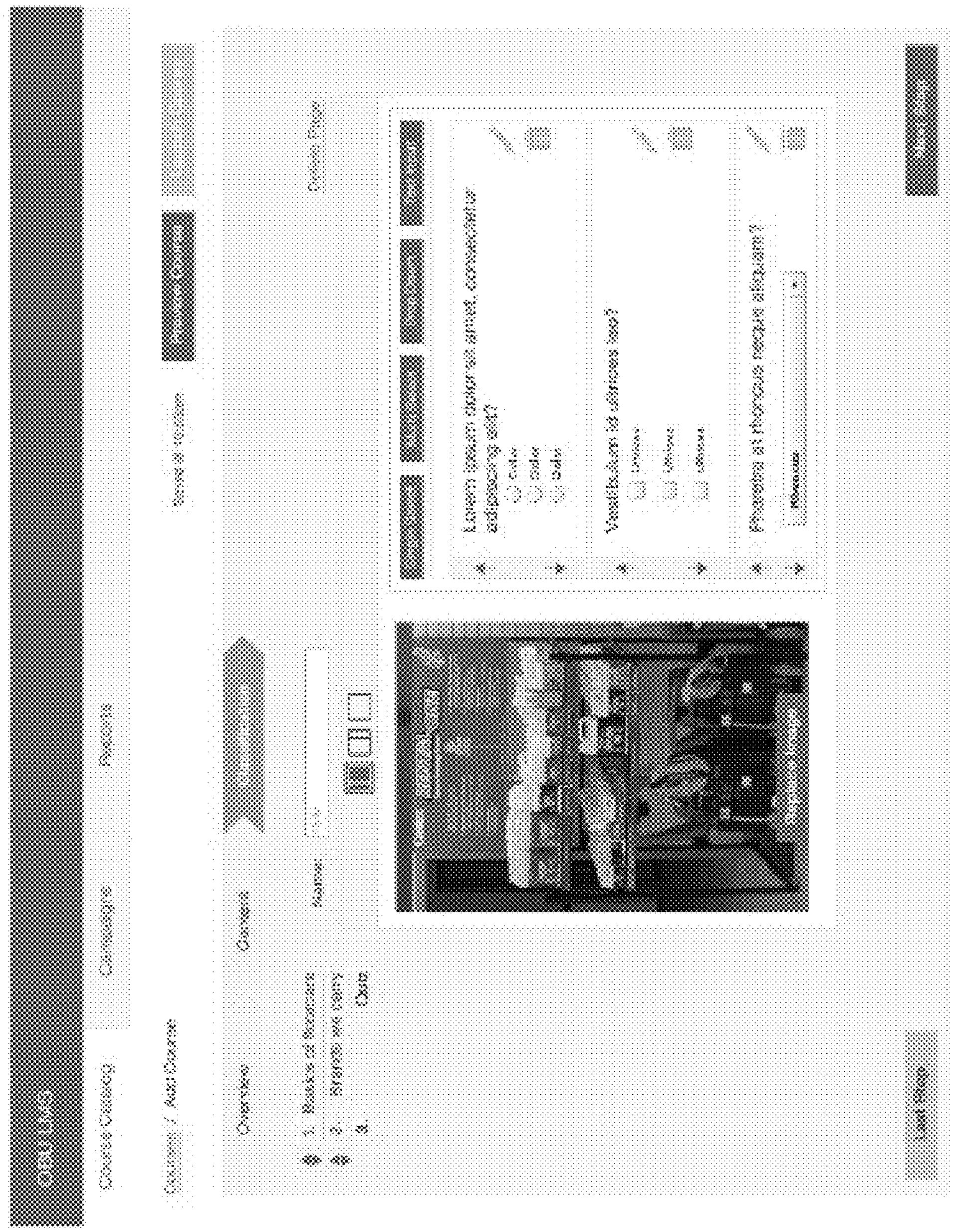
FIG. 29 is an illustration of an exemplary screen image of a user device, in accordance with a representative embodiment of the present disclosure.

FIG. 29 is an illustration of an exemplary screen image of a user device 2900, in accordance with a representative embodiment of the present disclosure. The screen image of FIG. 29 illustrates the user selected move from the "Content" step of the course creation process, to the "Classification" step.

Figure 30:
FIG. 30 is an illustration of an exemplary screen image of a user device, in accordance with a representative embodiment of the present disclosure.

FIG. 30 is an illustration of an exemplary screen image of a user device 3000, in accordance with a representative embodiment of the present disclosure. The screen image of FIG. 30 illustrates an example page listing existing education/training "Campaigns." The user may select a "Create Campaign" button to create a new education/training campaign; may select a tab for "All Campaigns," to display a listing of all existing campaigns; or may select a tab for "My Campaigns," to display a listing of the campaigns created by the user; and may select or clear a check box to include or exclude "inactive campaigns" in the displayed listing. A "search" box is provided to permit the user to search for a particular education/training campaign of interest.

Figure 31:
FIG. 31 is an illustration of an exemplary screen image of a user device, in accordance with a representative embodiment of the present disclosure.

FIG. 31 is an illustration of an exemplary screen image of a user device 3100, in accordance with a representative embodiment of the present disclosure. The screen image of FIG. 31 illustrates the use of the "right arrow" icon that appears on each compact, single-line education/training campaign entry, which enables the user to display an expanded entry with greater detail about the selected education/training campaign by clicking/selecting the "right arrow" icon. Once expanded, the user may also edit information about selected the campaign, and may return the expanded campaign entry to compact format by selecting/clicking on the corresponding "down arrow" icon.

Figure 32:
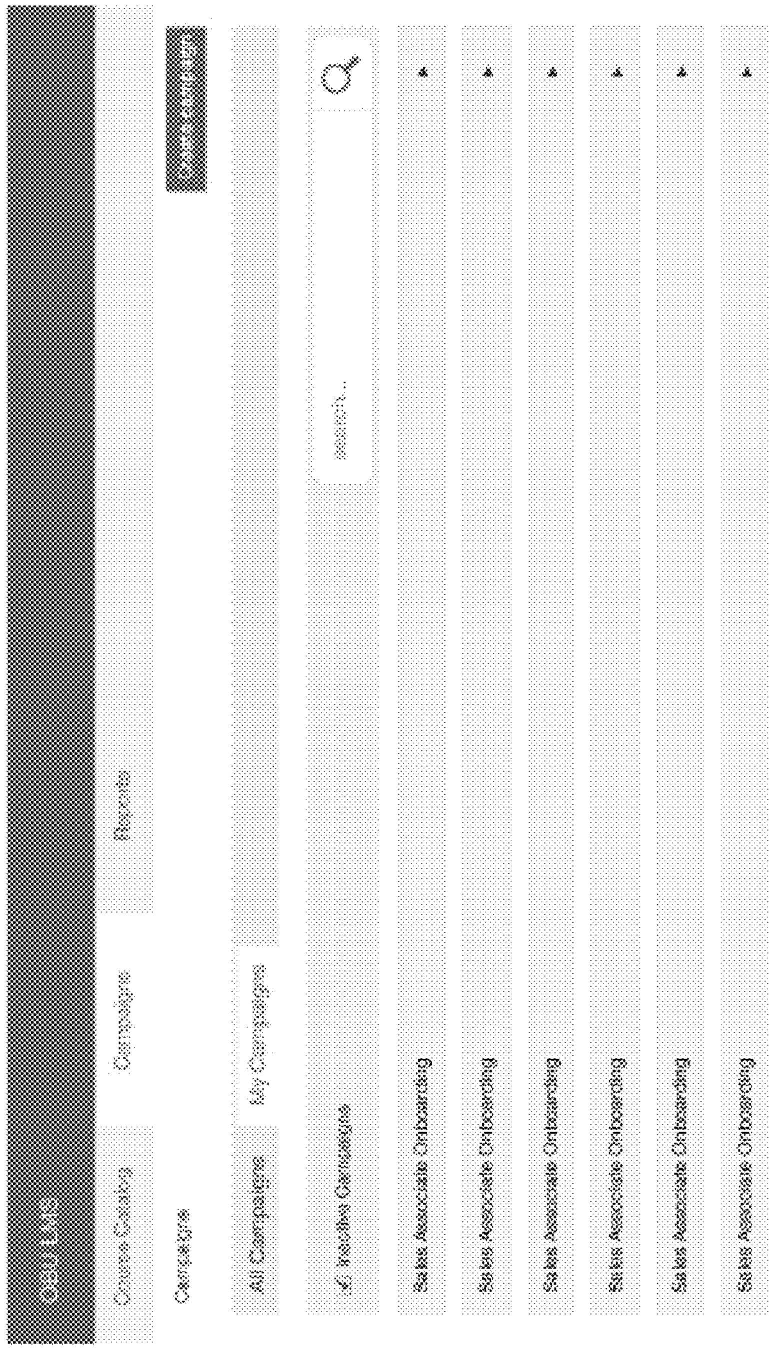
FIG. 32 is an illustration of an exemplary screen image of a user device, in accordance with a representative embodiment of the present disclosure.

FIG. 32 is an illustration of an exemplary screen image of a user device 3200, in accordance with a representative embodiment of the present disclosure. The screen image of FIG. 32 illustrates display of a list of campaigns of the user, following user selection of the "My Campaigns" tab.

Figure 33:
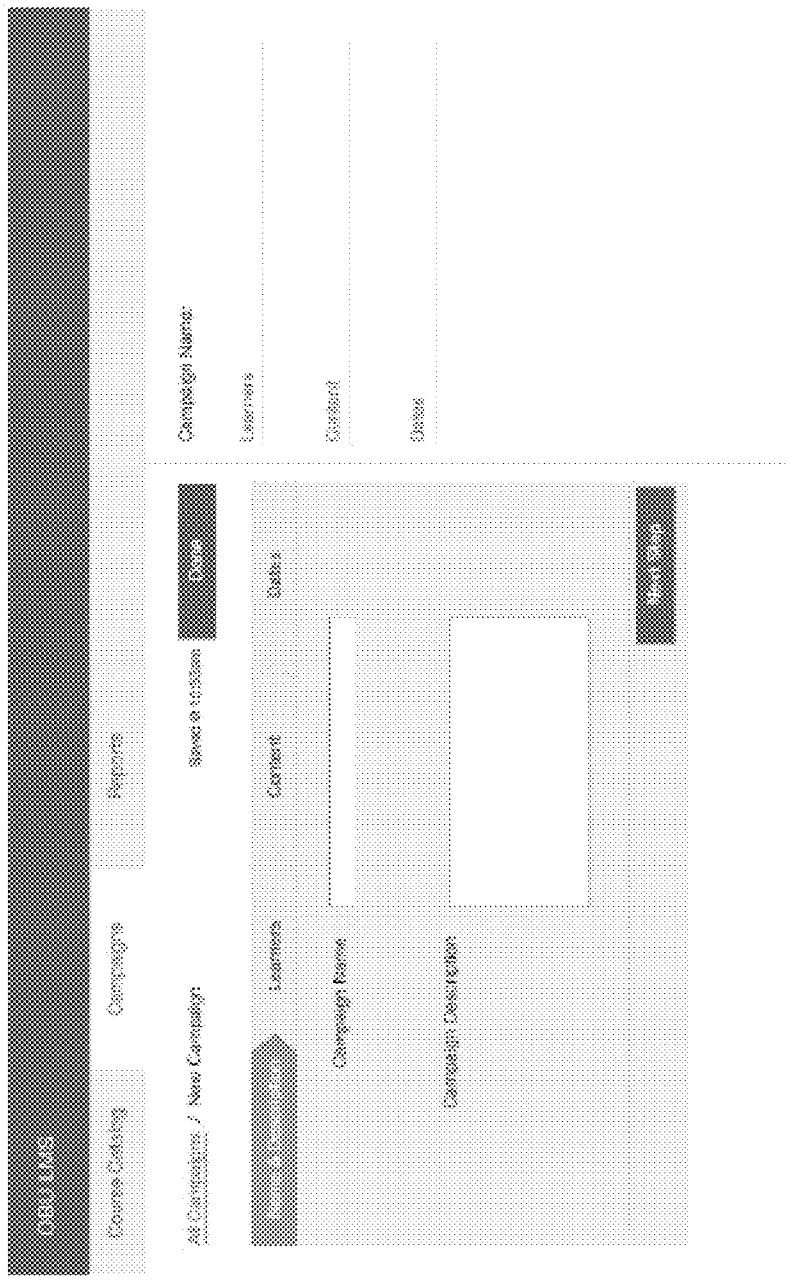
FIG. 33 is an illustration of an exemplary screen image of a user device, in accordance with a representative embodiment of the present disclosure.

FIG. 33 is an illustration of an exemplary screen image of a user device 3300, in accordance with a representative embodiment of the present disclosure. The screen image of FIG. 33 is an illustration of a "New Campaigns" window, which enables the user to create a new education/training campaign. In the initial step illustrated in FIG. 33, the user may enter a name and a description for the new campaign.

Figure 34:
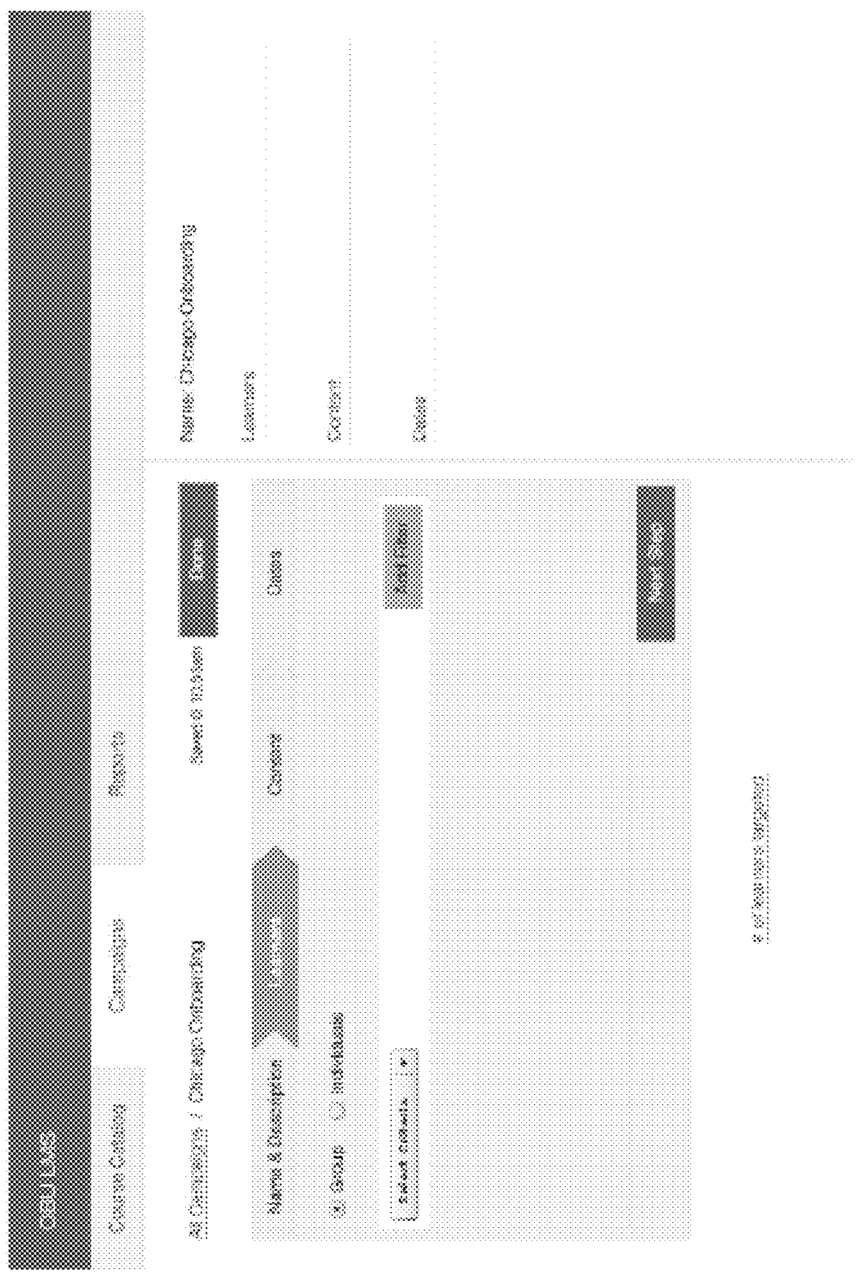
FIG. 34 is an illustration of an exemplary screen image of a user device, in accordance with a representative embodiment of the present disclosure.

FIG. 34 is an illustration of an exemplary screen image of a user device 3400, in accordance with a representative embodiment of the present disclosure. The screen image of FIG. 34 is an illustration of a exemplary window that enables the user to add individual workers/associates as individuals that may take part as learners of coursework for a campaign. The user may add the names of individuals by selecting from a list that may be filtered according to a user selected filter.

Figure 35:
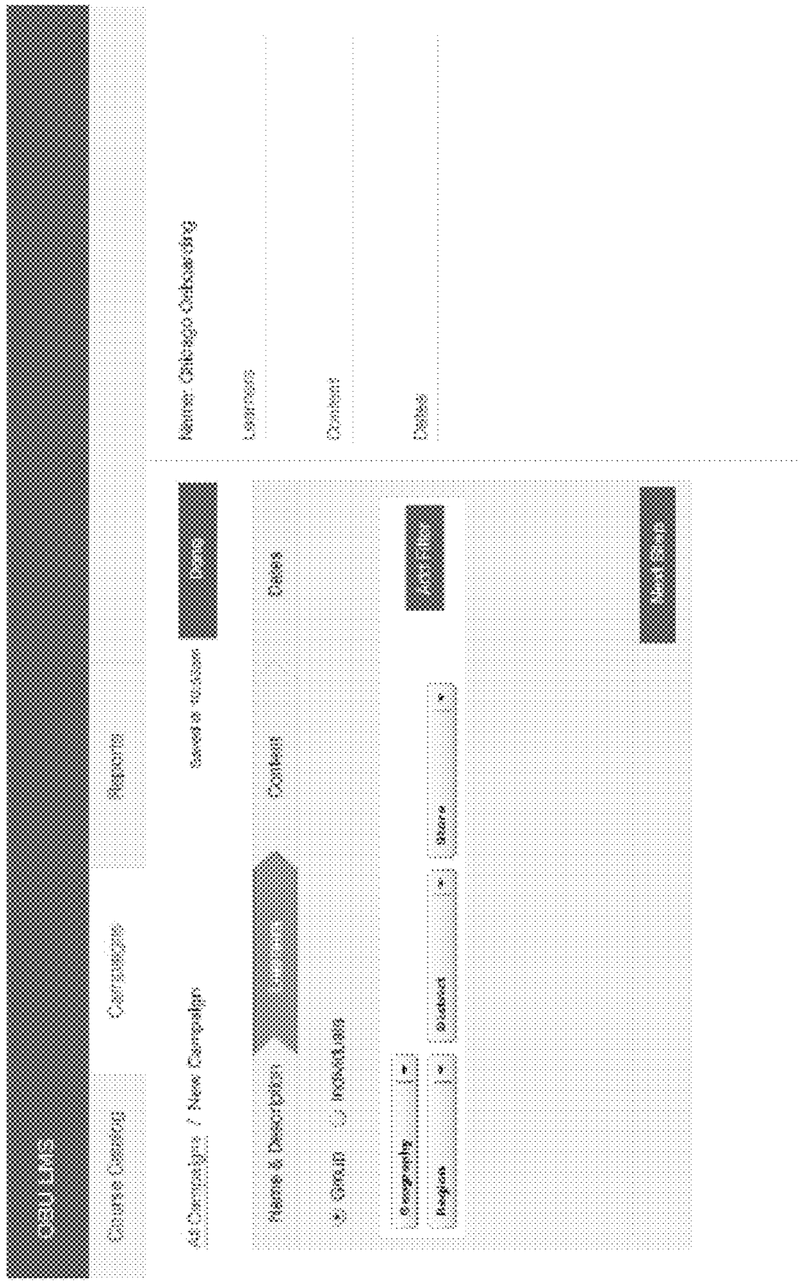
FIG. 35 is an illustration of an exemplary screen image of a user device, in accordance with a representative embodiment of the present disclosure.

FIG. 35 is an illustration of an exemplary screen image of a user device 3500, in accordance with a representative embodiment of the present disclosure. The screen image illustrated in FIG. 35 shows additional details of the use of various filters in selecting individuals as learners/participants in an education/training campaign.

Figure 36:
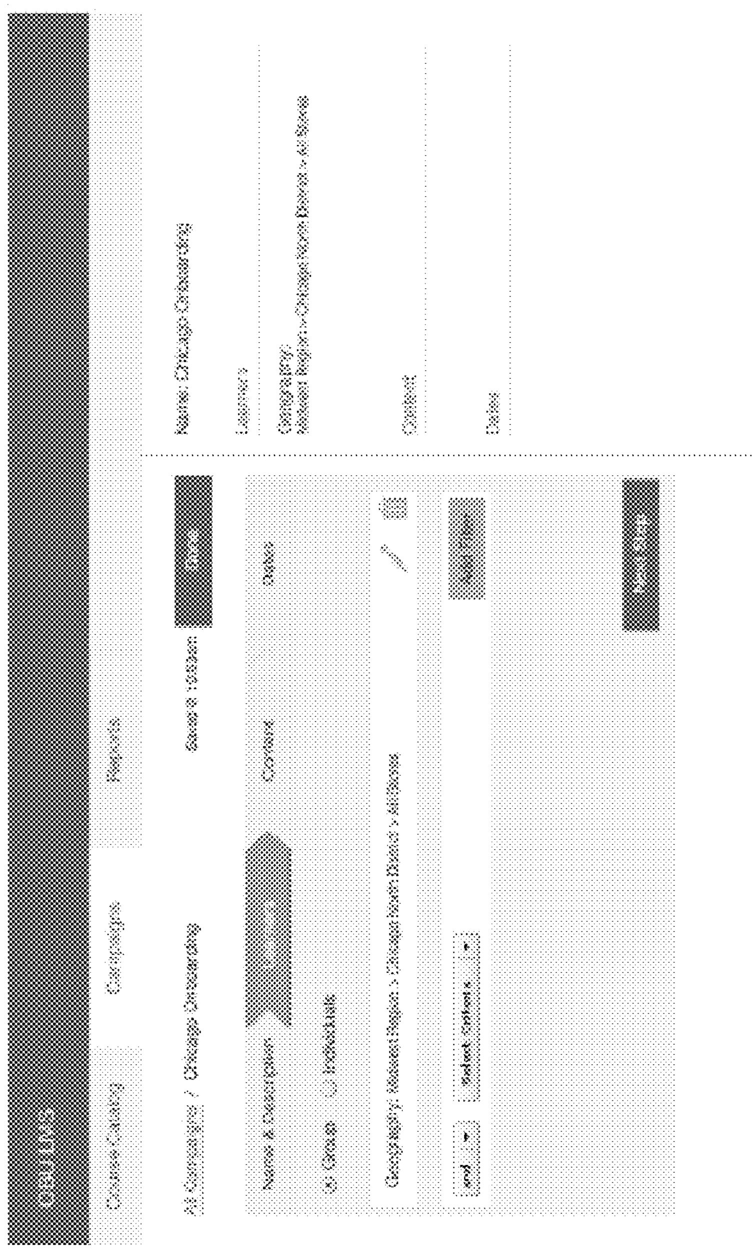
FIG. 36 is an illustration of an exemplary screen image of a user device, in accordance with a representative embodiment of the present disclosure.

FIG. 36 is an illustration of an exemplary screen image of a user device 3600, in accordance with a representative embodiment of the present disclosure. The screen image of FIG. 36 illustrates a user interface that enables user selection of a geographical region over which an education/training campaign will be rolled out.

Figure 37:
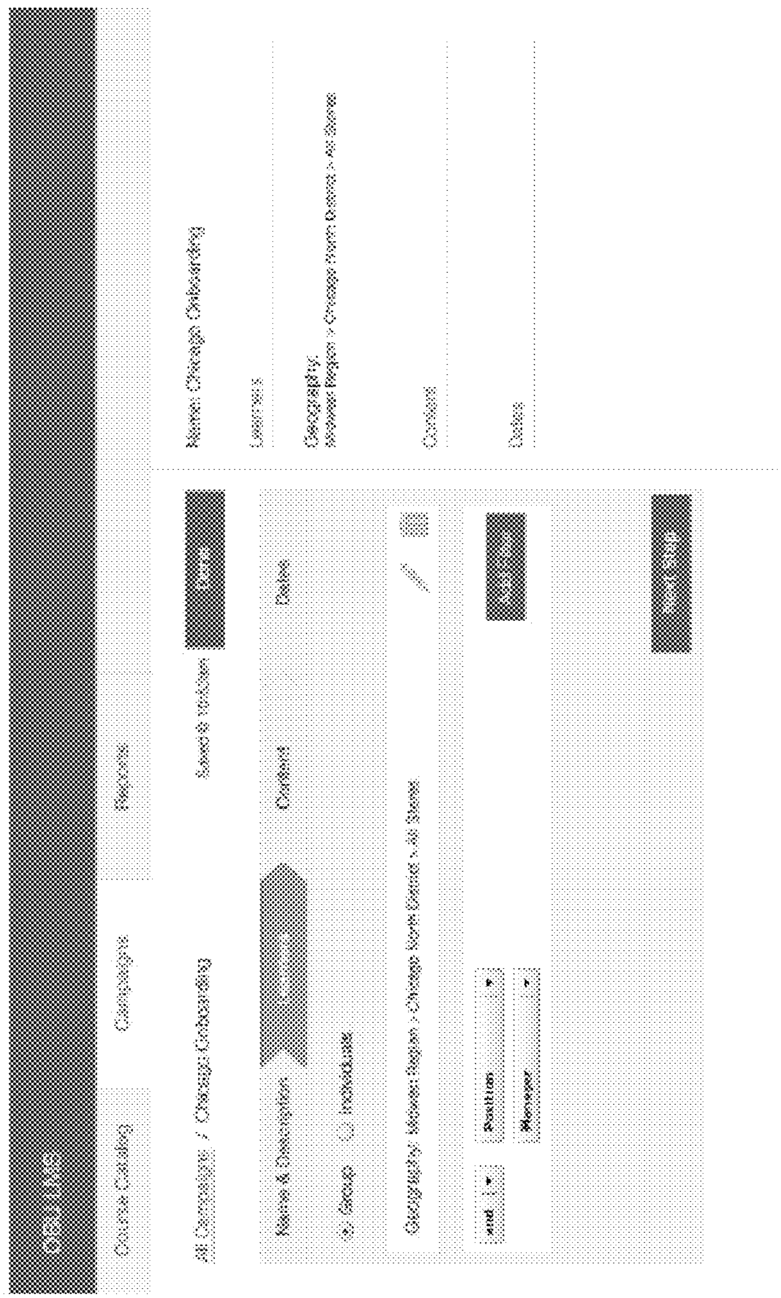
FIG. 37 is an illustration of an exemplary screen image of a user device, in accordance with a representative embodiment of the present disclosure.

FIG. 37 is an illustration of an exemplary screen image of a user device 3700, in accordance with a representative embodiment of the present disclosure. The screen image of FIG. 37 illustrates the addition of a "Position" filter with respect to selection of the organization position of individuals to be included in an education/training campaign in a particular, user-specified geographic region.

Figure 38:
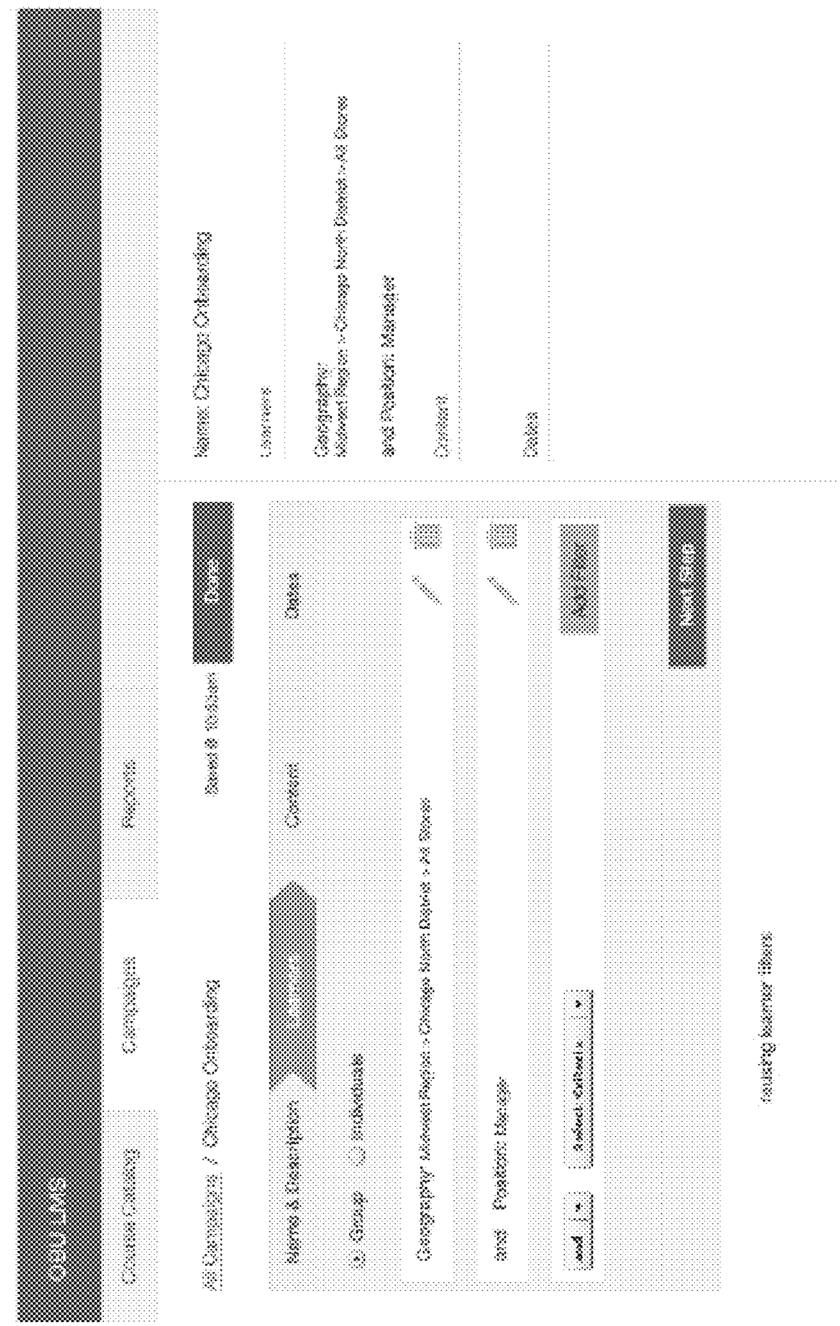
FIG. 38 is an illustration of an exemplary screen image of a user device, in accordance with a representative embodiment of the present disclosure.

FIG. 38 is an illustration of an exemplary screen image of a user device 3800, in accordance with a representative embodiment of the present disclosure. The screen image of FIG. 38 shows the user-selected/configured criteria introduced as shown in FIG. 36 and FIG. 37, for the user-created education/training campaign.

Figure 39:
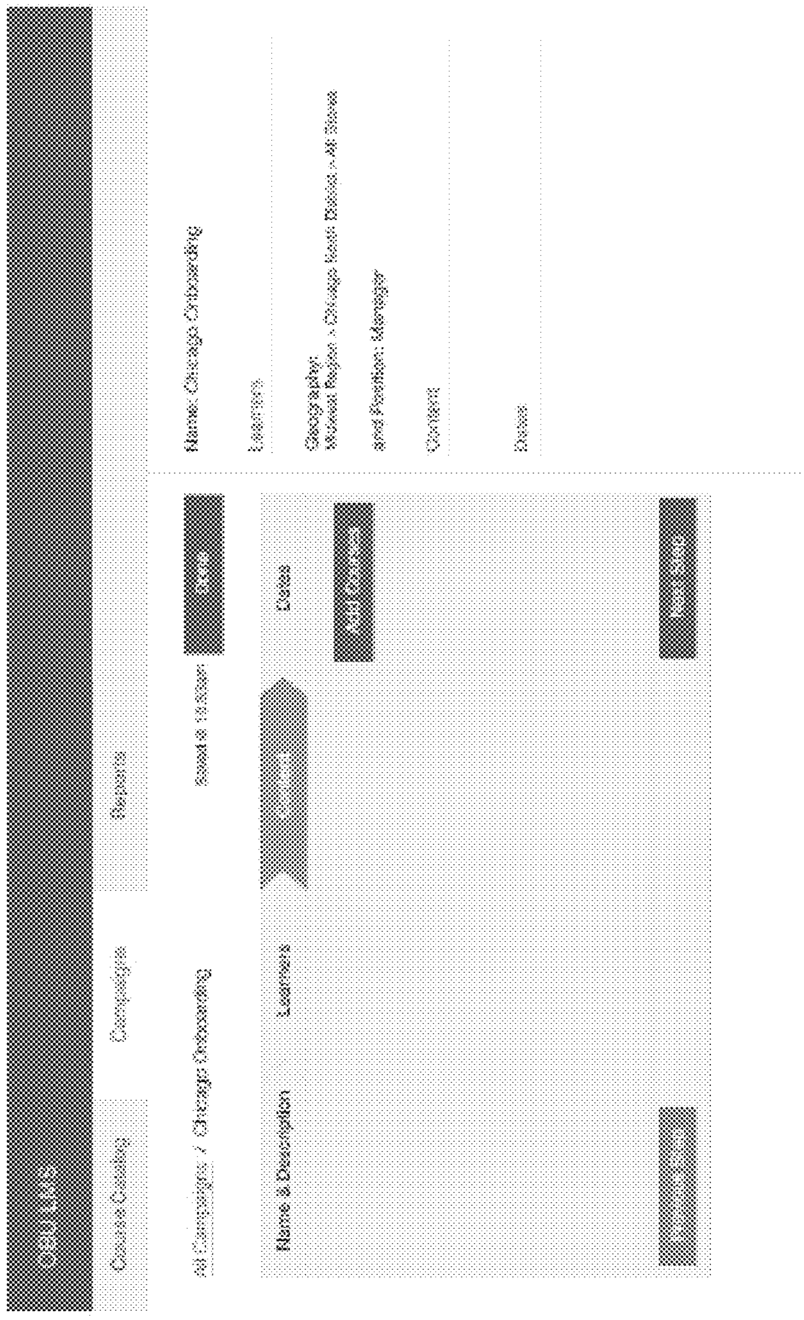
FIG. 39 is an illustration of an exemplary screen image of a user device, in accordance with a representative embodiment of the present disclosure.

FIG. 39 is an illustration of an exemplary screen image of a user device 3900, in accordance with a representative embodiment of the present disclosure. The screen image shown in FIG. 39 illustrates the addition of user-selected course content to an education/training campaign, which may be included in the coursework for a campaign by selecting an "Add Courses" button.

Figure 40:
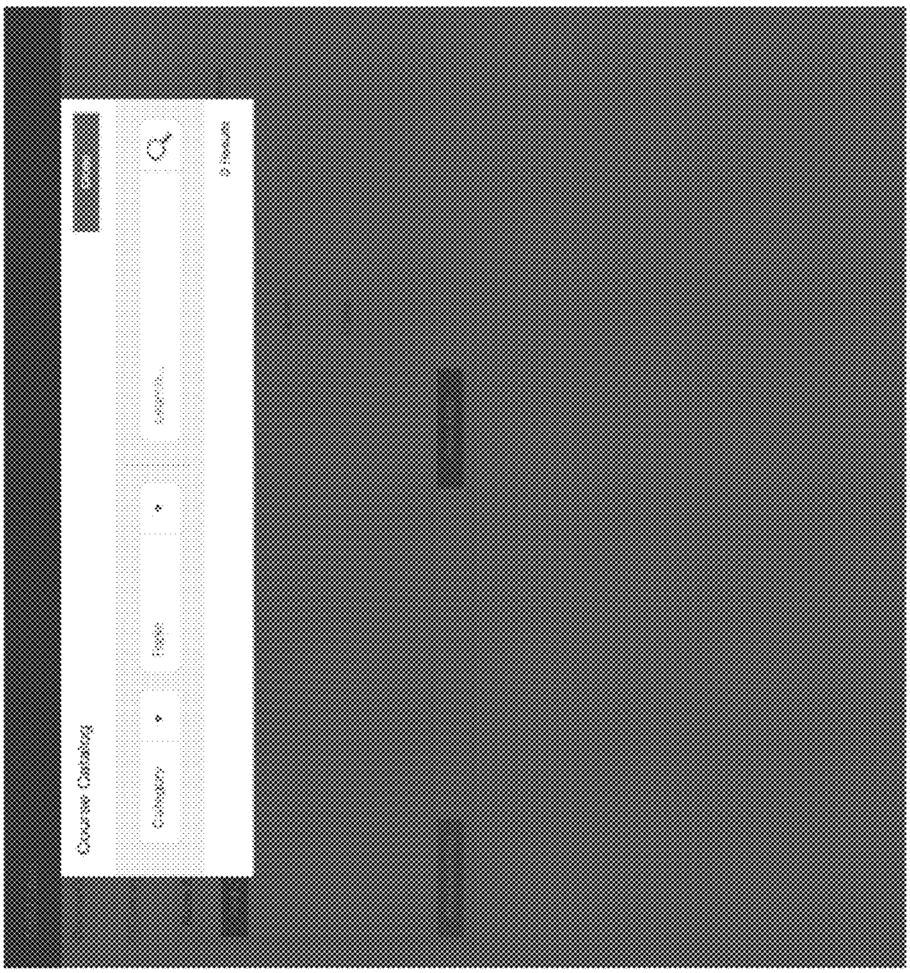
FIG. 40 is an illustration of an exemplary screen image of a user device, in accordance with a representative embodiment of the present disclosure.

FIG. 40 is an illustration of an exemplary screen image of a user device 4000, in accordance with a representative embodiment of the present disclosure. The screen image shown in FIG. 40 illustrates a "pop-up" window that enables a user to select a course from a catalog of available courses from a pre-defined "Category" and/or a pre-defined "Topic," or using a search function.

Figure 41:
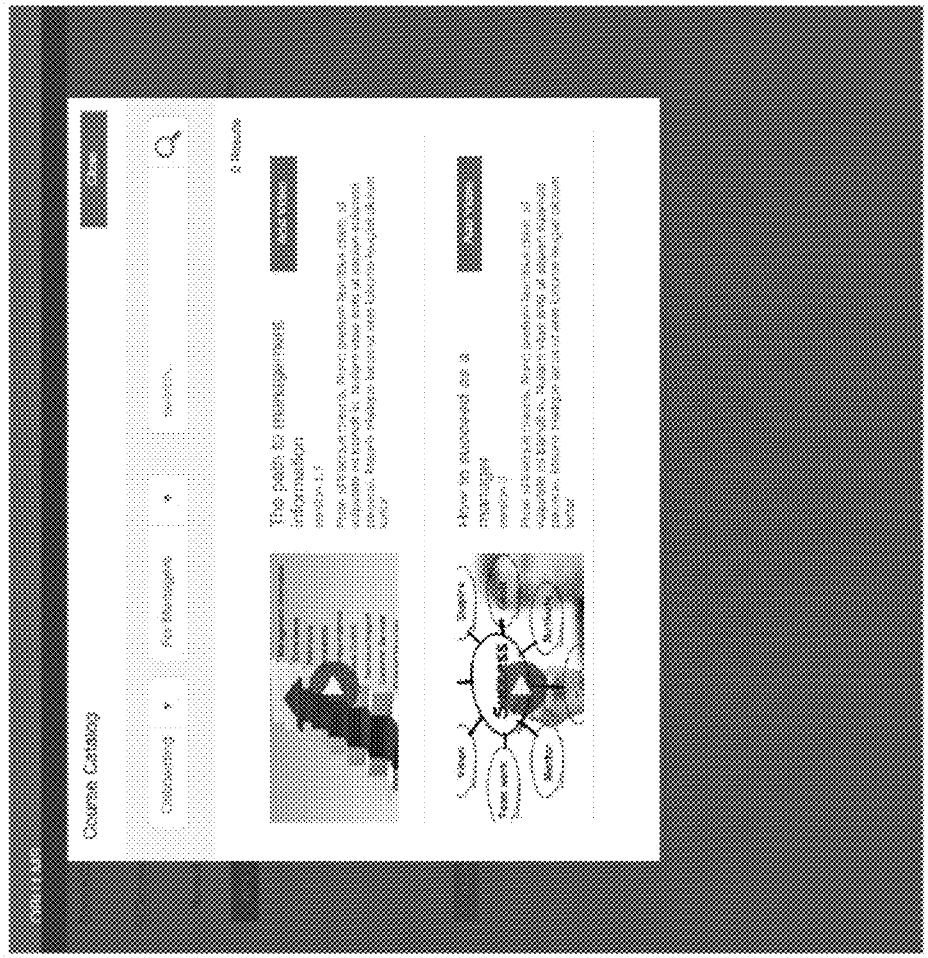
FIG. 41 is an illustration of an exemplary screen image of a user device, in accordance with a representative embodiment of the present disclosure.

FIG. 41 is an illustration of an exemplary screen image of a user device 4100, in accordance with a representative embodiment of the present disclosure. The screen image of FIG. 41 illustrates the course catalog "hits" or results, based on a user-selected "Category" of "Onboarding," and a user-selected "Topic" of "For Managers." Each of the displayed courses are available in video format, as indicated by the selectable (i.e., highlighted) "Add Video" button on each entry.

Figure 42:
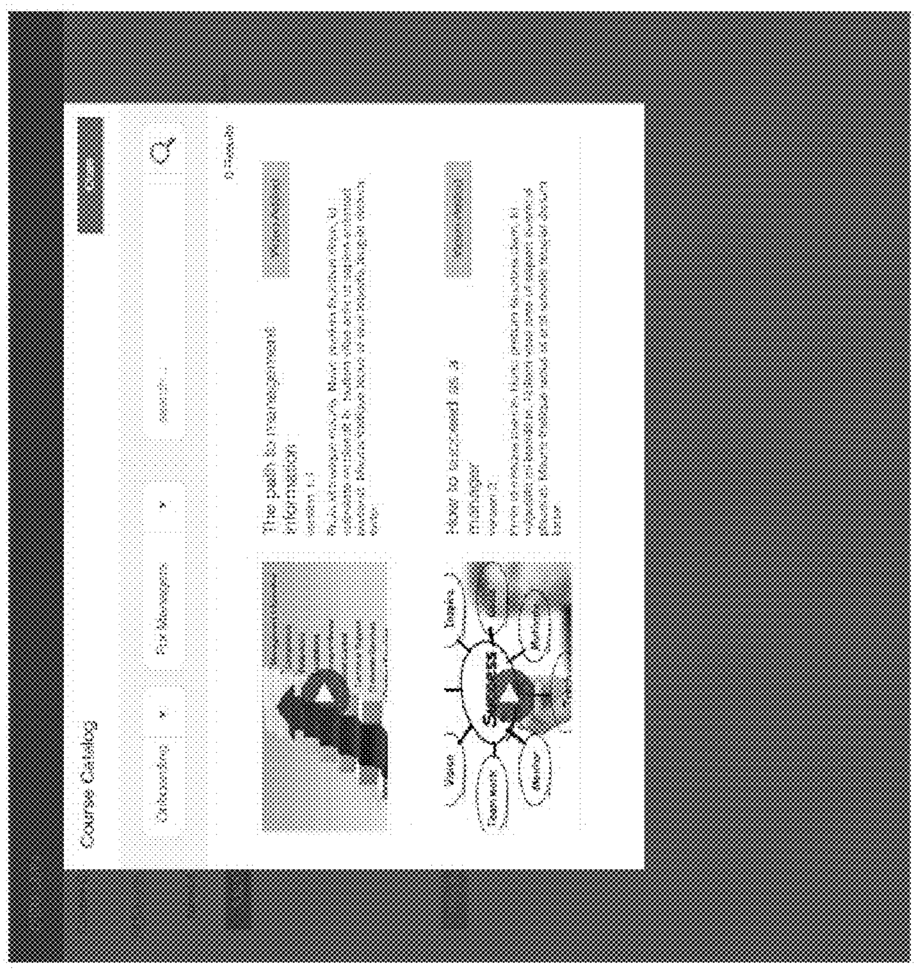
FIG. 42 is an illustration of an exemplary screen image of a user device, in accordance with a representative embodiment of the present disclosure.

FIG. 42 is an illustration of an exemplary screen image of a user device 4200, in accordance with a representative embodiment of the present disclosure. The screen image of FIG. 42 illustrates the listed course catalog hits or results, following user selection of the "Add Video" button and successful addition of video content for each entry, illustrated by the change of the button captions to "Video Added."

Figure 43:
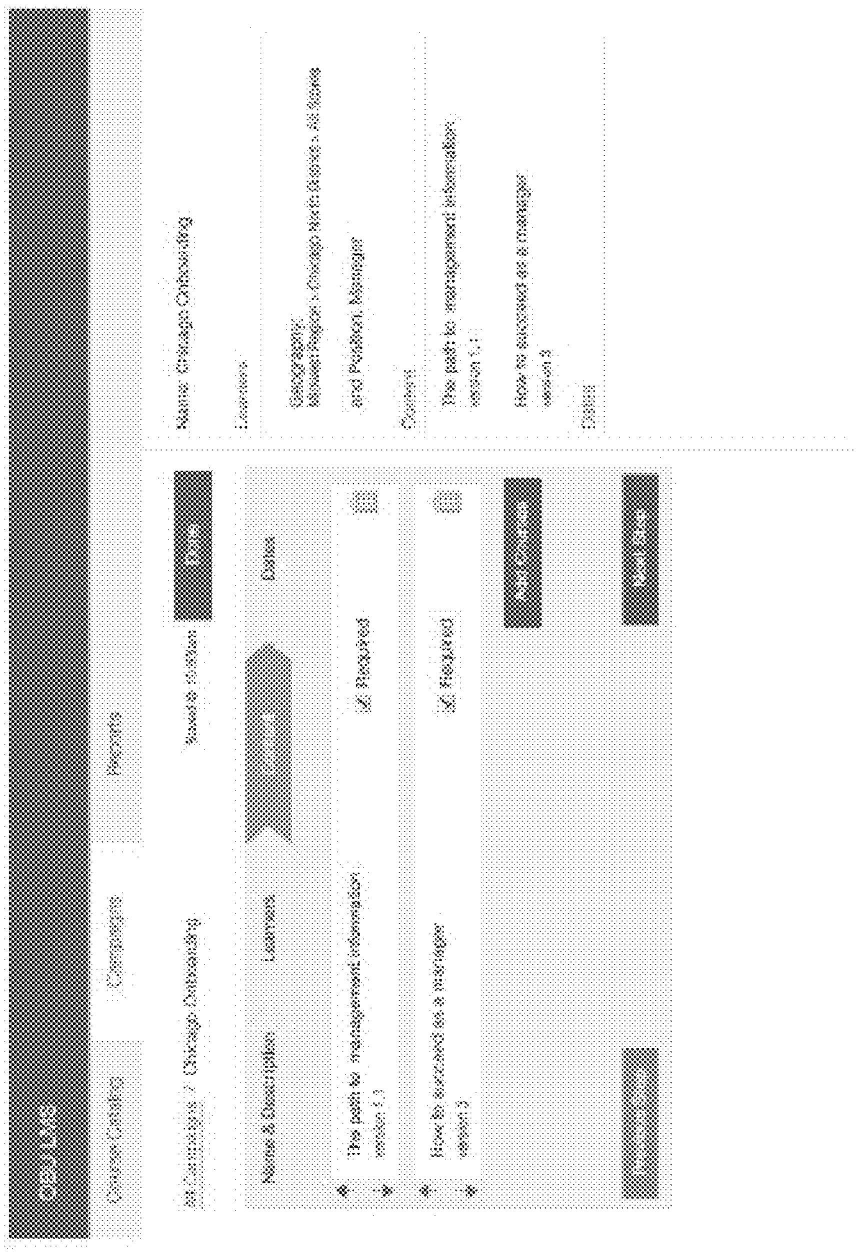
FIG. 43 is an illustration of an exemplary screen image of a user device, in accordance with a representative embodiment of the present disclosure.

FIG. 43 is an illustration of an exemplary screen image of a user device 4300, in accordance with a representative embodiment of the present disclosure. The screen image of FIG. 43 shows the list of courses added to the campaign by the user.

Figure 44:
FIG. 44 is an illustration of an exemplary screen image of a user device, in accordance with a representative embodiment of the present disclosure.

FIG. 44 is an illustration of an exemplary screen image of a user device 4400, in accordance with a representative embodiment of the present disclosure. The screen image shown in FIG. 44 illustrates the step of specifying the period of time during which a campaign will be "rolled out" to workers. The user may specify a "Go Live" date, and a "Close Course" date, to identify when the campaign begins and ends, respectively. The dates may be specified as "Absolute," or specified as "Relative" dates, meaning that they may be automatically moved by the system of the present disclosure, based upon other factors or dates. The screen image of FIG. 44 also includes a "Launch" button, to begin rollout of the education/training campaign.

Figure 45:
FIG. 45 is an illustration of an exemplary screen image of a user device, in accordance with a representative embodiment of the present disclosure.

FIG. 45 is an illustration of an exemplary screen image of a user device 4500, in accordance with a representative embodiment of the present disclosure. The screen image of FIG. 45 illustrates a "pop-up" window soliciting user confirmation of a request to launch an education/training campaign, as may be displayed following user selection of a "Launch" button, such as that shown in FIG. 44.

Figure 46:
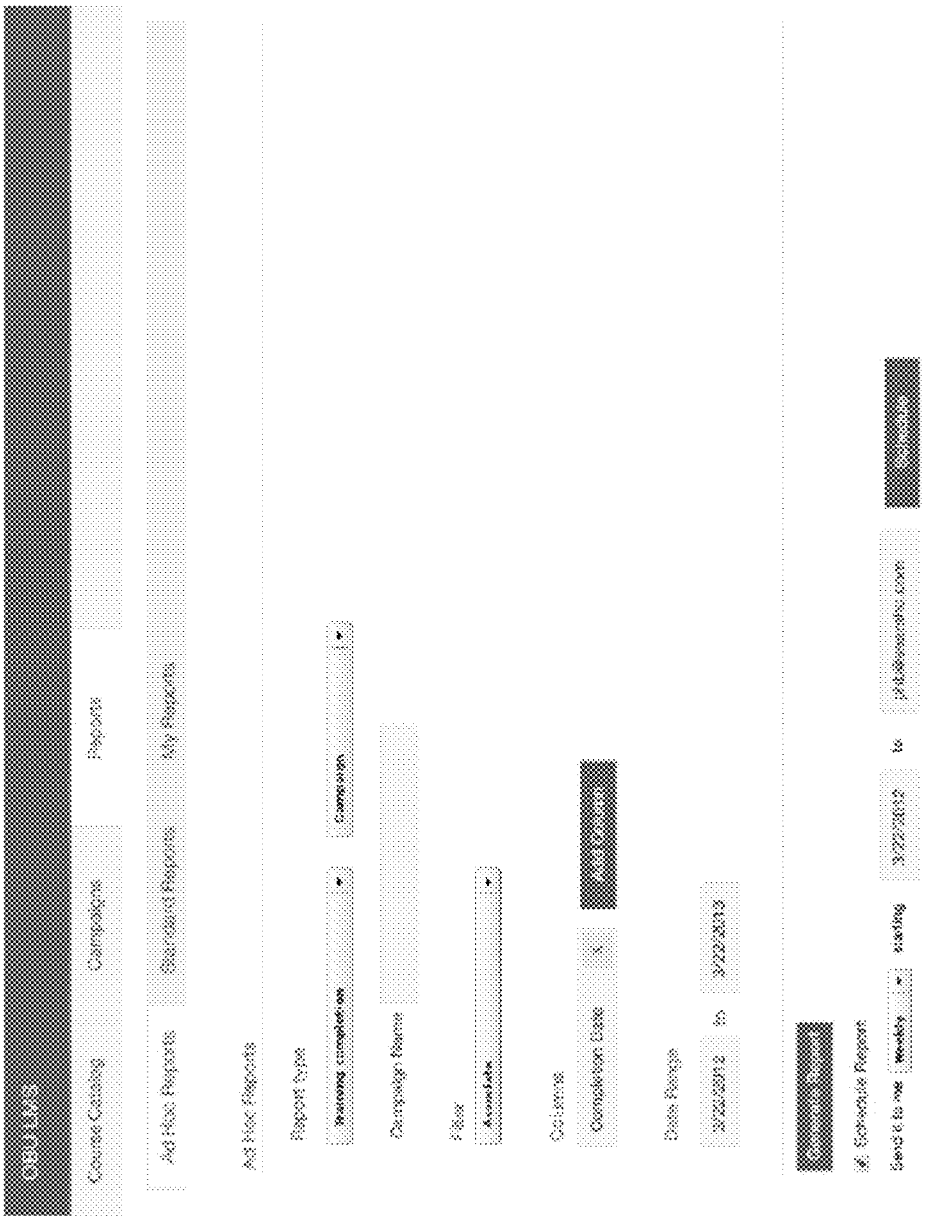
FIG. 46 is an illustration of an exemplary screen image of a user device, in accordance with a representative embodiment of the present disclosure.

FIG. 46 is an illustration of an exemplary screen image of a user device 4600, in accordance with a representative embodiment of the present disclosure. The screen image shown in FIG. 46 illustrates an "Ad Hoc Reports" page through which a user may request user-customizable reports on training completion and campaigns by campaign name, based on user-selectable parameters (e.g., filters). The functionality shown in FIG. 46 permits the user to schedule the generation of the selected report(s), using information over a user selected date range.

Figure 47:
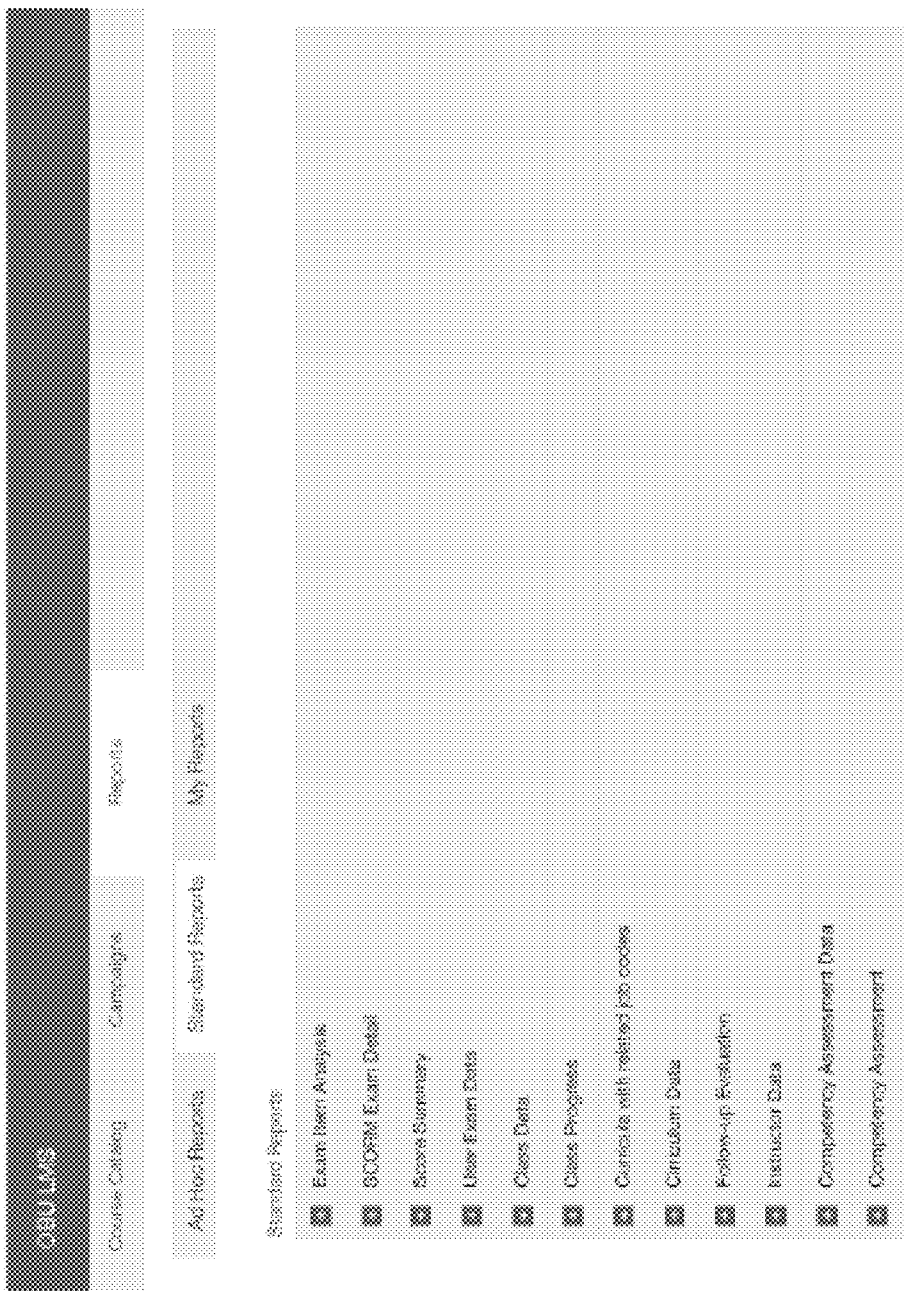
FIG. 47 is an illustration of an exemplary screen image of a user device, in accordance with a representative embodiment of the present disclosure.

FIG. 47 is an illustration of an exemplary screen image of a user device 4700, in accordance with a representative embodiment of the present disclosure. The screen image of FIG. 47 illustrates a list of standard reports available for user selection, following selection of the "Standard Reports" tab.

Figure 48:
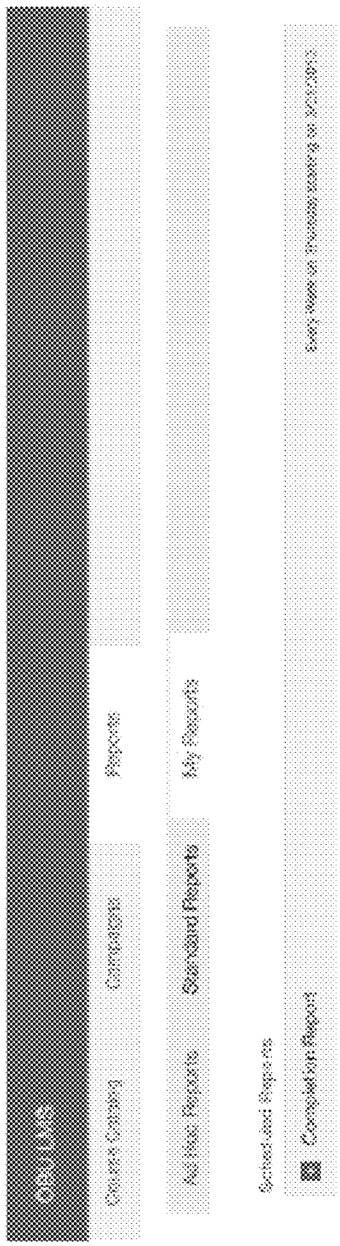
FIG. 48 is an illustration of an exemplary screen image of a user device, in accordance with a representative embodiment of the present disclosure.

FIG. 48 is an illustration of an exemplary screen image of a user device 4800, in accordance with a representative embodiment of the present disclosure. The screen image of FIG. 48 shows a listing of reports for the user of the system, following selection of the "My Reports" tab.

Figure 49:
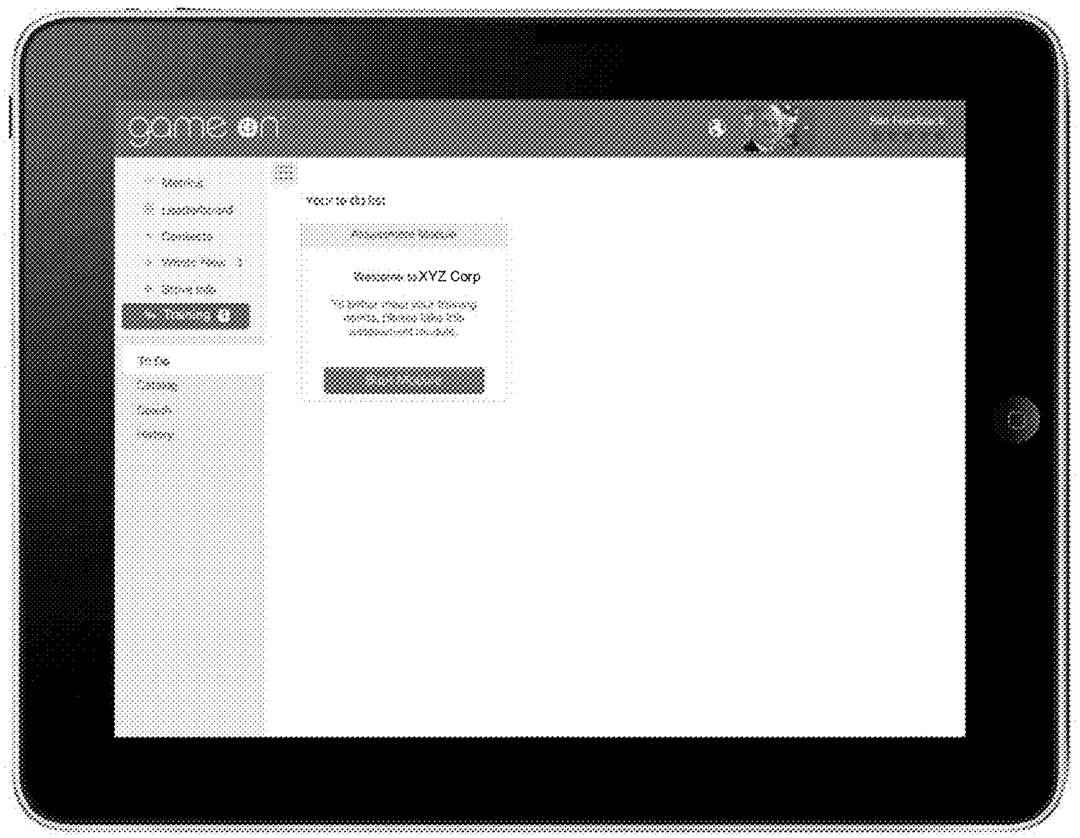
FIG. 49 is an illustration of an exemplary screen image of a user device, in accordance with a representative embodiment of the present disclosure.

FIG. 49 is an illustration of an exemplary screen image of a user device 4900, in accordance with a representative embodiment of the present disclosure. The screen image of FIG. 49 illustrates an introductory screen shown on a user device, following user selection of the "Training" tab of an application in accordance with the present disclosure. In the example of FIG. 49, the user is solicited to participate in an "assessment," which may be used to automatically determine their experience, skill, or proficiency in working in a particular department or organization, and any additional education or training that may be appropriate.

Figure 50:
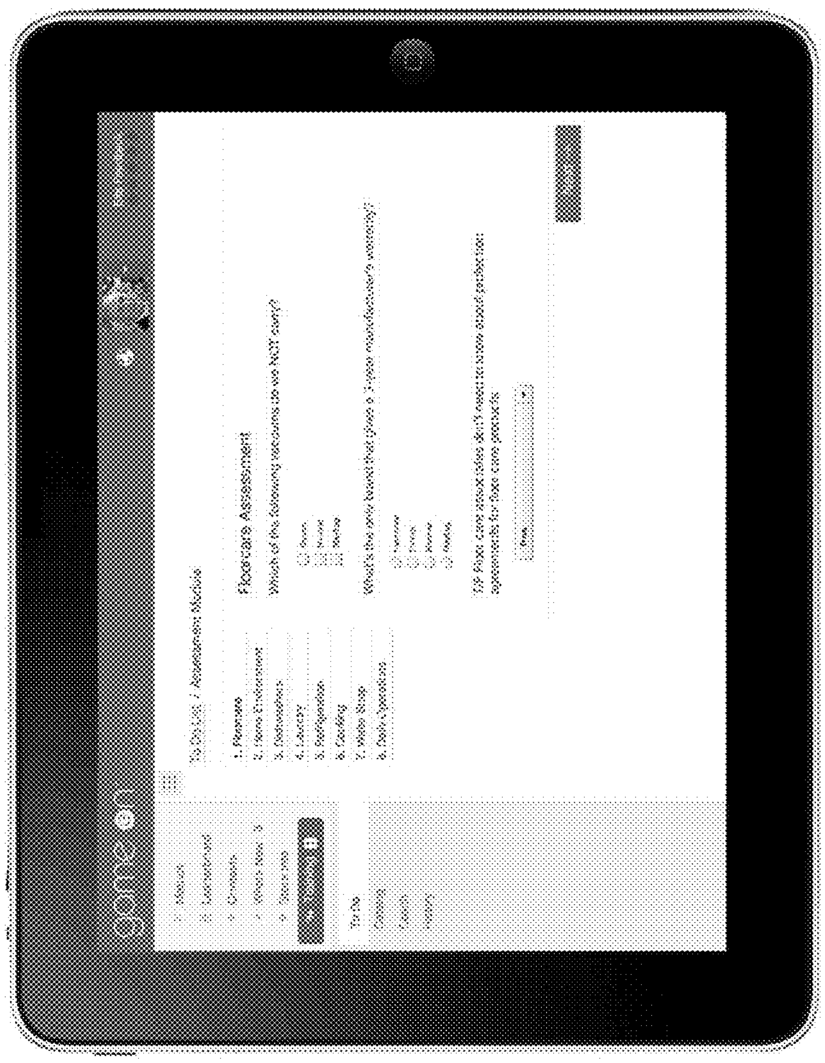
FIG. 50 is an illustration of an exemplary screen image of a user device, in accordance with a representative embodiment of the present disclosure.

FIG. 50 is an illustration of an exemplary screen image of a user device 5000, in accordance with a representative embodiment of the present disclosure. The screen image shown in FIG. 50 is one example screen of an "assessment module" on a particular subject (e.g., "Floor Care") that may be used to determine the sufficiency or need for training of an individual, in accordance with a representative embodiment of the present disclosure.

Figure 51:
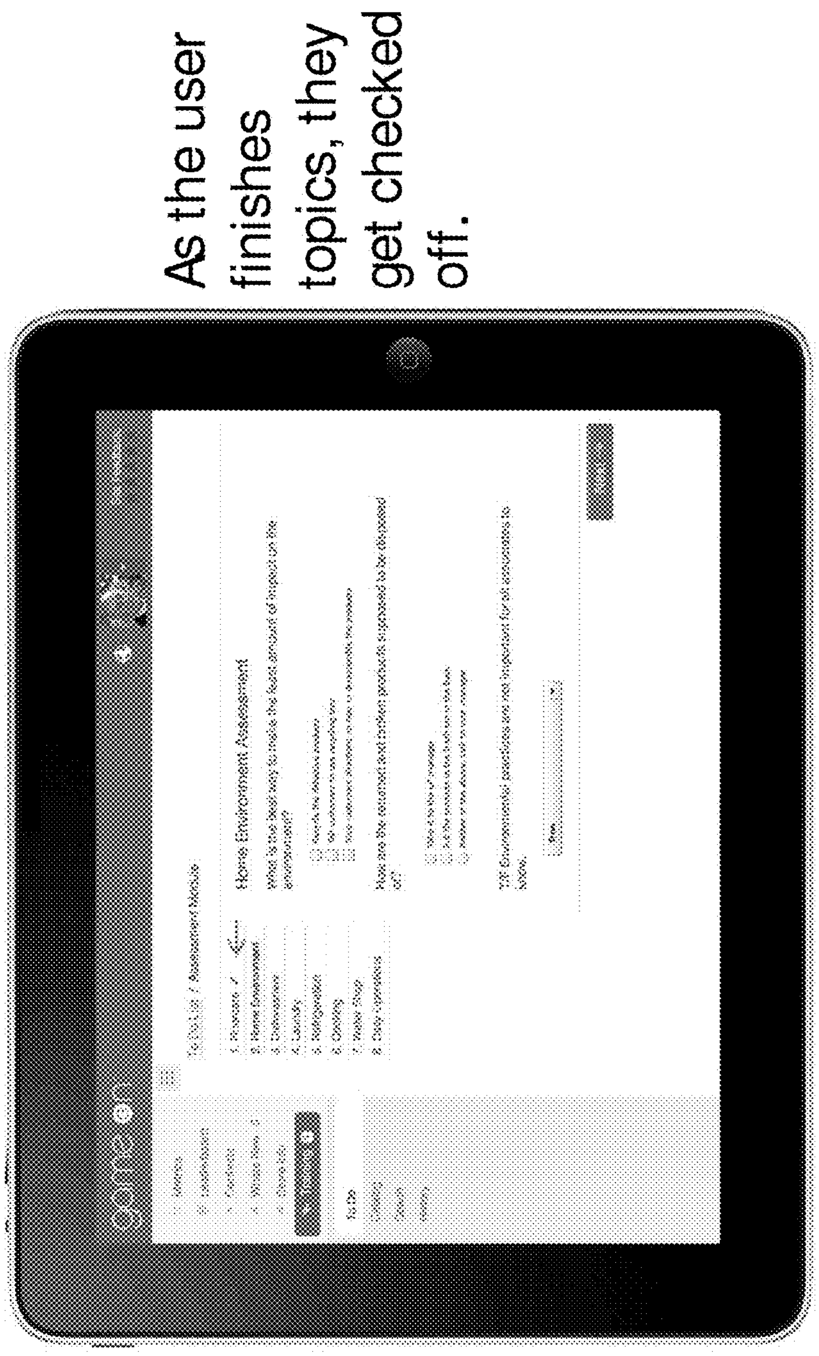
FIG. 51 is an illustration of an exemplary screen image of a user device, in accordance with a representative embodiment of the present disclosure.

FIG. 51 is an illustration of an exemplary screen image of a user device 5100, in accordance with a representative embodiment of the present disclosure. The screen image shown in FIG. 51 is another example screen of an "assessment module" on a particular subject (e.g., "Floor Care") that may be used to determine the sufficiency or need for training of an individual, in accordance with a representative embodiment of the present disclosure.

Figure 52:
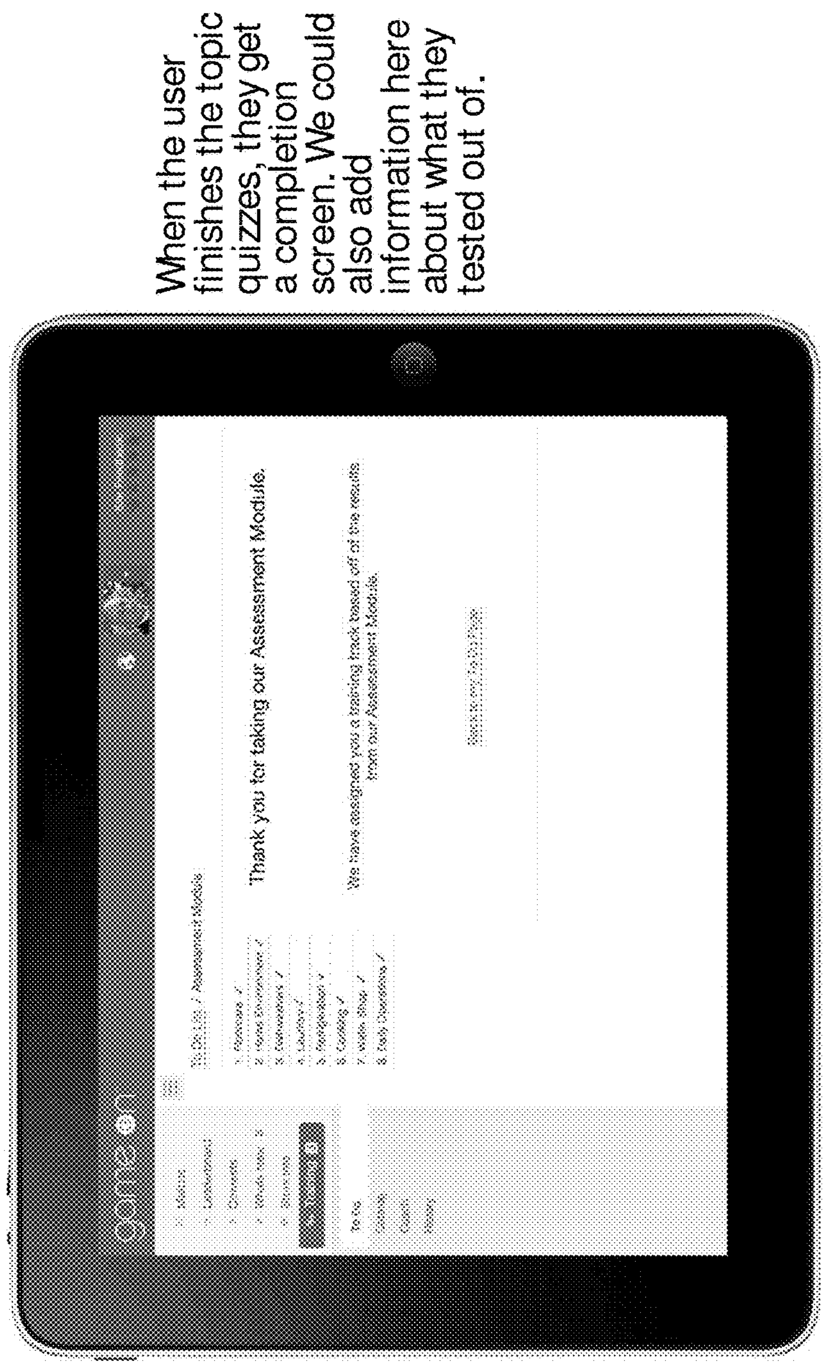
FIG. 52 is an illustration of an exemplary screen image of a user device, in accordance with a representative embodiment of the present disclosure.

FIG. 52 is an illustration of an exemplary screen image of a user device 5200, in accordance with a representative embodiment of the present disclosure. The screen image shown in FIG. 52 illustrates a notification that assessment of the individual is completed, and the system has automatically identified any education/training courses needed based on the results of the assessment of the individual, the requirements for the position in which the individual is to work, and business requirements (e.g., human resources, environmental, technical, product information, or other business rules) that may be appropriate.

Figure 53:
FIG. 53 is an illustration of an exemplary screen image of a user device, in accordance with a representative embodiment of the present disclosure.

FIG. 53 is an illustration of an exemplary screen image of a user device 5300, in accordance with a representative embodiment of the present disclosure. The screen image shown in FIG. 53 illustrates an example "To Do List" for an individual, showing the education/training courses and certification to be completed, based on an automated assessment, such as, by way of example and not limitation, that discussed above with regard to FIG. 49 to FIG. 52.

Figure 54:
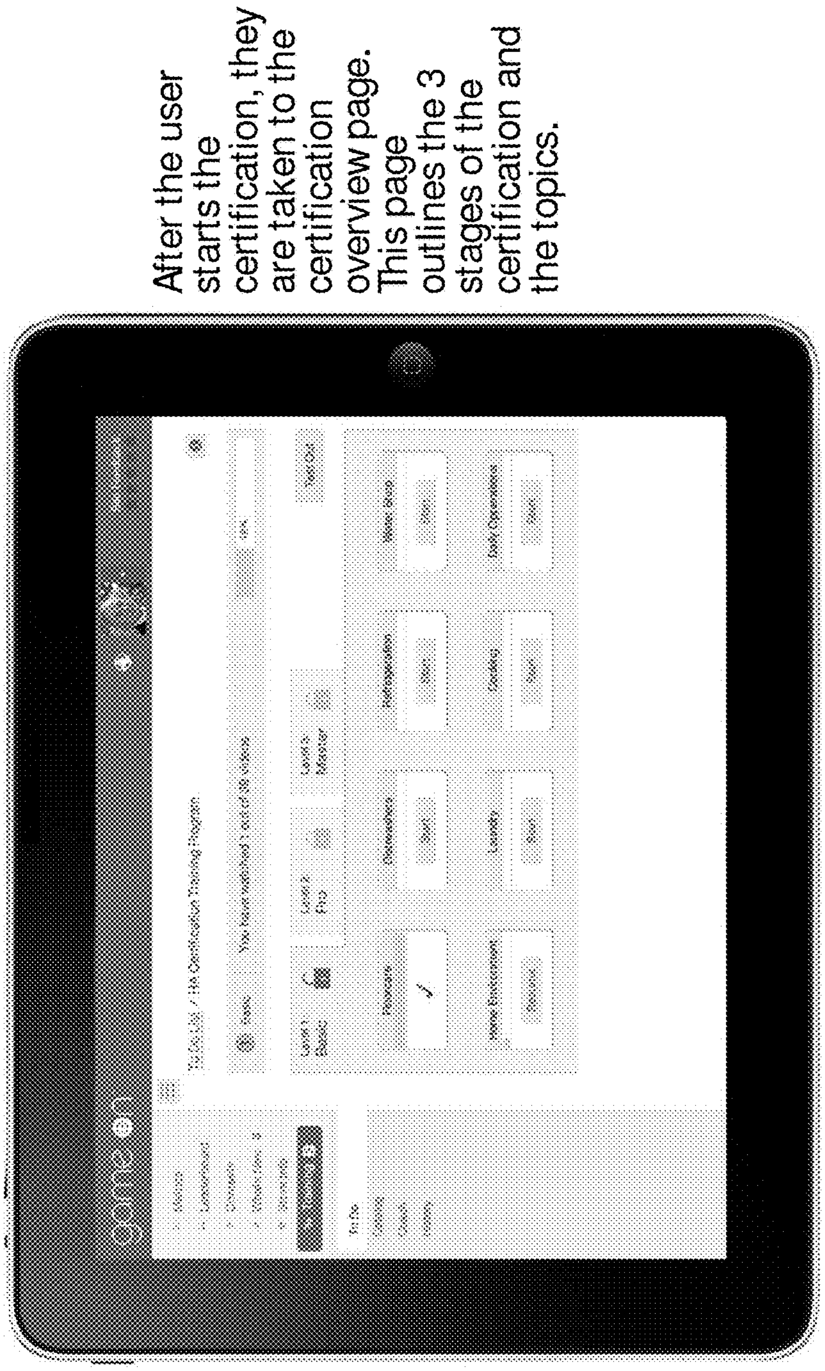
FIG. 54 is an illustration of an exemplary screen image of a user device, in accordance with a representative embodiment of the present disclosure.

FIG. 54 is an illustration of an exemplary screen image of a user device 5400, in accordance with a representative embodiment of the present disclosure. The screen image shown in FIG. 54 illustrates the tracking of progress in education/training of an individual in completion of a "To Do List" of education/training course work or certification, in accordance with the present disclosure.

Figure 55:
FIG. 55 is an illustration of an exemplary screen image of a user device, in accordance with a representative embodiment of the present disclosure.

FIG. 55 is an illustration of an exemplary screen image of a user device 5500, in accordance with a representative embodiment of the present disclosure. The screen image of FIG. 55 illustrates exemplary information about user progress in completing their "To Do List" of education, training, and certification, in accordance with a representative embodiment of the present disclosure.

Figure 56:
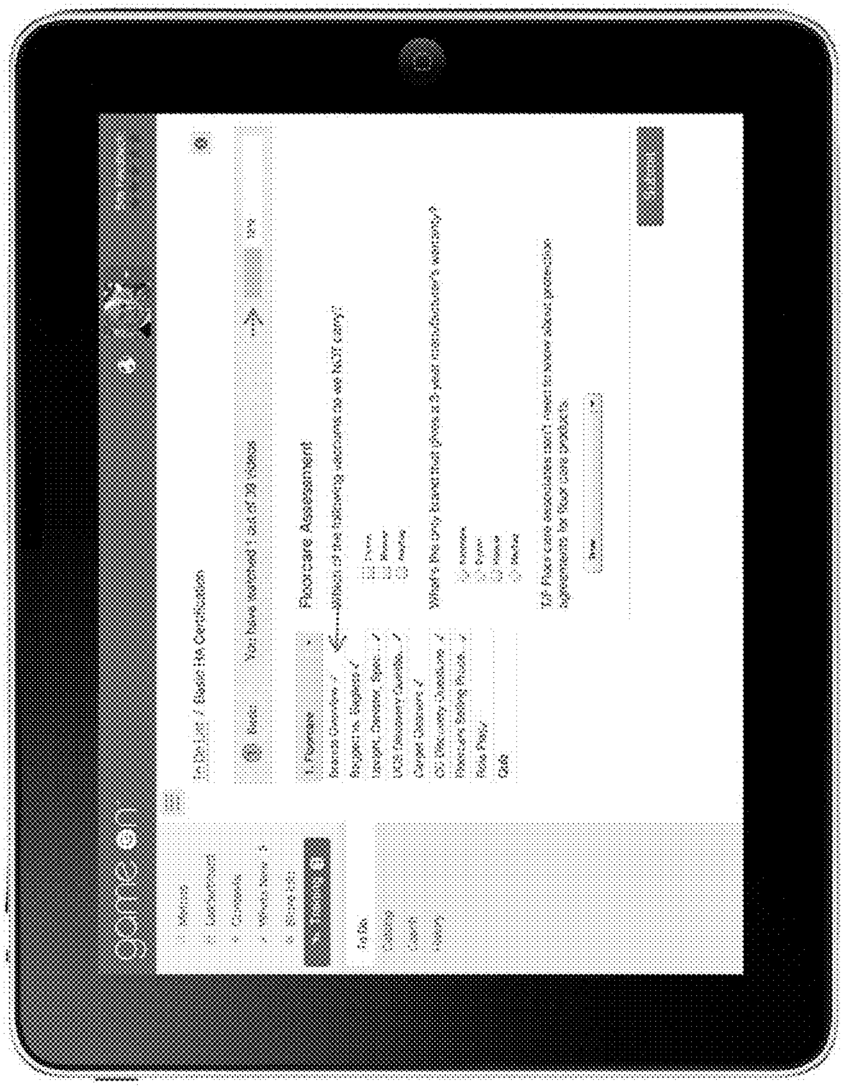
FIG. 56 is an illustration of an exemplary screen image of a user device, in accordance with a representative embodiment of the present disclosure.

FIG. 56 is an illustration of an exemplary screen image of a user device 5600, in accordance with a representative embodiment of the present disclosure. The screen image of FIG. 56 illustrates addition aspects of exemplary information about user progress in completing their "To Do List" of education, training, and certification, in accordance with a representative embodiment of the present disclosure.

Figure 57:
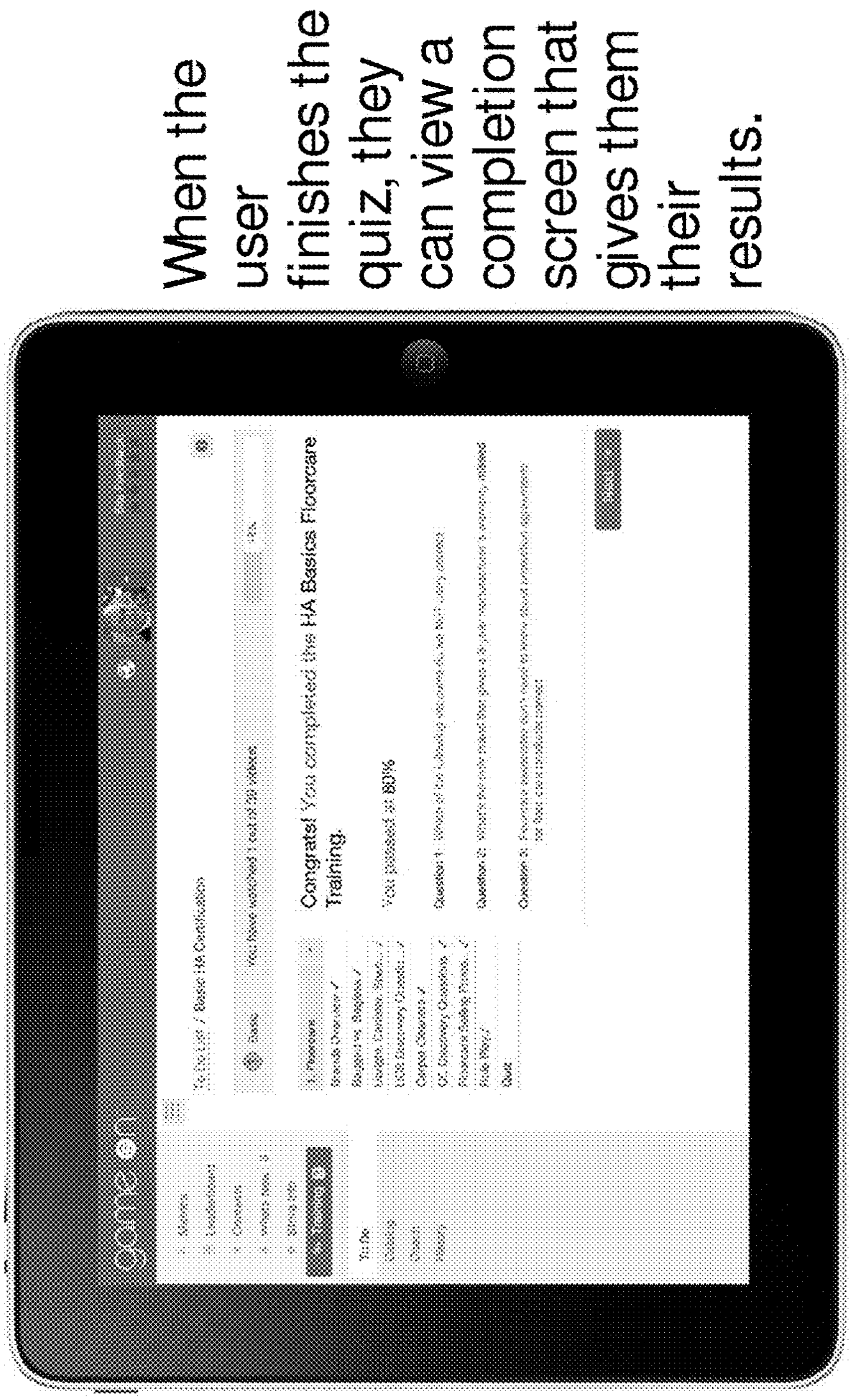
FIG. 57 is an illustration of an exemplary screen image of a user device, in accordance with a representative embodiment of the present disclosure.

FIG. 57 is an illustration of an exemplary screen image of a user device 5700, in accordance with a representative embodiment of the present disclosure. The screen image of FIG. 57 illustrates an exemplary notification of a user regarding completion of a certification that is part of their "To Do List" of education, training, and certification, in accordance with a representative embodiment of the present disclosure.

Figure 58:
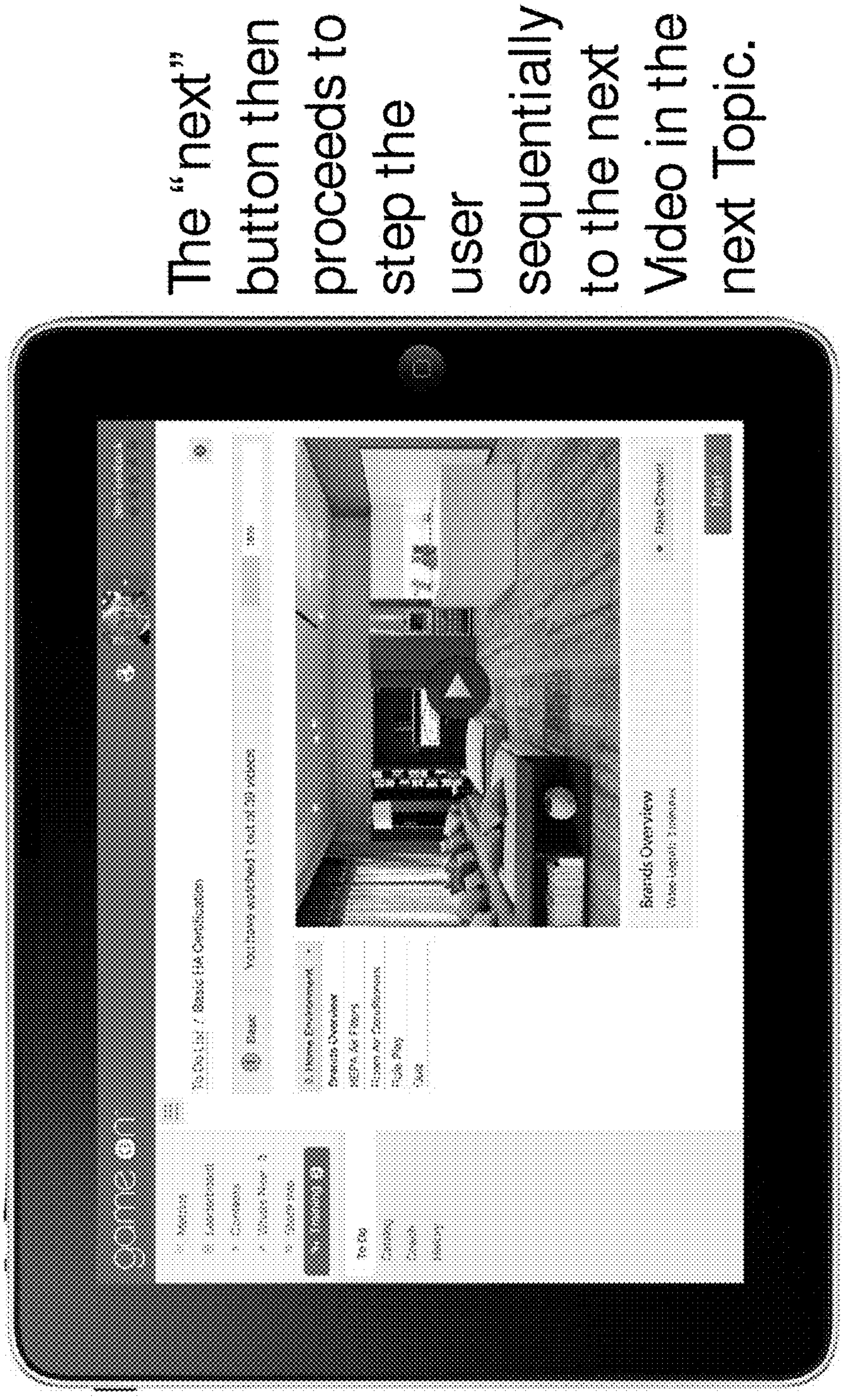
FIG. 58 is an illustration of an exemplary screen image of a user device, in accordance with a representative embodiment of the present disclosure.

FIG. 58 is an illustration of an exemplary screen image of a user device 5800, in accordance with a representative embodiment of the present disclosure. The screen image of FIG. 58 illustrates a user moving on to the next topic on their "To Do List" of education, training, and certification, in accordance with a representative embodiment of the present disclosure.

Figure 59:
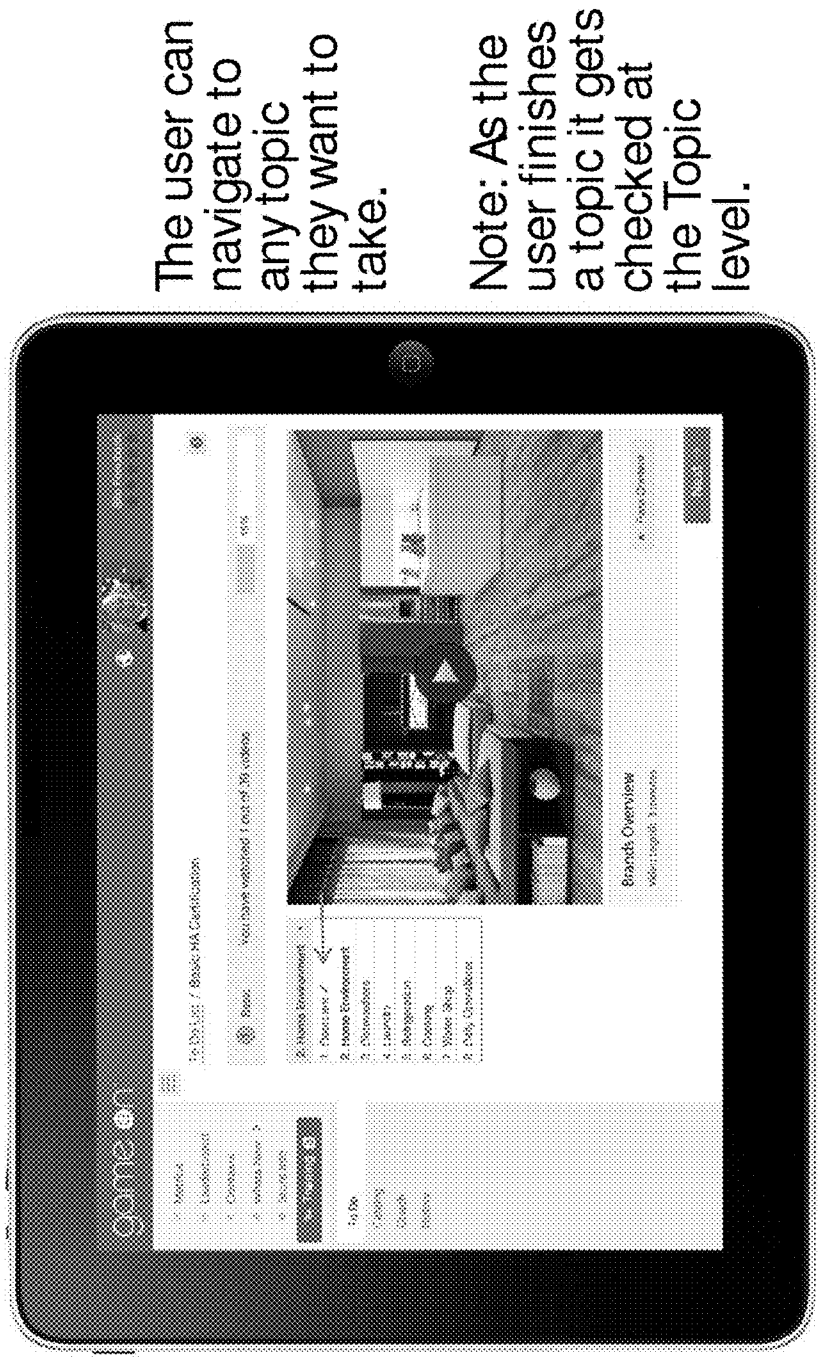
FIG. 59 is an illustration of an exemplary screen image of a user device, in accordance with a representative embodiment of the present disclosure.

FIG. 59 is an illustration of an exemplary screen image of a user device 5900, in accordance with a representative embodiment of the present disclosure. The screen image of FIG. 59 illustrates an exemplary list of topics to be completed as part of their "To Do List" of education, training, and certification, in accordance with a representative embodiment of the present disclosure.

Figure 60:
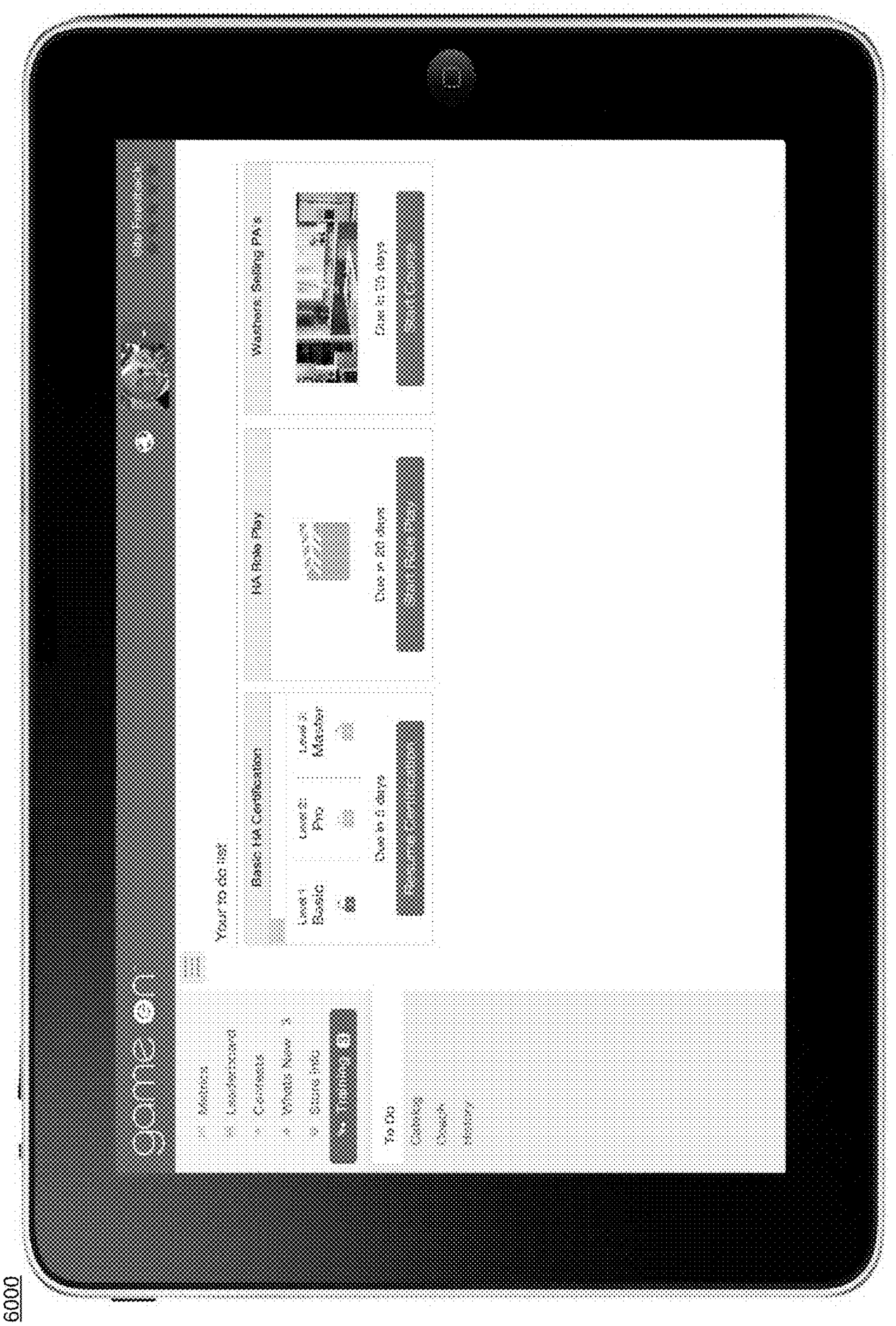
FIG. 60 is an illustration of an exemplary screen image of a user device, in accordance with a representative embodiment of the present disclosure.

FIG. 60 is an illustration of an exemplary screen image of a user device 6000, in accordance with a representative embodiment of the present disclosure. The screen image of FIG. 60 illustrates an updated "To Do List" showing progress in completion of education, training, and certification, in accordance with a representative embodiment of the present disclosure.

Figure 61:
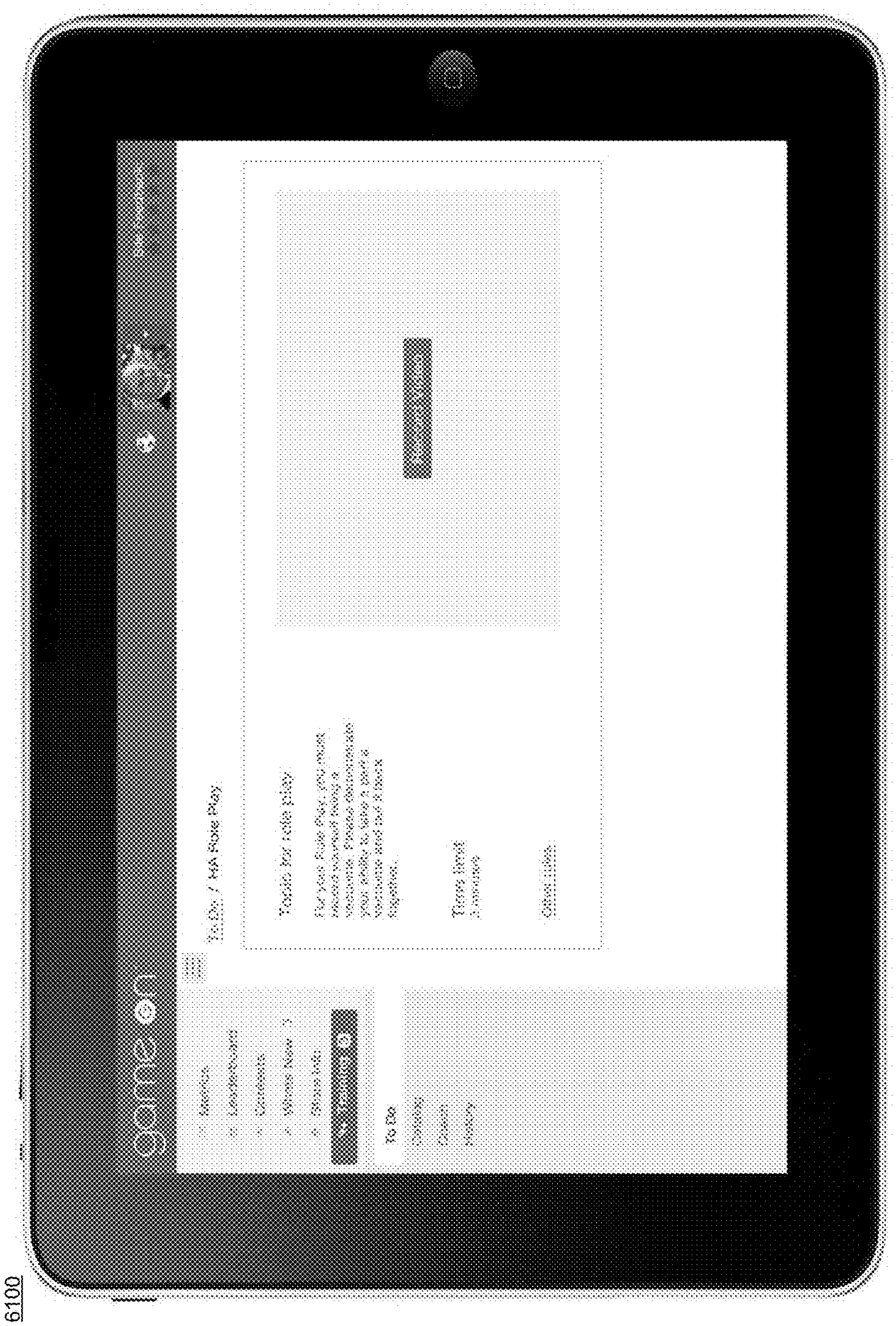
FIG. 61 is an illustration of an exemplary screen image of a user device, in accordance with a representative embodiment of the present disclosure.

FIG. 61 is an illustration of an exemplary screen image of a user device 6100, in accordance with a representative embodiment of the present disclosure. The screen image of FIG. 61 illustrates instructions for an exemplary "role playing exercise" to be recorded in video format by a user/worker as part of their "To Do List" of education, training, and certification for the user/worker, in accordance with a representative embodiment of the present disclosure. Based upon one or more factors (e.g., the demonstrated level or skill, proficiency, or experience of a worker), such content may be used as crowd-sourced training materials for the training of other workers engaged in similar work responsibilities.

Figure 62:
FIG. 62 is an illustration of an exemplary screen image of a user device, in accordance with a representative embodiment of the present disclosure.

FIG. 62 is an illustration of an exemplary screen image of a user device 6200, in accordance with a representative embodiment of the present disclosure. The screen image of FIG. 62 illustrates a user/worker performing the actions of recording a "role playing exercise" that is part of the "To Do List" of education, training, and certification for a user in video format, in accordance with a representative embodiment of the present disclosure.

Figure 63:
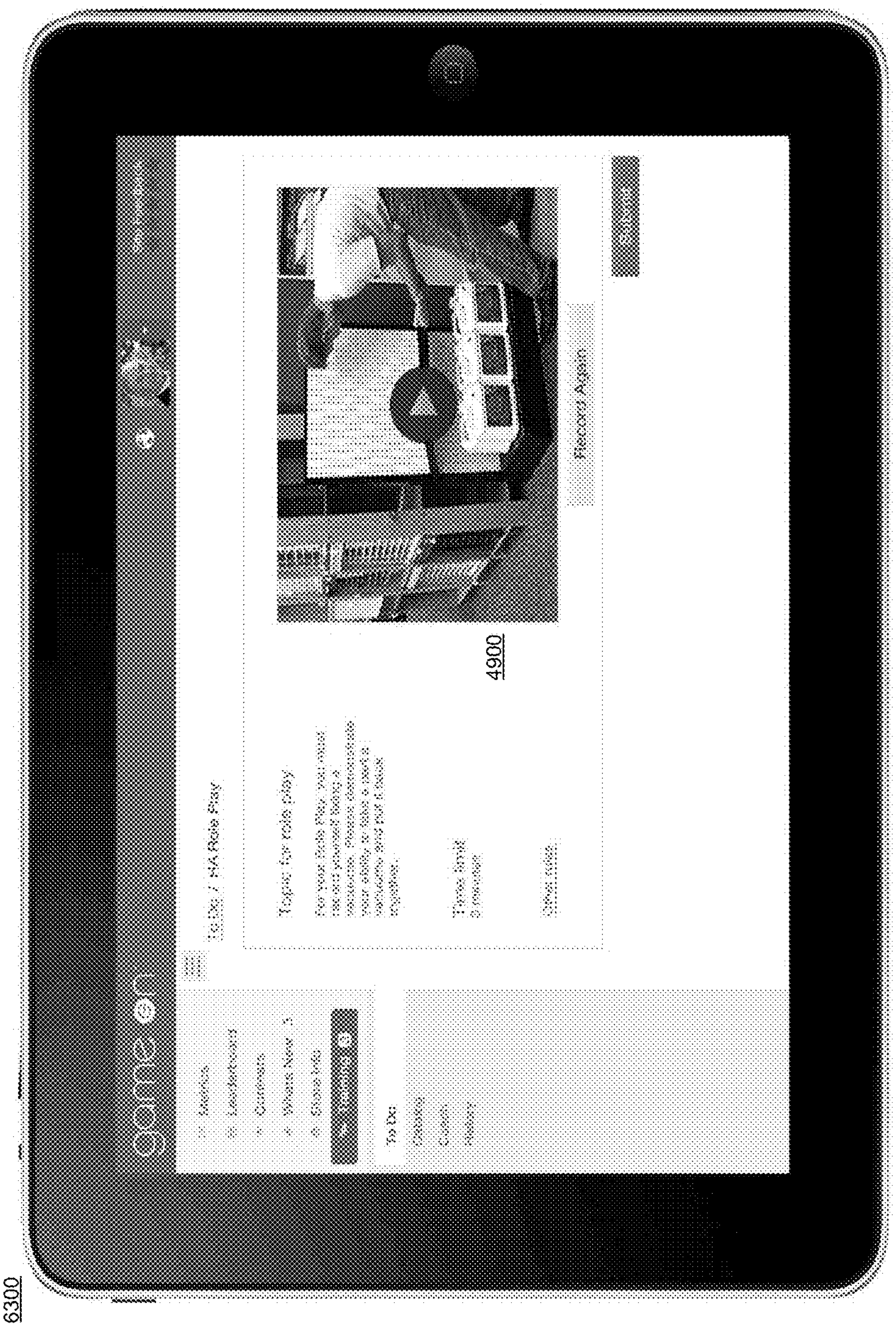
FIG. 63 is an illustration of an exemplary screen image of a user device, in accordance with a representative embodiment of the present disclosure.

FIG. 63 is an illustration of an exemplary screen image of a user device 6300, in accordance with a representative embodiment of the present disclosure. The screen image of FIG. 63 illustrates a screen enabling a user to view and submit a video the user/worker recorded as part of a "role playing exercise" that is part of the "To Do List" of education, training, and certification for a user, in accordance with a representative embodiment of the present disclosure.

Figure 64:
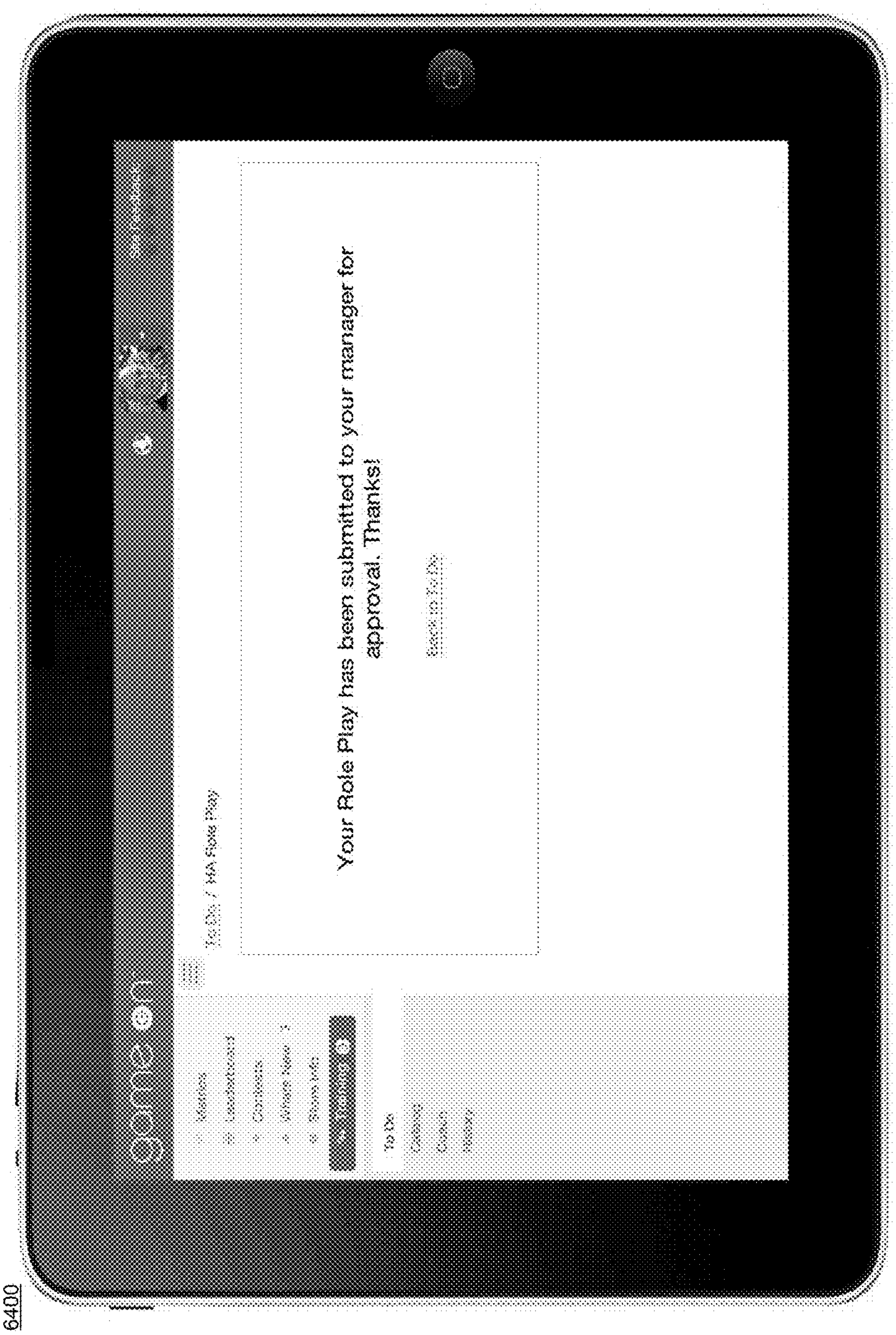
FIG. 64 is an illustration of an exemplary screen image of a user device, in accordance with a representative embodiment of the present disclosure.

FIG. 64 is an illustration of an exemplary screen image of a user device 6400, in accordance with a representative embodiment of the present disclosure. The screen image of FIG. 64 illustrates user notification of successful submission of a video recording of an "role playing exercise" that is part of the "To Do List" of education, training, and certification for a user, in accordance with a representative embodiment of the present disclosure.

Figure 65:
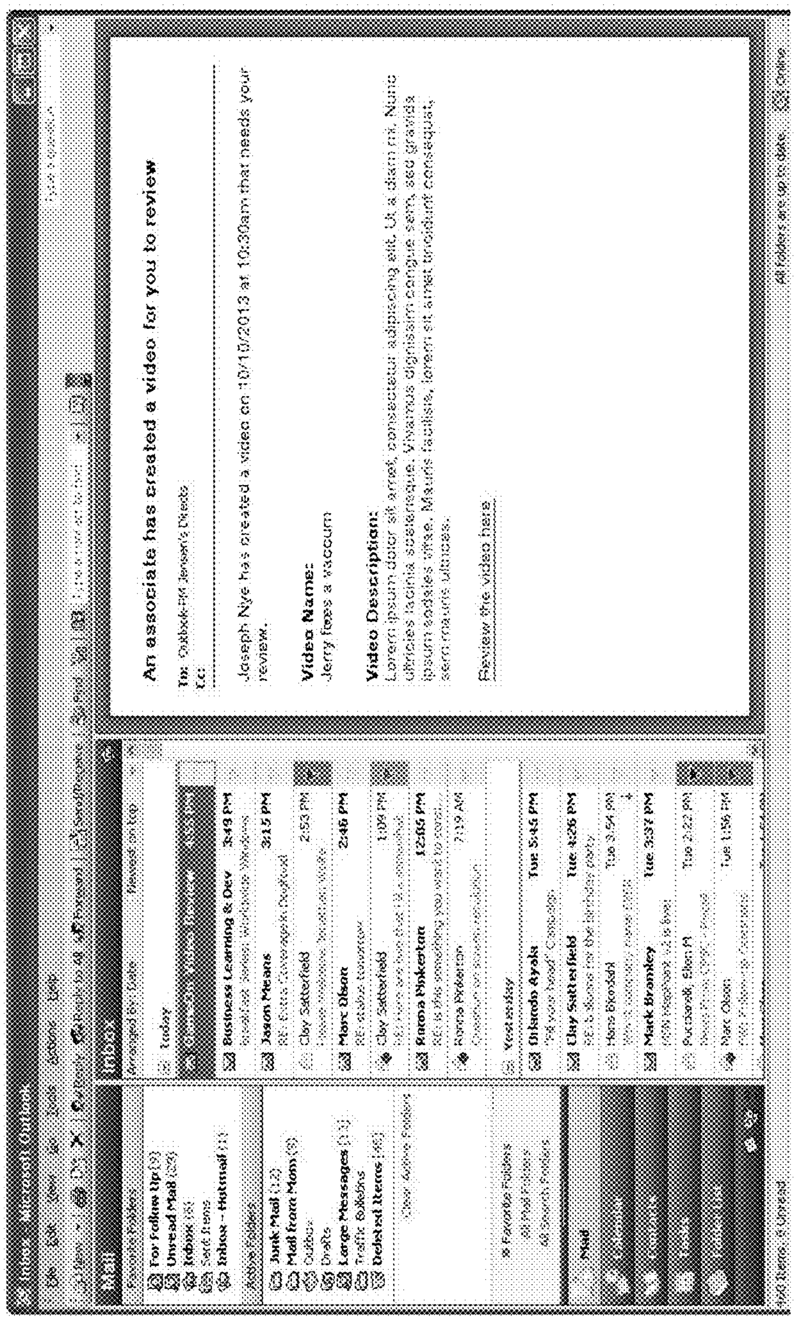
FIG. 65 is an illustration of an exemplary screen image of a user device, in accordance with a representative embodiment of the present disclosure.

FIG. 65 is an illustration of an exemplary screen image of a user device 6500, in accordance with a representative embodiment of the present disclosure. The screen image of FIG. 65 illustrates an exemplary email notifying a reviewer of the availability of a video "role playing exercise" created as part of the "To Do List" of education, training, and certification for a user, in accordance with a representative embodiment of the present disclosure.

Figure 66:
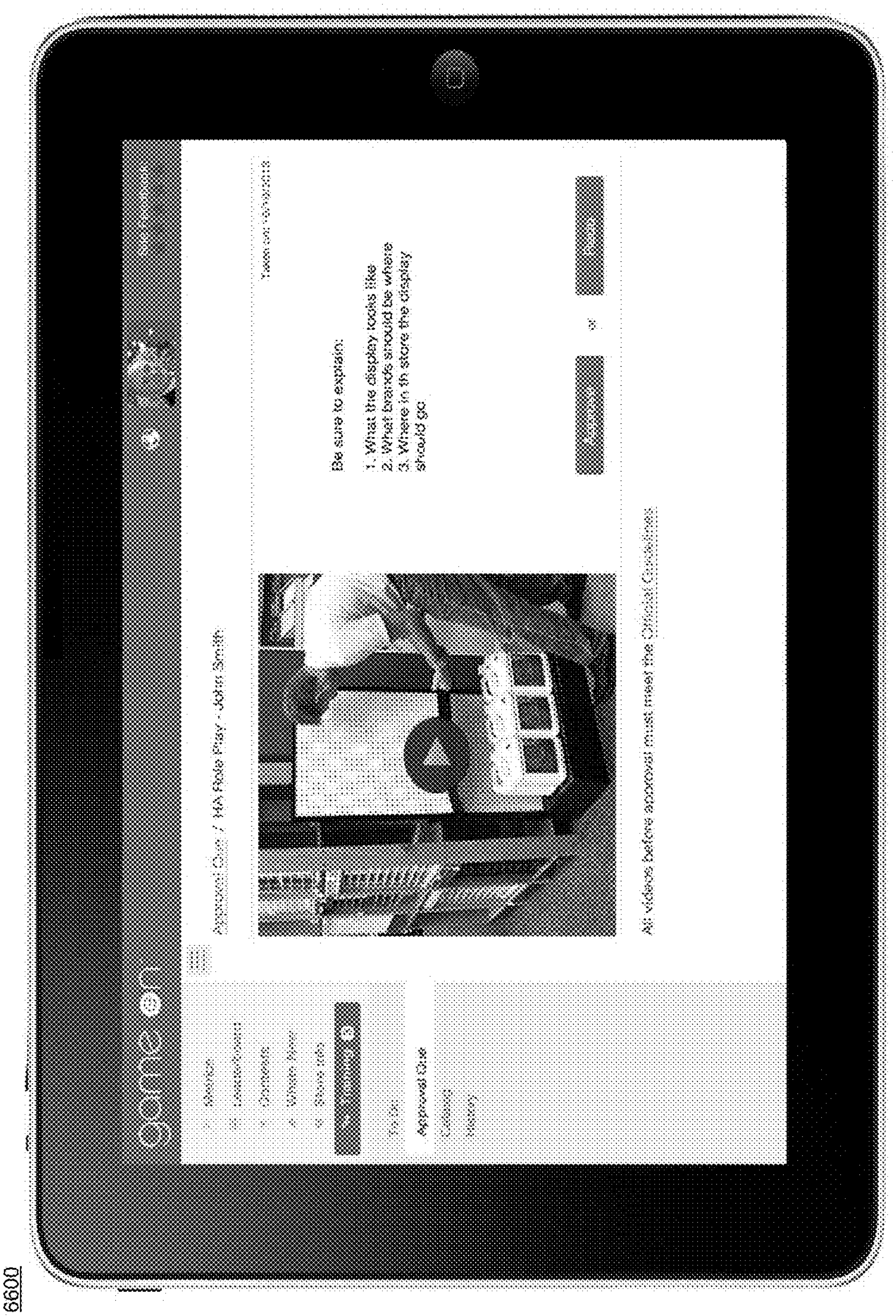
FIG. 66 is an illustration of an exemplary screen image of a user device, in accordance with a representative embodiment of the present disclosure.

FIG. 66 is an illustration of an exemplary screen image of a user device 6600, in accordance with a representative embodiment of the present disclosure. The screen image of FIG. 66 illustrates an exemplary review screen enabling a reviewer to approved or request a redo of a video "role playing exercise" created as part of the "To Do List" of education, training, and certification for a user, in accordance with a representative embodiment of the present disclosure.

Figure 67:
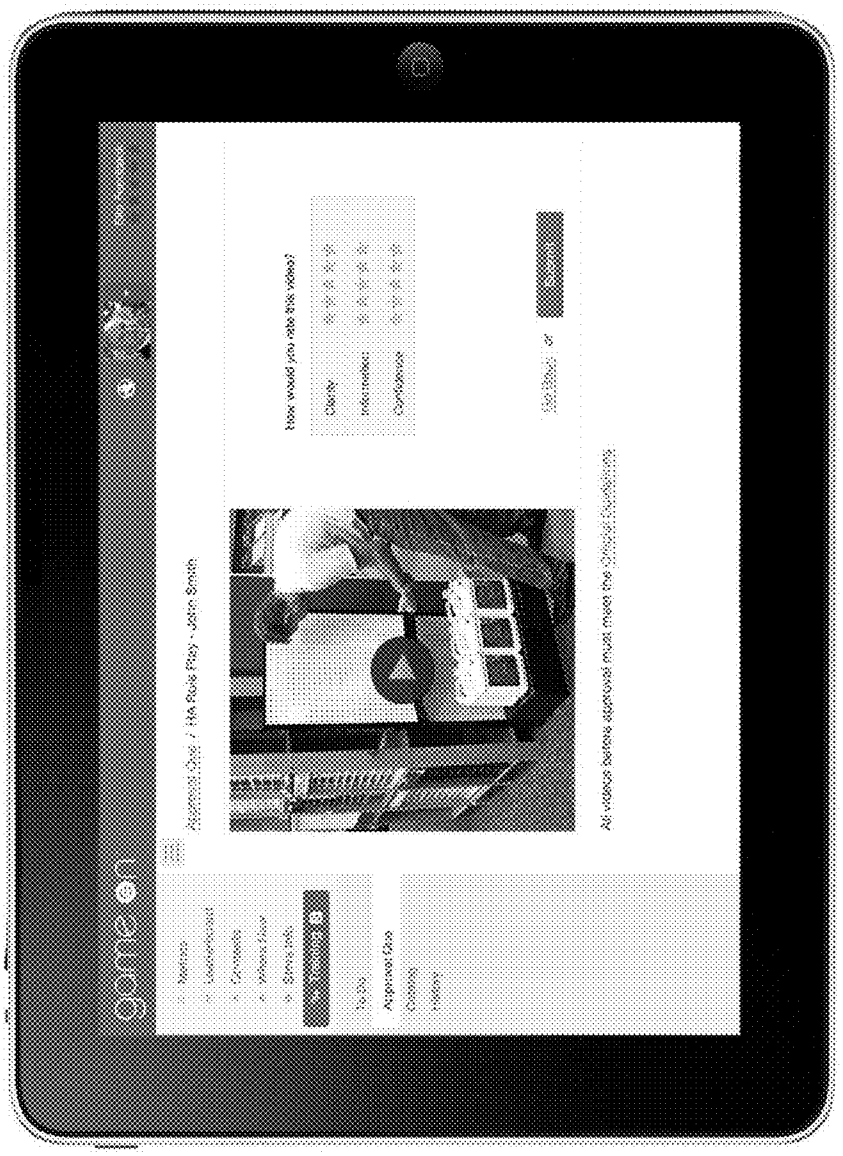
FIG. 67 is an illustration of an exemplary screen image of a user device, in accordance with a representative embodiment of the present disclosure.

FIG. 67 is an illustration of an exemplary screen image of a user device 6700, in accordance with a representative embodiment of the present disclosure. The screen image of FIG. 67 illustrates an exemplary review results screen showing the rating by the reviewer of a video "role playing exercise" created by the viewer of the review as part of the "To Do List" of education, training, and certification for a user, in accordance with a representative embodiment of the present disclosure.

Figure 68:
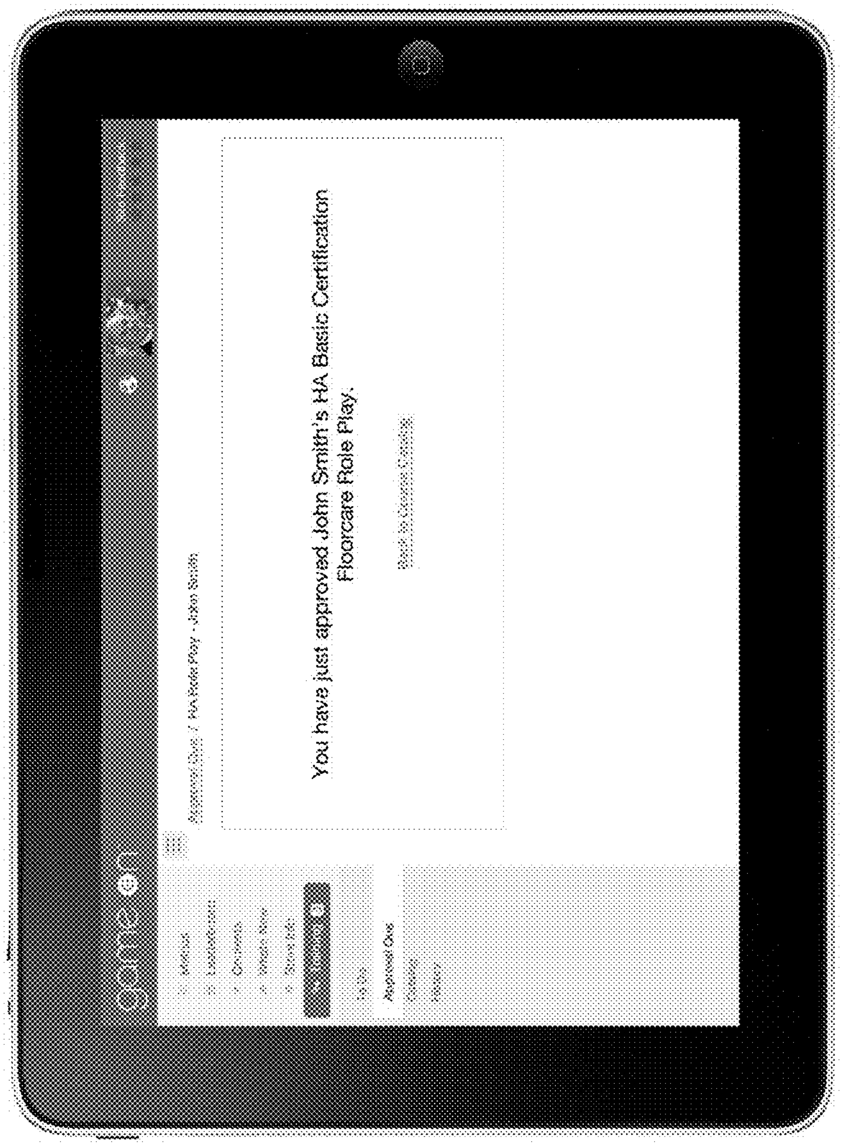
FIG. 68 is an illustration of an exemplary screen image of a user device, in accordance with a representative embodiment of the present disclosure.

FIG. 68 is an illustration of an exemplary screen image of a user device 6800, in accordance with a representative embodiment of the present disclosure. The screen image of FIG. 68 illustrates an exemplary confirmation of submission of approval by a reviewer of a video "role playing exercise" created as part of the "To Do List" of education, training, and certification for a user, in accordance with a representative embodiment of the present disclosure.

Figure 69:
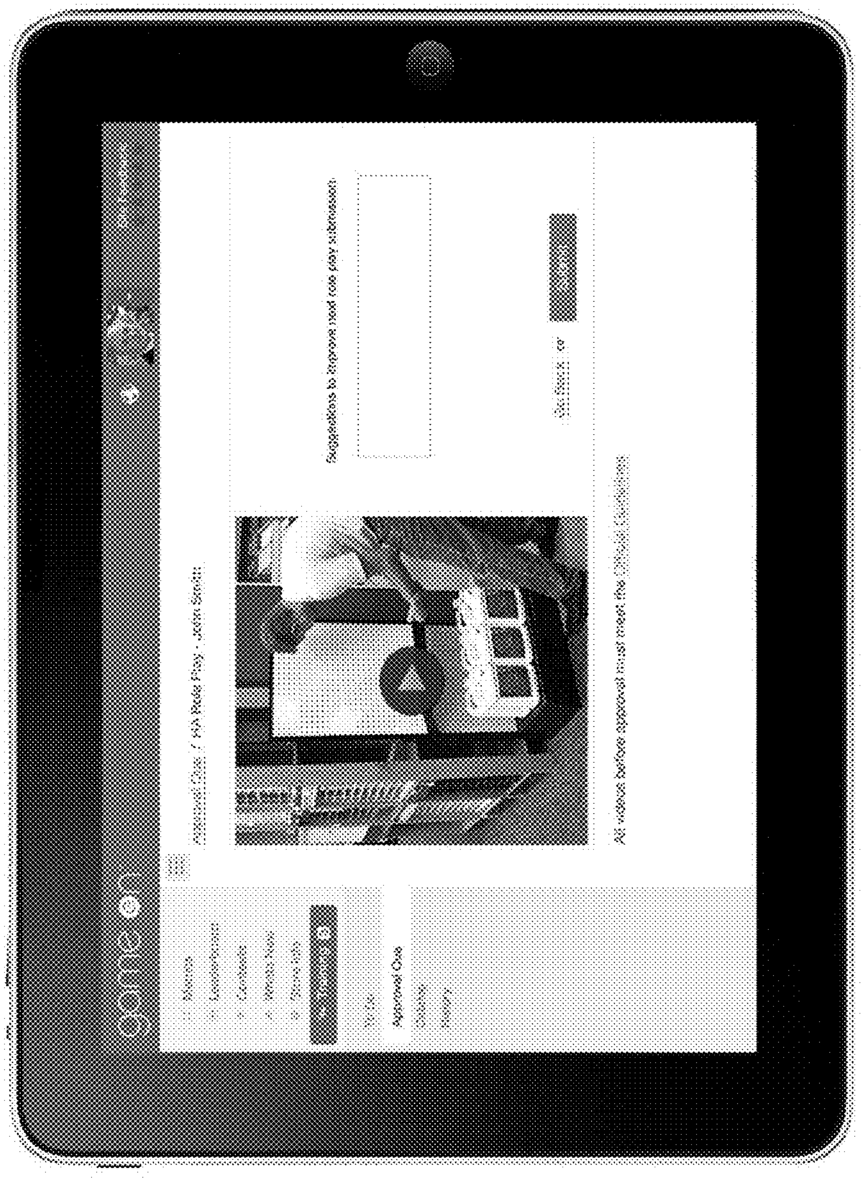
FIG. 69 is an illustration of an exemplary screen image of a user device, in accordance with a representative embodiment of the present disclosure.

FIG. 69 is an illustration of an exemplary screen image of a user device 6900, in accordance with a representative embodiment of the present disclosure. The screen image of FIG. 69 illustrates an exemplary input screen for requesting a creator of a video "role playing exercise" to redo the "role playing video" and any suggestions or the reasons why a redo is needed, in accordance with a representative embodiment of the present disclosure.

Figure 70:
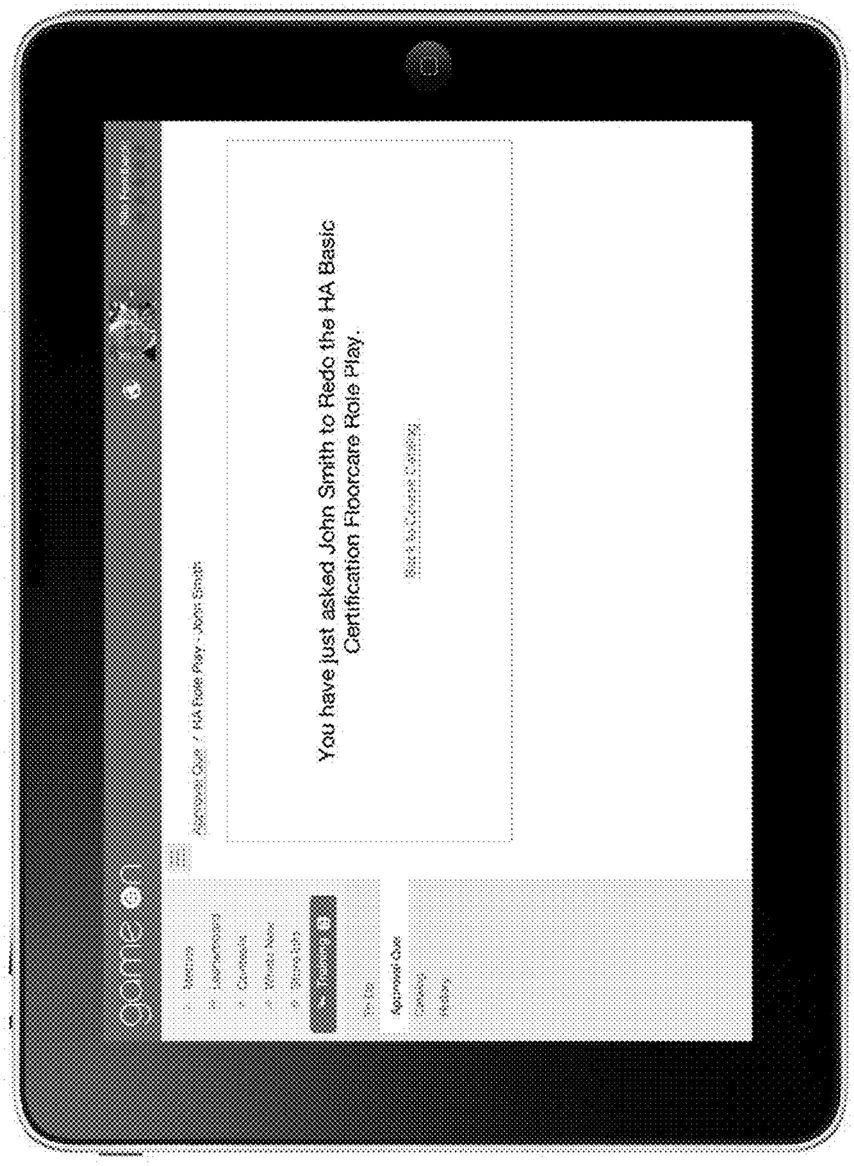
FIG. 70 is an illustration of an exemplary screen image of a user device, in accordance with a representative embodiment of the present disclosure.

FIG. 70 is an illustration of an exemplary screen image of a user device 7000, in accordance with a representative embodiment of the present disclosure. The screen image of FIG. 70 illustrates a notification confirming submission of a request to redo a video "role playing exercise" submitted as part of the "To Do List" of education, training, and certification for a user, in accordance with a representative embodiment of the present disclosure.

Figure 71:
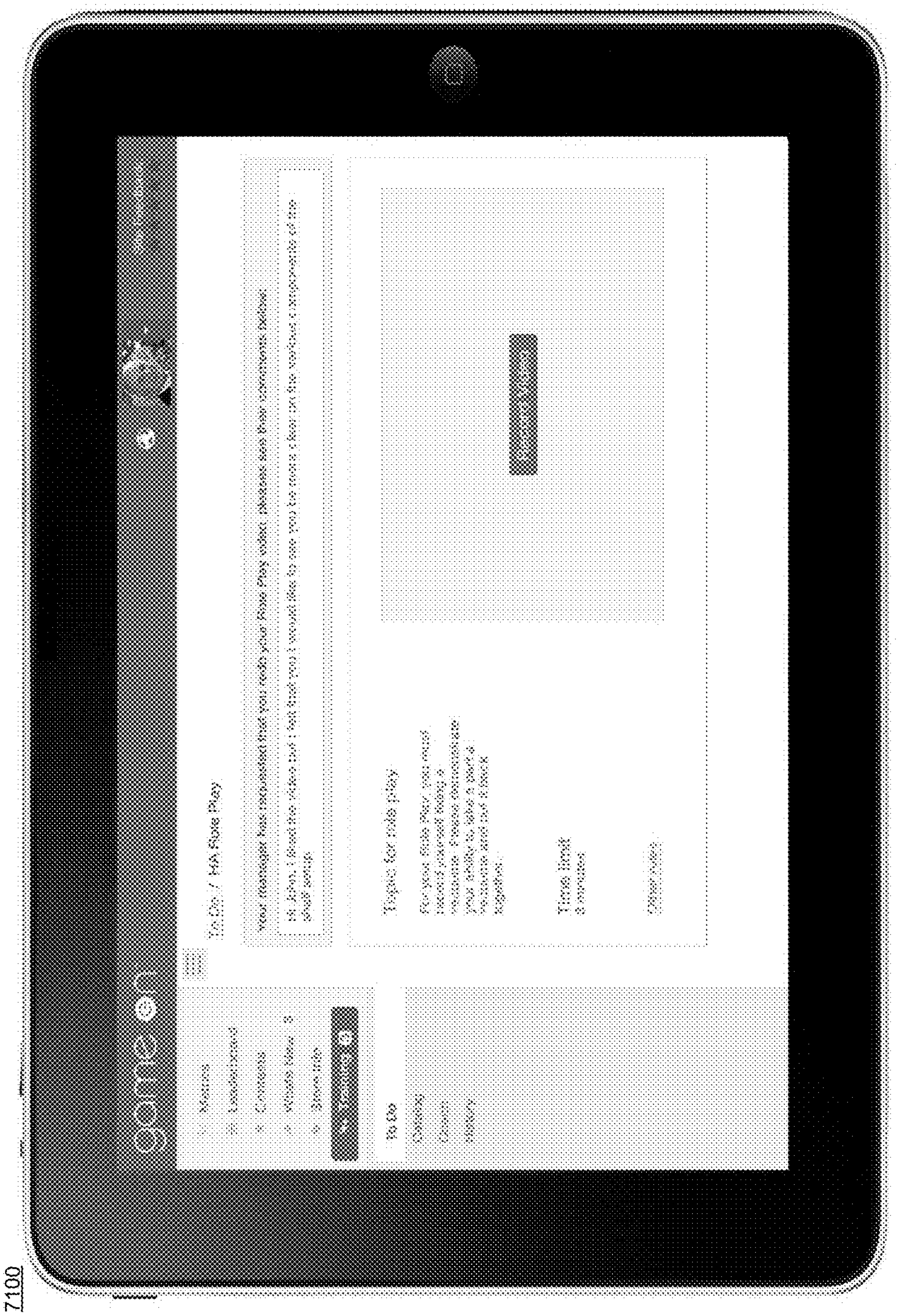
FIG. 71 is an illustration of an exemplary screen image of a user device, in accordance with a representative embodiment of the present disclosure.

FIG. 71 is an illustration of an exemplary screen image of a user device 7100, in accordance with a representative embodiment of the present disclosure. The screen image of FIG. 71 illustrates a request to redo a video "role playing exercise" submitted as part of the "To Do List" of education, training, and certification for a user, in accordance with a representative embodiment of the present disclosure.

Figure 72:
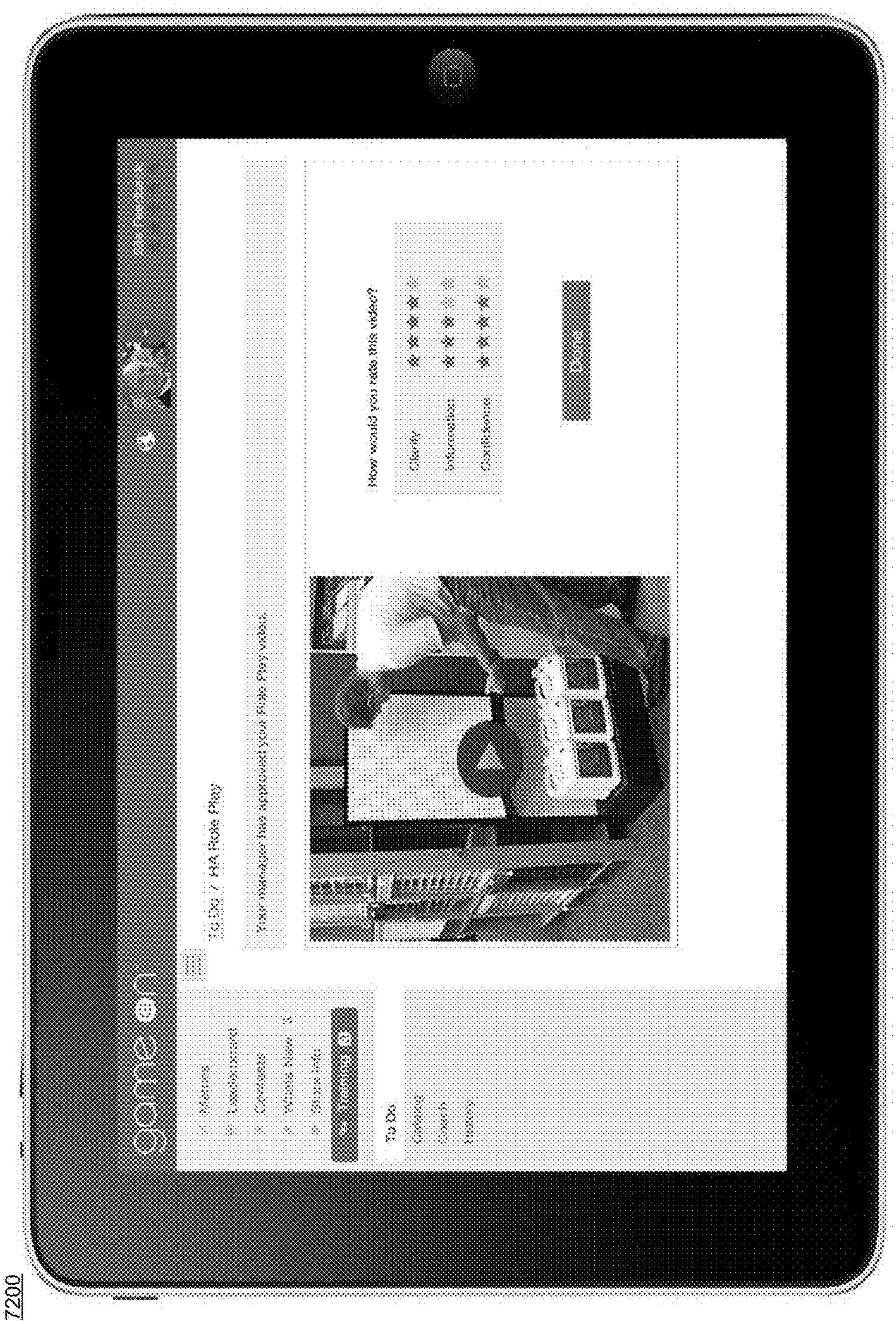
FIG. 72 is an illustration of an exemplary screen image of a user device, in accordance with a representative embodiment of the present disclosure.

FIG. 72 is an illustration of an exemplary screen image of a user device 7200, in accordance with a representative embodiment of the present disclosure. The screen image of FIG. 72 illustrates a notification confirming approval of a video "role playing exercise" submitted as part of the "To Do List" of education, training, and certification for a user, in accordance with a representative embodiment of the present disclosure.

Figure 73:
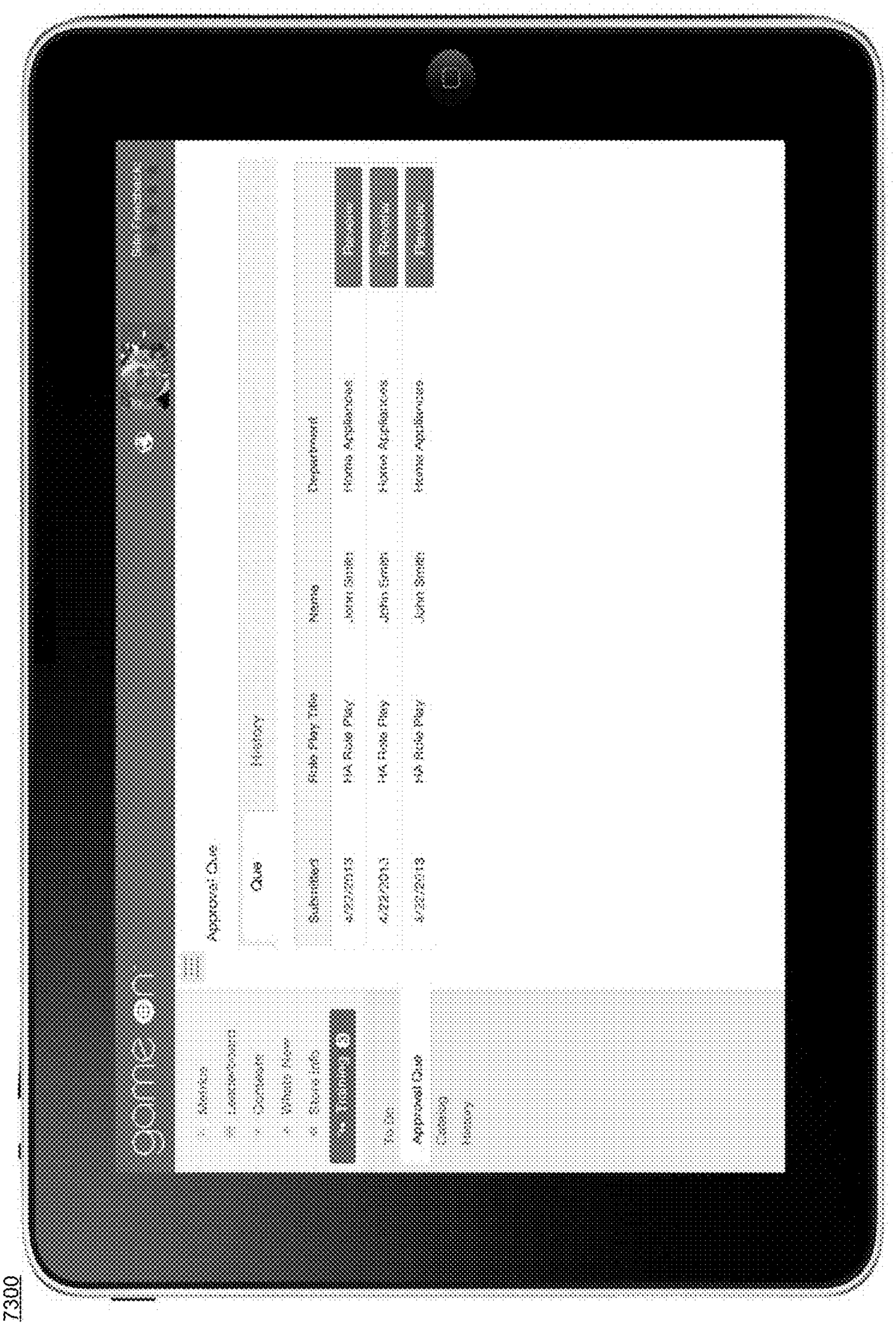
FIG. 73 is an illustration of an exemplary screen image of a user device, in accordance with a representative embodiment of the present disclosure.

FIG. 73 is an illustration of an exemplary screen image of a user device 7300, in accordance with a representative embodiment of the present disclosure. The screen image of FIG. 73 illustrates a list of queued video "role playing exercises" waiting to be reviewed, showing the names and departments of the submitters, and the title and time of the submission, in accordance with a representative embodiment of the present disclosure.

Figure 74:
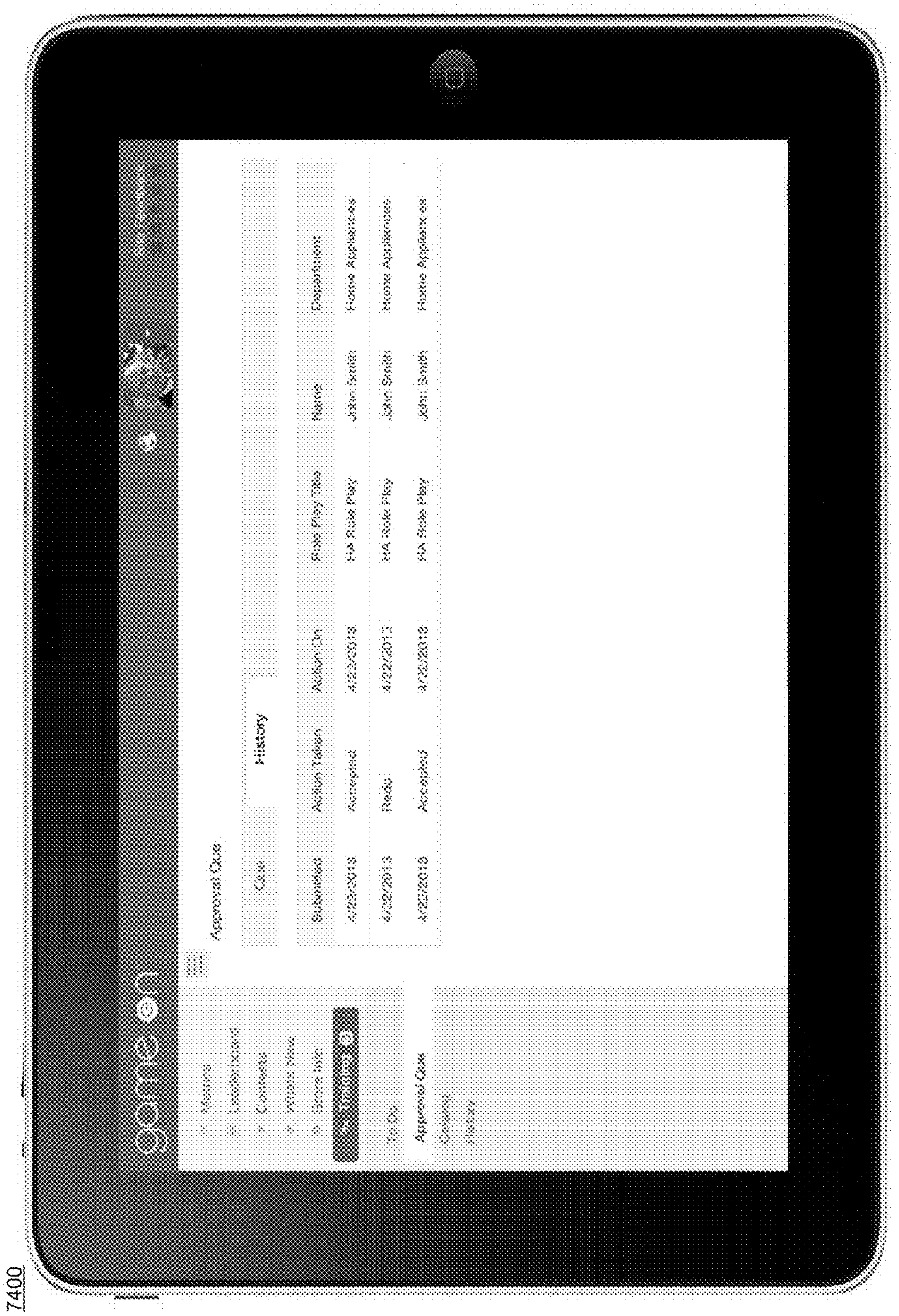
FIG. 74 is an illustration of an exemplary screen image of a user device, in accordance with a representative embodiment of the present disclosure.

FIG. 74 is an illustration of an exemplary screen image of a user device 7400, in accordance with a representative embodiment of the present disclosure. The screen image of FIG. 74 illustrates a history of video "role playing exercises" that have been reviewed, showing the names and departments of various submitters, and the title and time of the submission, and the time of review and action taken by the reviewer, in accordance with a representative embodiment of the present disclosure.

Aspects of the present disclosure may be found in a method for operating a computer system. Such a method may comprise accessing business operational performance data corresponding to each of a plurality of workers; calculating a value corresponding to each of one or more metrics for each of the plurality of workers, using the business operational performance data; and for each of the plurality of workers, comparing the value corresponding to each of the one or more metrics to one or more respective thresholds. The method may also comprise automatically assigning training to members of the plurality of workers, based upon the comparisons, and tracking enrollment, progress, and completion of assigned training by the plurality of workers.

In a representative embodiment of the present disclosure, the business operational performance data may comprise transaction information for each of a plurality of consumer transactions received from one or more point of sale terminals. The information for each transaction may comprise information identifying one or more products, a corresponding price for each of the one or more products, and information identifying a member of the plurality of workers that processed the consumer transaction. The one or more respective thresholds may be calculated using the business operational performance data for the plurality of workers, based upon a set of business rules. The training assigned to each member of the plurality of workers may be scheduled based upon a predicted seasonal climate condition for a work location of the member.

In a representative embodiment of the present disclosure, the system may crowd-source materials used in training members of the plurality of workers by automatically assigning creation of the materials to one or more members of the plurality of workers that have been selected based on the one or more metrics for each of the plurality of workers. In some representative embodiments of the present disclosure, the method may comprise notifying those members of the plurality of workers to which training is assigned of the assignment for training, and electronically delivering the assigned training to a user device of those members, according to an explicit request of each of those members.

Additional aspects of the present disclosure may be seen in a system comprising one or more processors communicatively coupled to a plurality of point of sale terminals. In such a system, the one or more processors may be operable to, at least, perform the actions of the method described above.

Yet other aspects of the present disclosure may be observed in a non-transitory computer-readable medium having a number of code sections. Each code section may comprise a plurality of instructions executable by one or more processors of a computer system, and the instructions may cause the one or more processors to perform the steps of the method described above.

Although devices, methods, and systems according to the present disclosure may have been described in connection with a preferred embodiment, it is not intended to be limited to the specific form set forth herein, but on the contrary, it is intended to cover such alternative, modifications, and equivalents, as can be reasonably included within the scope of the disclosure as defined by this disclosure and appended diagrams.

Accordingly, the present disclosure may be realized in hardware, software, or a combination of hardware and software. The present disclosure may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method, comprising:

accessing, via a selection of one or more graphical elements of a graphical user interface, business operational performance data corresponding to each of a plurality of workers;

calculating a value corresponding to each of one or more metrics for each of the plurality of workers, using the business operational performance data;

for each of the plurality of workers, comparing the value corresponding to each of the one or more metrics to one or more respective thresholds;

automatically assigning training to members of the plurality of workers, based upon the comparisons and based upon locations of the workers and weather conditions;

creating, via the selection of one or more graphical elements of a graphical user interface, materials for training that comprise online content;

adding to the online content, via the selection of one or more graphical elements of a graphical user interface, one or both of an image and a video provided by one or more mobile wireless devices;

formatting, via the selection of one or more graphical elements of a graphical user interface, the online content for display on a screen;

delivering the materials for training to the members of the plurality of workers; and tracking, via the selection of one or more graphical elements of a graphical user interface, enrollment, progress, and completion of assigned training by the plurality of workers.

2. The method according to claim 1, wherein the business operational performance data comprises transaction information for each of a plurality of consumer transactions received from one or more point of sale terminals.

3. The method according to claim 2, wherein the information for each transaction comprises information identifying one or more products, a corresponding price for each of the one or more products, and information identifying a member of the plurality of workers that processed the consumer transaction.

4. The method according to claim 1, wherein the one or more respective thresholds are calculated using the business operational performance data for the plurality of workers, based upon a set of business rules, or wherein training assigned to each member of the plurality of workers is scheduled based upon a predicted seasonal climate condition for a work location of the member.

5. The method according to claim 1, comprising:

identifying, via the selection of one or more graphical elements of a graphical user interface, a coach for training the members of the plurality of workers, based upon the comparisons, wherein the coach creates the online content; and coaching, via the selection of one or more graphical elements of a graphical interface, the members of the plurality of workers based on online social networking communications.

6. The method according to claim 1, wherein the system crowd-sources materials used in training members of the plurality of workers by automatically assigning creation of the materials to one or more members of the plurality of workers that have been selected based on the one or more metrics for each of the plurality of workers.

7. The method according to claim 1, wherein the method comprises:

notifying those members of the plurality of workers to which training is assigned of the assignment for training; and electronically delivering the assigned training to a user device of those members according to explicit request of those members.

8. A system comprising:

one or more processors communicatively coupled to a plurality of point of sale terminals, the one or more processors operable to, at least:

access, via a selection of one or more graphical elements of a graphical user interface, business operational performance data corresponding to each of a plurality of workers;

calculate a value corresponding to each of one or more metrics for each of the plurality of workers, using the business operational performance data;

for each of the plurality of workers, compare the value corresponding to each of the one or more metrics to one or more respective thresholds;

automatically assign training to members of the plurality of workers, based upon the comparisons and based upon locations of the workers and weather conditions;

create, via the selection of one or more graphical elements of a graphical user interface, materials for training that comprise online content;

add to the online content, via the selection of one or more graphical elements of a graphical user interface, one or both of an image and a video provided by one or more mobile wireless devices;

format, via the selection of one or more graphical elements of a graphical user interface, the online content for display on a screen;

cause the materials for training to be delivered to members of the plurality of workers; and track, via the selection of one or more graphical elements of a graphical user interface enrollment, progress, and completion of assigned training by the plurality of workers.

9. The system according to claim 8, wherein the business operational performance data comprises transaction information for each of a plurality of consumer transactions received from the one or more point of sale terminals.

10. The system according to claim 9, wherein the information for each transaction comprises information identifying one or more products, a corresponding price for each of the one or more products, and information identifying a member of the plurality of workers that processed the consumer transaction.

11. The system according to claim 8, wherein the one or more respective thresholds are calculated using the business operational performance data for the plurality of workers, based upon a set of business rules.

12. The system according to claim 8, wherein training assigned to each member of the plurality of workers is scheduled based upon a predicted seasonal climate condition for a work location of the member.

13. The system according to claim 8, wherein the system crowd-sources materials used in training members of the plurality of workers by automatically assigning creation of the materials to one or more members of the plurality of workers that have been selected based on the one or more metrics for each of the plurality of workers.

14. The system according to claim 8, wherein the one or more processors are operable to, at least:

notify those members of the plurality of workers to which training is assigned of the assignment for training; and electronically deliver the assigned training to a user device of those members according to explicit request of those members.

15. A non-transitory computer-readable medium having a number of code sections, each code section comprising a plurality of instructions executable by one or more processors of a computer system, the instructions causing the one or more processors to perform the steps of a method, the method comprising:

accessing, via a selection of one or more graphical elements of a graphical user interface business operational performance data corresponding to each of a plurality of workers;

calculating a value corresponding to each of one or more metrics for each of the plurality of workers, using the business operational performance data;

for each of the plurality of workers, comparing the value corresponding to each of the one or more metrics to one or more respective thresholds;

automatically assigning training to members of the plurality of workers, based upon the comparisons and based upon locations of the workers and weather conditions;

creating, via the selection of one or more graphical elements of a graphical user interface, materials for training that comprise online content;

adding to the online content, via the selection of one or more graphical elements of a graphical user interface, one or both of an image and a video provided by one or more mobile wireless devices;

formatting, via the selection of one or more graphical elements of a graphical user interface, the online content for display on a screen;

cause materials for training to be delivered to members of the plurality of workers; and tracking, via the selection of one or more graphical elements of a graphical user interface, enrollment, progress, and completion of assigned training by the plurality of workers.

16. The non-transitory computer-readable medium according to claim 15, wherein the business operational performance data comprises transaction information for each of a plurality of consumer transactions received from one or more point of sale terminals.

17. The non-transitory computer-readable medium according to claim 16, wherein the information for each transaction comprises information identifying one or more products, a corresponding price for each of the one or more products, and information identifying a member of the plurality of workers that processed the consumer transaction.

18. The non-transitory computer-readable medium according to claim 15, wherein the one or more respective thresholds are calculated using the business operational performance data for the plurality of workers, based upon a set of business rules.

19. The non-transitory computer-readable medium according to claim 15, wherein training assigned to each member of the plurality of workers is scheduled based upon a predicted seasonal climate condition for a work location of the member.

20. The non-transitory computer-readable medium according to claim 15, wherein the system crowd-sources materials used in training members of the plurality of workers by automatically assigning creation of the materials to one or more members of the plurality of workers that have been selected based on the one or more metrics for each of the plurality of workers.

21. The non-transitory computer-readable medium according to claim 15, wherein the steps of the method further comprise:

notifying those members of the plurality of workers to which training is assigned of the assignment for training; and electronically delivering the assigned training to a user device of those members according to explicit request of those members.

* * * * *